(12) United States Patent
Hnich et al.

(10) Patent No.: US 12,307,402 B2
(45) Date of Patent: *May 20, 2025

(54) SYSTEMS AND METHODS FOR PROVIDING KNOWLEDGE BASES OF ASSESSMENT ITEMS

(71) Applicant: EDUCATION4SIGHT GmbH, Erlangen (DE)

(72) Inventors: Brahim Hnich, Sfax (TN); Lassaad Essafi, Wettstetten (DE)

(73) Assignee: EDUCATION4SIGHT GmbH, Erlangen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,489

(22) Filed: Jun. 29, 2021

(65) Prior Publication Data
US 2022/0004957 A1  Jan. 6, 2022

Related U.S. Application Data

(60) Provisional application No. 63/046,805, filed on Jul. 1, 2020.

(51) Int. Cl.
*G06Q 10/00* (2023.01)
*G06Q 10/0637* (2023.01)
(Continued)

(52) U.S. Cl.
CPC . *G06Q 10/06375* (2013.01); *G06Q 10/06398* (2013.01); *G09B 19/00* (2013.01)

(58) Field of Classification Search
None
See application file for complete search history.

(56) References Cited

U.S. PATENT DOCUMENTS 6,144,838 A  11/2000  Sheehan
8,204,809 B1  6/2012  Wise
(Continued)

OTHER PUBLICATIONS

Melvin, Erin, 3 Methods To Assess Competencies, Jun. 28, 2018, eLearning Industry, https://elearningindustry.com/assess-competencies-3-methods, p. 1-7. (Year: 2018).*
(Continued)

*Primary Examiner* — Joseph M Waesco
(74) *Attorney, Agent, or Firm* — Foley & Lardner LLP

(57) ABSTRACT

Systems and methods for education instrumentation can include a computer system receiving assessment data indicative of performances of a plurality of respondents with respect to a plurality of assessment items. The computer system can determine, using the assessment data, item difficulty parameters of the plurality of assessment items and respondent ability parameters of the plurality of respondents. The computer system can determine item-specific parameters for each assessment item of the plurality of assessment items, using the item difficulty parameters of the plurality of assessment items and respondent ability parameters of the plurality of respondents. The computer system can determine contextual parameters common to the plurality of assessment items. The computer system can provide access to the item-specific parameters of the plurality of assessment items and the one or more contextual parameters.

20 Claims, 17 Drawing Sheets

(51) Int. Cl.
*G06Q 10/0639* (2023.01)
*G09B 19/00* (2006.01)

(56) References Cited

U.S. PATENT DOCUMENTS

| | | | |
|---|---|---|---|
| 9,530,329 B2* | 12/2016 | Rudolph | G09B 19/025 |
| 9,569,729 B1* | 2/2017 | Oehrle | G06Q 10/063 |
| 9,691,289 B2* | 6/2017 | Kullok | G09B 19/04 |
| 9,792,829 B2* | 10/2017 | Rudolph | G09B 7/077 |
| 10,102,764 B1 | 10/2018 | Berk et al. | |
| 10,515,562 B2 | 12/2019 | Essafi et al. | |
| 11,069,253 B2 | 7/2021 | Basumotari et al. | |
| 11,328,232 B2 | 5/2022 | Smith et al. | |
| 2002/0055870 A1 | 5/2002 | Thomas | |
| 2002/0198765 A1 | 12/2002 | Magrino et al. | |
| 2003/0039948 A1 | 2/2003 | Donahue | |
| 2003/0139956 A1 | 7/2003 | Guenther et al. | |
| 2003/0190593 A1 | 10/2003 | Wisnosky et al. | |
| 2003/0229529 A1 | 12/2003 | Mui et al. | |
| 2003/0232314 A1 | 12/2003 | Stout et al. | |
| 2004/0219504 A1 | 11/2004 | Hattie | |
| 2005/0196737 A1 | 9/2005 | Mann | |
| 2006/0072739 A1 | 4/2006 | Baggenstoss et al. | |
| 2006/0134593 A1 | 6/2006 | Kalous et al. | |
| 2006/0229505 A1* | 10/2006 | Mundt | A61B 5/16 128/920 |
| 2006/0282306 A1 | 12/2006 | Thissen-Roe | |
| 2007/0198317 A1 | 8/2007 | Harthcryde et al. | |
| 2008/0286737 A1 | 11/2008 | Cheng et al. | |
| 2010/0062411 A1 | 3/2010 | Bartholomew | |
| 2010/0233663 A1 | 9/2010 | Pennington et al. | |
| 2010/0273138 A1 | 10/2010 | Edmonds et al. | |
| 2011/0117534 A1 | 5/2011 | Berger et al. | |
| 2011/0276356 A1 | 11/2011 | Smith et al. | |
| 2011/0302100 A1 | 12/2011 | Selvakummar | |
| 2013/0149681 A1 | 6/2013 | Tinkler et al. | |
| 2013/0211238 A1* | 8/2013 | DeCharms | A61B 5/4848 600/407 |
| 2013/0288222 A1 | 10/2013 | Stacy et al. | |
| 2014/0024009 A1 | 1/2014 | Nealon et al. | |
| 2014/0122355 A1 | 5/2014 | Hardtke et al. | |
| 2014/0147822 A1 | 5/2014 | Yang | |
| 2014/0172417 A1* | 6/2014 | Monk, II | G06F 40/30 704/9 |
| 2015/0206443 A1 | 7/2015 | Aylesworth et al. | |
| 2015/0363795 A1 | 12/2015 | Levy et al. | |
| 2016/0196534 A1 | 7/2016 | Jarrett et al. | |
| 2016/0314255 A1 | 10/2016 | Cook et al. | |
| 2016/0364673 A1 | 12/2016 | Byham et al. | |
| 2016/0379510 A1 | 12/2016 | Rainey et al. | |
| 2017/0018198 A1* | 1/2017 | Lee | G09B 1/10 |
| 2017/0124894 A1* | 5/2017 | Essafi | G09B 7/00 |
| 2018/0025456 A1 | 1/2018 | Mihai et al. | |
| 2018/0308062 A1 | 10/2018 | Quitmeyer | |
| 2019/0009133 A1* | 1/2019 | Mettler May | G09B 19/0038 |
| 2019/0385471 A1 | 12/2019 | Harris et al. | |
| 2020/0074361 A1 | 3/2020 | Akatsuka et al. | |
| 2020/0135050 A1 | 4/2020 | Monge Nunez | |
| 2020/0242958 A1 | 7/2020 | Tufail et al. | |
| 2020/0302296 A1 | 9/2020 | Miller | |
| 2020/0302370 A1* | 9/2020 | Mathiesen | G06N 20/00 |
| 2020/0302810 A1* | 9/2020 | Lee | G01P 13/00 |
| 2020/0372034 A1 | 11/2020 | Jedrzejewski et al. | |
| 2022/0004890 A1* | 1/2022 | Essafi | G06N 5/022 |
| 2022/0058588 A1 | 2/2022 | Marty et al. | |
| 2022/0215317 A1 | 7/2022 | Marty et al. | |
| 2022/0265212 A1* | 8/2022 | Lindemann | G06N 7/01 |
| 2022/0284374 A1* | 9/2022 | Cahalane | G06Q 10/0633 |

OTHER PUBLICATIONS

Xing, Eric, Directed Graphical Models (Bayesian Networks), 2020, 10-708 Probablistic Graphical Models, https://www.cs.cmu.edu/~epxing/Class/10708-20/scribe/lec3_scribe.pdf, p. 1-12. (Year: 2020).*
US Non-Final Office Action on U.S. Appl. No. 17/362,621 dated Jan. 19, 2023 (27 pages).
International Preliminary Report on Patentability on PCT Appl. Ser. No. PCT/IB2021/055889 (8 pages).
International Preliminary Report on Patentability on PCT Appl. Ser. No. PCT/IB2021/055928 (8 pages).
International Preliminary Report on Patentability on PCT Appl. Ser. No. PCT/IB2021/055939 (8 pages).
International Preliminary Report on Patentability on PCT Appl. Ser. No. PCT/IB2021/055940 (8 pages).
International Search Report and Written Opinion on PCT Appl. Ser. No. PCT/IB2021/055889 dated Oct. 5, 2021 (14 pages).
International Search Report and Written Opinion on PCT Appl. Ser. No. PCT/IB2021/055928 dated Oct. 29, 2021 (13 pages).
International Search Report and Written Opinion on PCT Appl. Ser. No. PCT/IB2021/055939 dated Oct. 18, 2021 (13 pages).
International Search Report and Written Opinion on PCT Appl. Ser. No. PCT/IB2021/055940 dated Oct. 18, 2021 (13 pages).
US Non-Final Office Action on U.S. Appl. No. 17/364,516 dated Aug. 4, 2022 (29 pages).
US Final Office Action on U.S. Appl. No. 17/364,516 dated Apr. 5, 2023 (34 pages).
US Non-Final Office Action on U.S. Appl. No. 17/412,401 dated Aug. 4, 2023 (14 pages).
US Final Office Action on U.S. Appl. No. 17/362,621 dated Aug. 3, 2023 (35 pages).
US Non-Final Office Action on U.S. Appl. No. 17/362,668 dated May 19, 2023 (41 pages).
US Non-Final Office Action on U.S. Appl. No. 17/459,522 dated Jul. 20, 2023 (12 pages).
Non-Final Office Action on U.S. Appl. No. 17/459,522 DTD Sep. 29, 2024.
Tam et al., "A new framework of concept clustering and learning path optimization to develop the next-generation e-learning systems", Oct. 25, 2014, retrieved from the internet: https://link.springer.com/article/10.1007/s40692-014-0016-8.
U.S. Final Office Action on U.S. Appl. No. 17/362,668 dated Jan. 10, 2024 (50 pages).
U.S. Final Office Action on U.S. Appl. No. 17/364,516 dated Apr. 25, 2024 (22 pages).
U.S. Final Office Action on U.S. Appl. No. 17/412,401 dated May 6, 2024 (9 pages).
U.S. Final Office Action on U.S. Appl. No. 17/459,522 dated Apr. 5, 2024 (11 pages).
U.S. Non-Final Office Action on U.S. Appl. No. 17/364,516 dated Sep. 25, 2023 (24 pages).
U.S. Non-Final Office Action on U.S. Appl. No. 17/362,621 dated Mar. 19, 2024.
U.S. Non-Final Office Action on U.S. Appl. No. 17/409,457 dated Feb. 26, 2024 (13 pages).
U.S. Non-Final Office Action on U.S. Appl. No. 17/410,835 dated Mar. 26, 2024 (25 pages).
U.S. Non-Final Office Action on U.S. Appl. No. 17/364,516 dated Nov. 1, 2024 (26 pages).

* cited by examiner

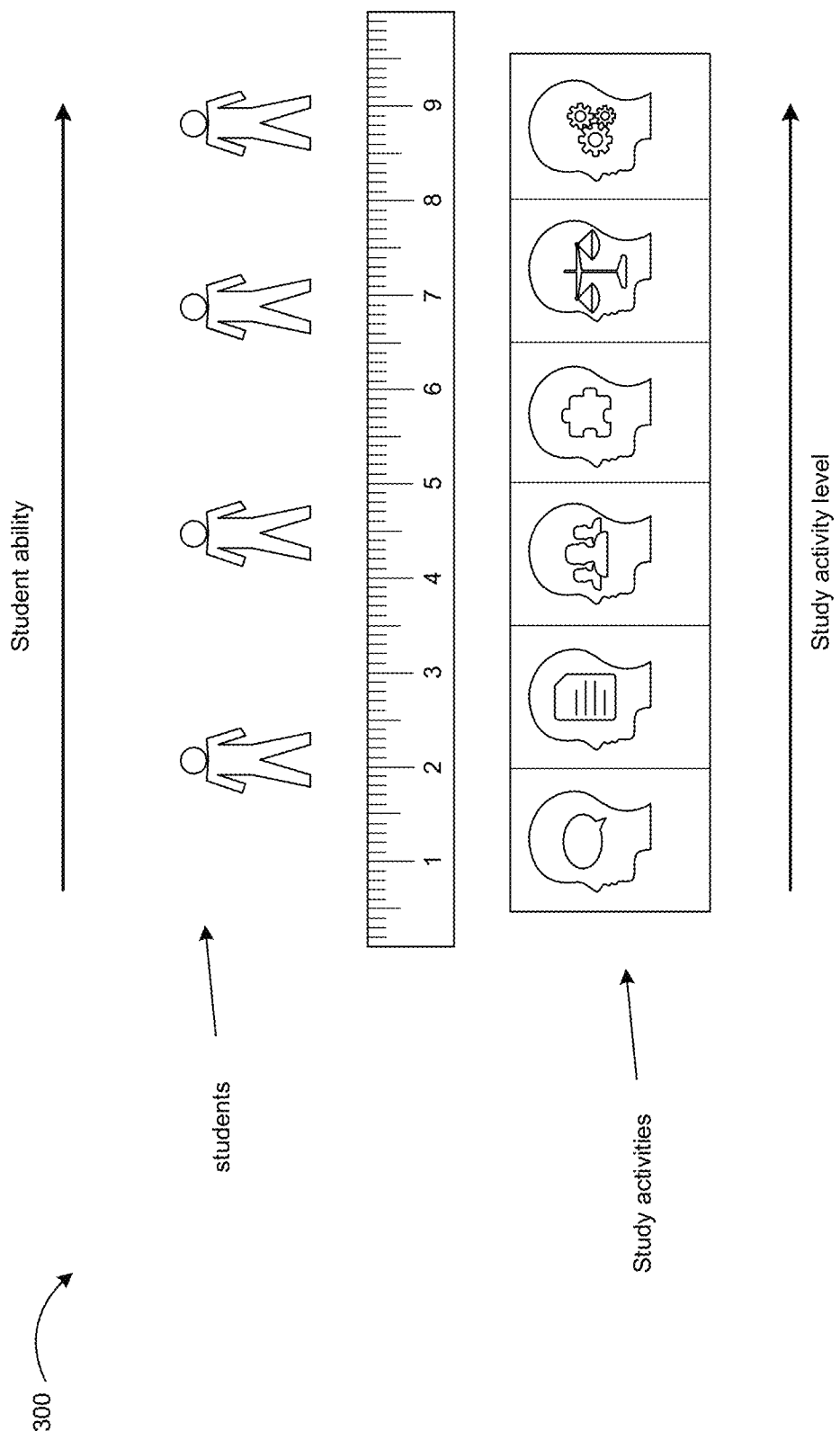

SYSTEMS AND METHODS FOR PROVIDING KNOWLEDGE BASES OF ASSESSMENT ITEMS

CROSS REFERENCE TO RELATED APPLICATIONS

This application claims priority to, and the benefit of, U.S. Provisional Application No. 63/046,805 filed on Jul. 1, 2020, and entitled "STUDENT ABILITIES RECOMMENDATION ASSISTANT," the content of which is incorporated herein by reference in its entirety.

FIELD OF THE DISCLOSURE

The present application relates generally to systems and methods for analytics and artificial intelligence in the context of assessment of individuals participating in learning processes, trainings and/or activities that involve or require certain skills, competencies and/or knowledge. Specifically, the present application relates to computerized methods and systems for objectively determining and providing a knowledge base of latent traits of assessment items used to evaluate or assess evaluates or respondents.

BACKGROUND

In their struggle to build competitive economies, countries around the world are putting increasing emphasis on reforming their education systems as well as professional training for their workforce. The success of this effort depends on multiple factors including the policies adopted, the budget set for such policies, the curricula used at different levels, and the knowledge and experience of educators, among others. Finding insights based on available data and improving output of education or learning processes based on the data can be technically challenging and difficult considering the complexity and the multi-dimensional nature of learning processes as well as the subjectivity that may be associated with some assessment procedures.

SUMMARY

According to at least one aspect, a method can include receiving, by a computer system including one or more processors, assessment data indicative of performances of a plurality of respondents with respect to a plurality of assessment items. The computer system can determine, using the assessment data, (i) a difficulty level for each assessment item of the plurality of assessment items, and (ii) an ability level for each respondent of the plurality of respondents. The computer system can determine, for each assessment item of the plurality of assessment items, one or more item-specific parameters indicative of one or more characteristics of the assessment item using difficulty levels for the plurality of assessment items and ability levels for the plurality of respondents. The one or more item-specific parameters of the assessment item can include at least one of an item importance value or an item entropy. The computer system can determine one or more contextual parameters using the item difficulty parameters and the respondent ability parameters. The one or more contextual parameters indicative of at least one of an aggregate characteristic of the plurality of assessment items or an aggregate characteristic of the plurality of respondents. The computer system can provide access to the item-specific parameters of the plurality of assessment items and the one or more contextual parameters.

According to at least one aspect, a system can include one or more processors and a memory storing computer code instructions. The computer code instructions when executed by the one or more processors, can cause the one or more processors to receive assessment data indicative of performances of a plurality of respondents with respect to a plurality of assessment items. The one or more processors can determine, using the assessment data, (i) a difficulty level for each assessment item of the plurality of assessment items, and (ii) an ability level for each respondent of the plurality of respondents. The one or more processors can determine, for each assessment item of the plurality of assessment items, one or more item-specific parameters indicative of one or more characteristics of the assessment item using difficulty levels for the plurality of assessment items and ability levels for the plurality of respondents. The one or more item-specific parameters of the assessment item can include at least one of an item importance value or an item entropy. The one or more processors can determine one or more contextual parameters using the difficulty levels and the ability levels. The one or more contextual parameters can be indicative of at least one of an aggregate characteristic of the plurality of assessment items or an aggregate characteristic of the plurality of respondents. The one or more processors can provide access to the item-specific parameters of the plurality of assessment items and the one or more contextual parameters.

According to at least one aspect, a non-transitory computer-readable medium can include computer code instructions stored thereon. The computer code instructions, when executed by one or more processors, can cause the one or more processors to receive assessment data indicative of performances of a plurality of respondents with respect to a plurality of assessment items. The one or more processors can determine, using the assessment data, (i) a difficulty level for each assessment item of the plurality of assessment items, and (ii) an ability level for each respondent of the plurality of respondents. The one or more processors can determine, for each assessment item of the plurality of assessment items, one or more item-specific parameters indicative of one or more characteristics of the assessment item using difficulty levels for the plurality of assessment items and ability levels for the plurality of respondents. The one or more item-specific parameters of the assessment item can include at least one of an item importance value or an item entropy. The one or more processors can determine one or more contextual parameters using the item difficulty parameters, the item discrimination parameters and the respondent ability parameters. The one or more contextual parameters can be indicative of at least one of an aggregate characteristic of the plurality of assessment items or an aggregate characteristic of the plurality of respondents. The one or more processors can provide access to the item-specific parameters of the plurality of assessment items and the one or more contextual parameters.

BRIEF DESCRIPTION OF THE DRAWINGS

FIG. 3 shows a diagram illustrating the correlation between respondents' abilities and tasks' difficulties, according to one or more embodiments.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes an Item Response Theory (IRT) based analysis.

Section C describes generating a knowledge base of assessment Items.

Section D describes generating a knowledge base of respondents/evaluatees.

Section E describes generating a universal knowledge base of assessment items.

Section F describes generating a universal knowledge base of respondents/evaluatees.

A. Computing and Network Environment

Figure 1A:
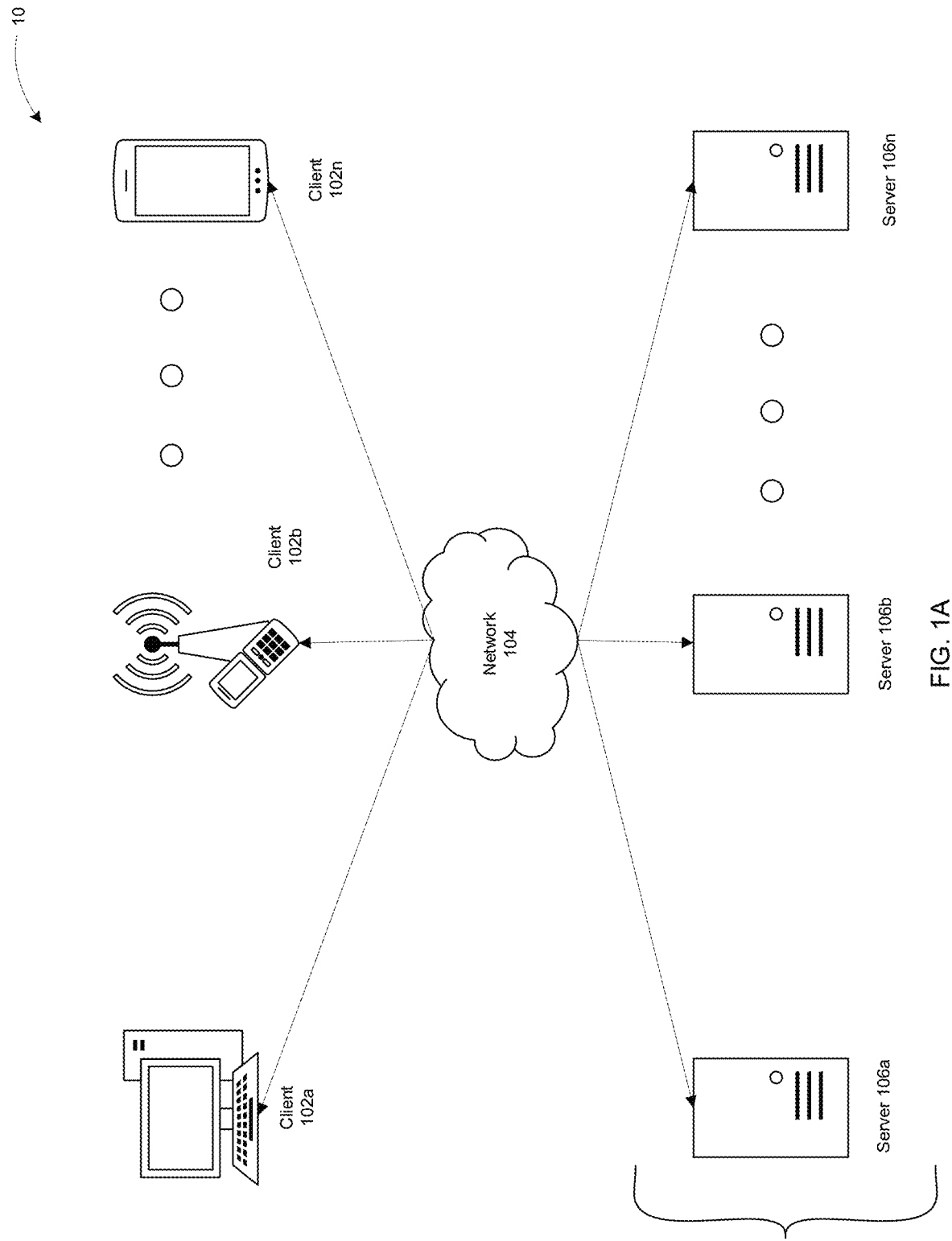
FIG. 1A is a block diagram depicting an embodiment of a network environment comprising local devices in communication with remote devices.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
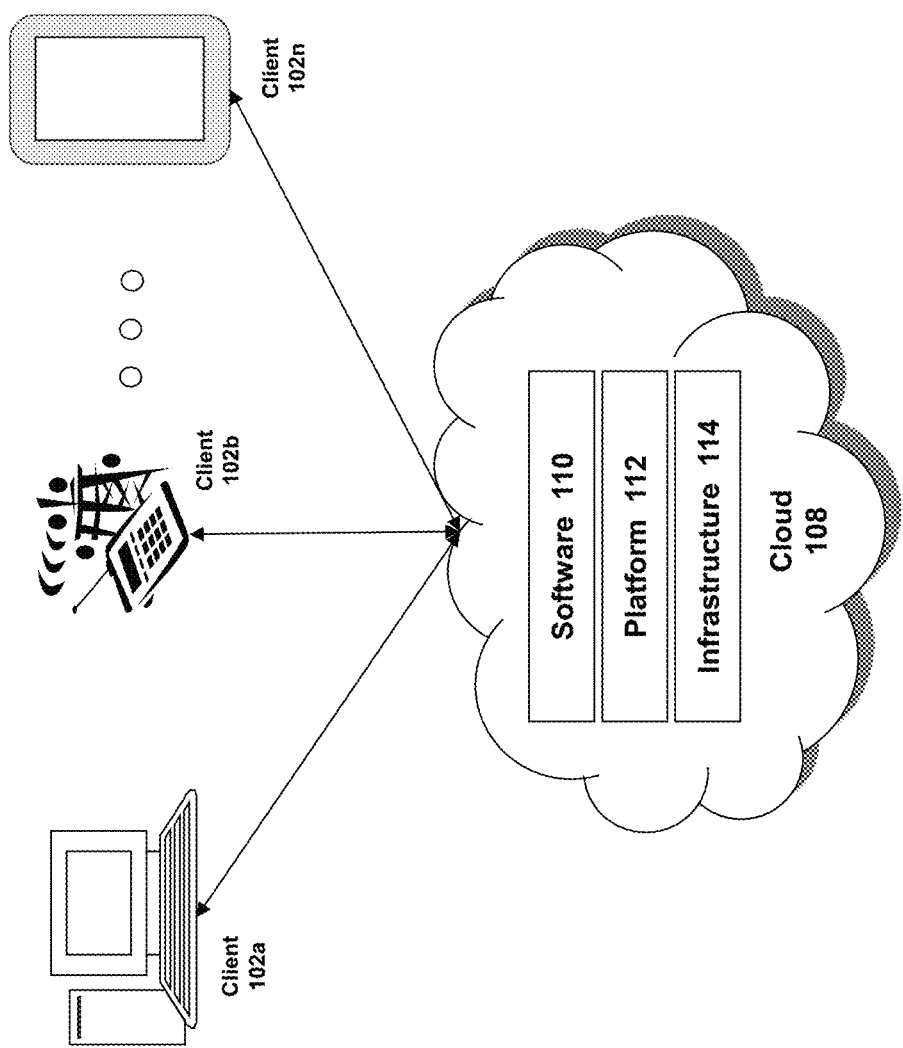
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
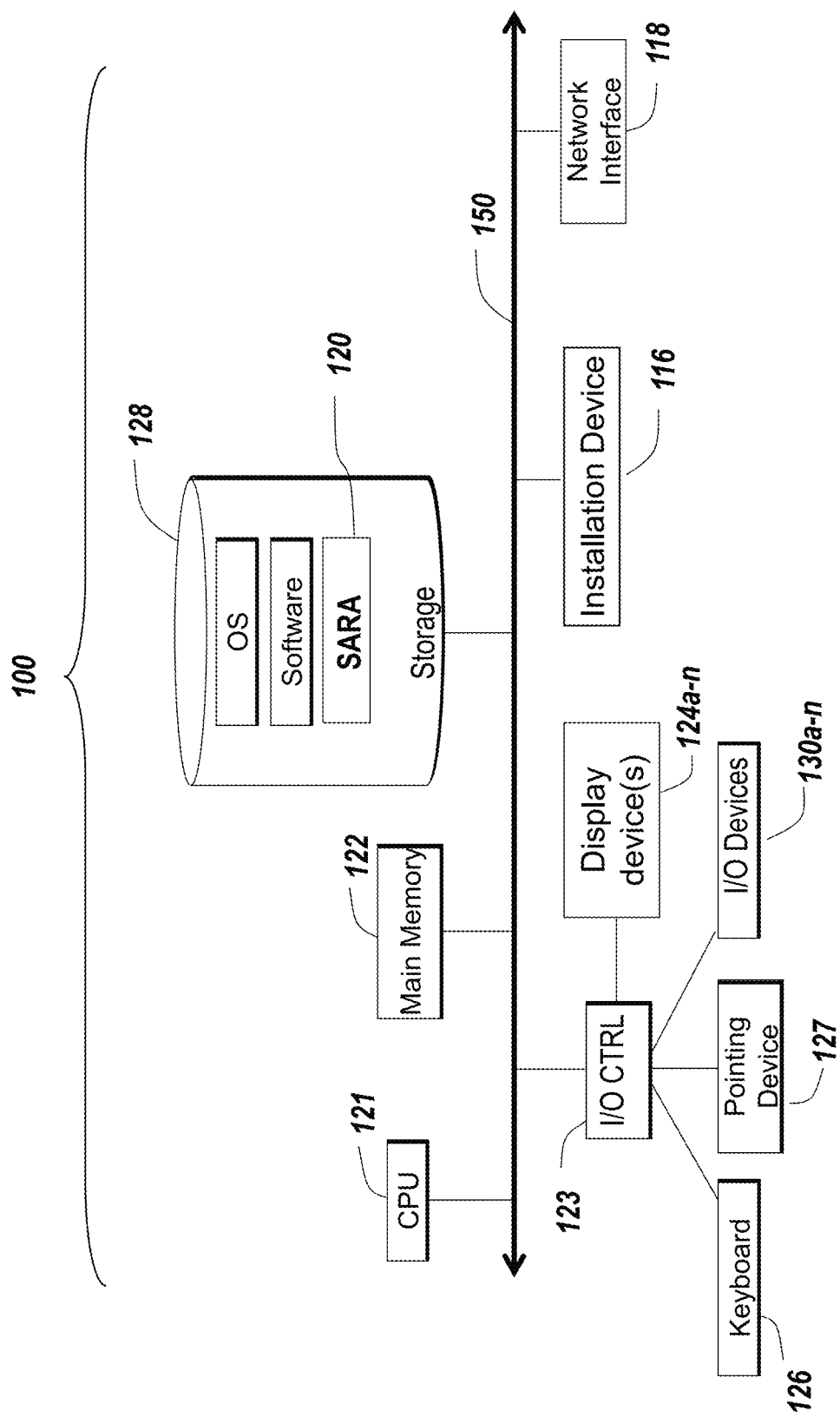
Figure 1D:
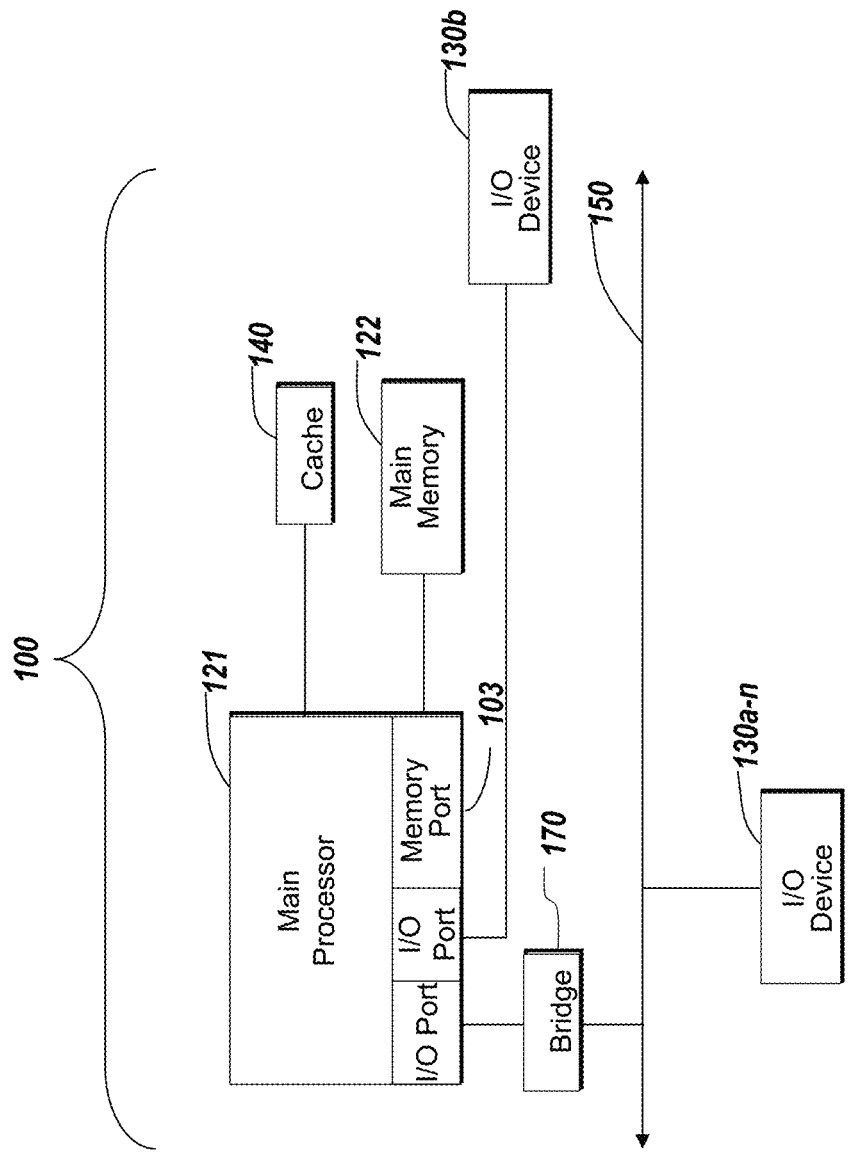

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a learner abilities recommendation assistant (LARA) software 120. The storage 128 may also include parameters or data generated by the LARA software 120, such as a tasks' knowledge base repository, a learners' knowledge base repository and/or a teachers' knowledge base repository. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the LARA software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Item Response Theory (IRT) Based Analysis

In the fields of education, professional competencies and development, sports and/or arts, among others, individuals are evaluated and assessment data is used to track the performance and progress of each evaluated individual, referred to hereinafter as evaluatee. The assessment data for each evaluatee usually includes performance scores in relation with respect to different assessment items. However, the assessment data usually carries more information than the explicit performance scores. Specifically, various latent traits of evaluatees and/or assessment items can be inferred from the assessment data. However, objectively determining such traits is technically challenging considering the number of evaluatees and the number of assessment items as well as possible interdependencies between them.

In the context of education, for example, the output of a teaching/learning process depends on learners' abilities at the individual level and/or the group level as well as the difficulty levels of the assessment items used. Each evaluatee may have different abilities with respect to distinct assessment items. In addition, different abilities of the same evaluatee or different evaluatees can change or progress differently over the course of the teaching/learning process. These facts are not specific to education or teaching/learning processes only, but are also true in the context of professional development, sports, arts and other fields that involve the assessment of respective members.

An evaluatee is also referred to herein as a respondent or a learner and can include an elementary school student, a middle school student, a high school student, a college student, a graduate student, a trainee, an apprentice, an employee, a mentee, an athlete, a sports player, a musician, an artist or an individual participating in a program to learn new skills or knowledge, among others. A respondent can include an individual preparing for or taking a national exam, a regional exam, a standardized exam or other type of tests such as, but not limited to, the Massachusetts Comprehensive Assessment System (MCAS) or other similar state assessment test, the Scholastic Aptitude Test (SAT), the Graduate Record Examinations (GRE), the Graduate Management Admission Test™ (GMAT), the Law School Admission Test (LSAT), bar examination tests or the United States Medical Licensing Examination® (USMLE), among others. In general, a learner or respondent can be an individual whose skills, knowledge and/or competencies are evaluated according to a plurality of assessment items.

The term respondent, as used herein, refers to the fact that an evaluatee responds, e.g., either by action or by providing oral or written answers, to some assignments, instructions, questions or expectations, and the evaluatees are assessed based on respective responses according to a plurality of assessment items. An assessment item can include an item or component of a homework, quiz, exam or assignment, such as a question, a sub-question, a problem, a sub-problem or an exercise or component. The assessment item can include a task, such as a sports or athletic drill or exercise, reading musical notes, identified musical notes being played, playing or tuning an instrument, singing a song, performing an experiment, writing a software code or performing an activity or task associated with a given profession or training, among others.

The assessment item can include a skill or a competency item that is evaluated, for each respondent, based on one or more performances of the respondent. For example, in the context of professional development, an employee, a trainee or an intern can be evaluated, e.g., on a quarterly basis, a half-year basis or on a yearly basis, by respective managers with respect to a competency framework based on the job performances of the employee, the trainee or the intern. The competency framework can include a plurality of competencies and/or skills, such as communication skills, time management, technical skills. A competency or skill can include one or more competency items. For example, communication skills can include writing skills, oral skills, client communications and/or communication with peers. The assessment with respect to each competency or each competency item can be based on a plurality of performance or proficiency levels, such as "Significantly Needing Improvement," "Needing Improvement," "Meeting Target/Expectation," "Exceeding Target/Expectation" and "Significantly Exceeding Target/Expectation." Other performance or proficiency levels can be used. A target can be defined, for example, in terms of dollar amount (e.g., for sales people), in terms of production output (e.g., for manufacturing workers), in billable hours (e.g., for consultants and lawyers), or in terms of other performance scores or metrics.

Teachers, instructors, coaches, trainers, managers, mentors or evaluators in general can design an assessment (or measurement) tool or instrument as a plurality of assessment items grouped together to assess respondents or learners. In the context of education, the assessment tool or instrument can include a set of questions grouped together as a single test, exam, quiz or homework. The assessment tool or instrument can include a set of sport drills, a set of music practice activities, or a set professional activities or skills, among others, that are grouped together for assessment purposes or other purposes. During a sports tryout or a sports practice, a set of sport skills, such as speed, physical endurance, passing a ball or dribbling, can be assessed using a set of drills or physical tasks performed by players. In such a case, the assessment instrument can be the set of sport skills tested or the set of drills performed by the players depending, for example, on whether the evaluation is performed per skill or per drill. In the context of professional evaluation and development, an assessment instrument can be an evaluation questionnaire filled or to be filled by evaluators, such as managers. In general, an assessment tool or instrument is a collection of assessment items grouped together to assess respondents with respect to one or more skills or competencies.

Performance data (or assessment data) including performance scores for various respondents with respect to different assessment items can be analyzed to determine latent traits of respondents and the assessment items. The analysis can also provide insights, for example, with regard to future actions that can be taken to enhance the competencies or skills of respondents. To achieve reliable analysis results, the analysis techniques or tools used should take into account the causality and/or interdependencies between various assessment items. For instance, technical skills of a respondent can have an effect on the competencies of efficiency and/or time management of the respondent. In particular, a respondent with relatively strong technical skills is more likely to execute technical assignments efficiently and in a timely manner. An analysis tool or technique that takes into account the interdependencies between various assessment items and/or various respondents is more likely to provide meaningful and reliable insights.

Furthermore, the fact that respondents are usually assessed across different subjects or competencies calls for assessment tools or techniques that allow for cross-subject and/or cross-functional analysis of assessment items. Also, to allow for comprehensive analysis, it is desirable that the analysis tools or techniques used allow for combining multiple assessment instruments and analyzing them in combination. Multiple assessment instruments that are correlated in time can be used to assess the same group of respondents/learners. Since the abilities of respondents/learners usually progress over time, it is desirable that the evaluations of the respondents/learners based on the multiple assessment instruments be made simultaneously or within a relatively short period of time, e.g., within few days or few weeks.

Item Response Theory (IRT) is an example analysis technique/tool that addresses the above discussed analysis issues. IRT can be viewed as a probabilistic branch or approach of psychometric theory. Specifically, the IRT models the relationships between latent traits (unobserved characteristics) of respondents and/or assessment items and their manifestations (e.g., observed outcomes or performance scores) using a family of probabilistic functions. The IRT approach considers two main latent traits, which are a respondent's ability and an assessment item difficulty. Each respondent has a respective ability and each assessment item has a respective difficulty. The IRT approach assumes that the responses or performance scores of the respondents with respect to each assessment item probabilistically depend on the abilities of the respondents and an the difficulty of that assessment item. The probabilistic relationship between the difficulty of the assessment item, the abilities of the respondents and responses or performance scores of the respondents with respect to the assessment item can be depicted in an item characteristic curve (ICC).

Figure 2:
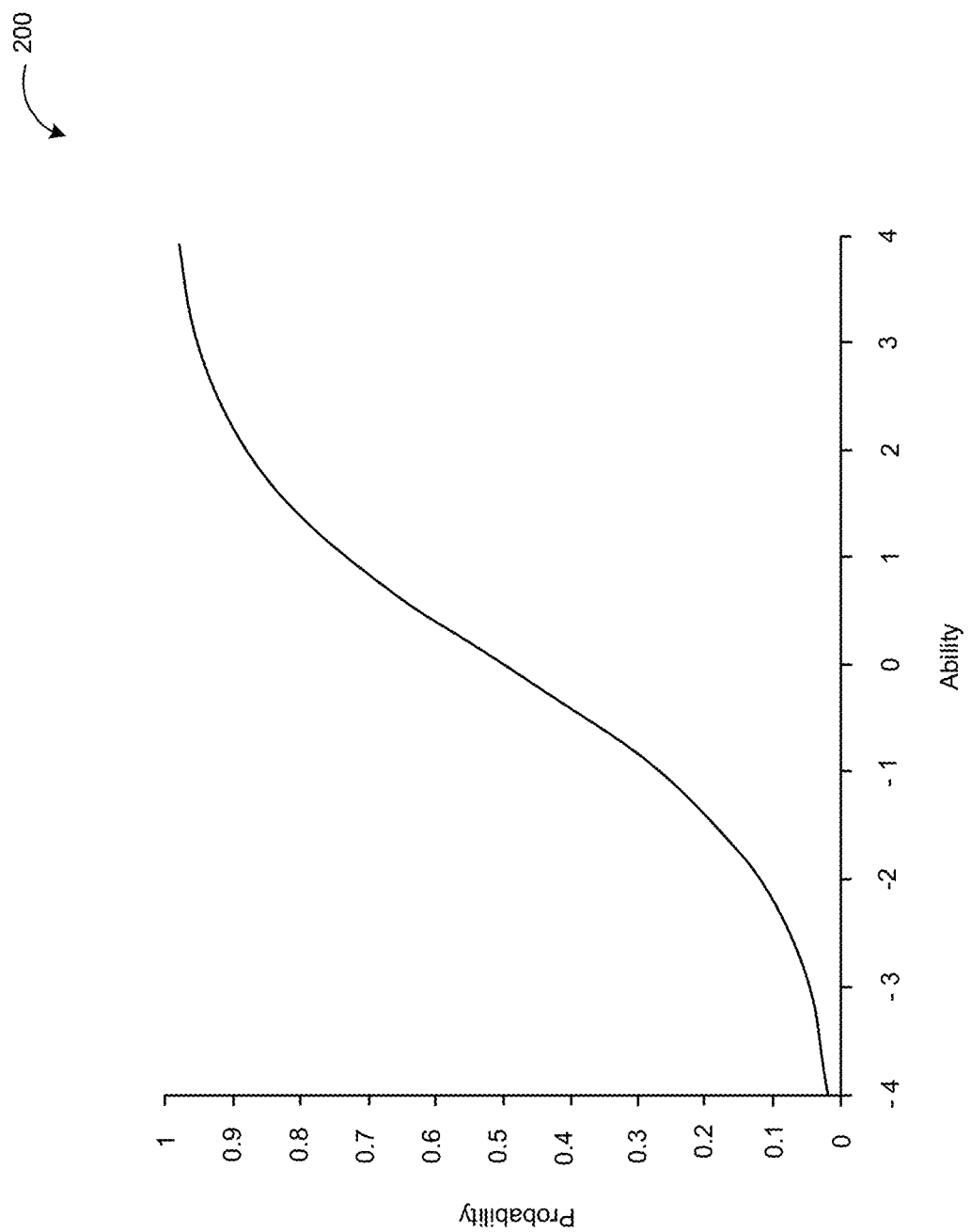
FIG. 2 shows an example of an item characteristic curve (ICC) for an assessment item.

Referring to FIG. 2, an example of an item characteristic curve (ICC) 200 for an assessment item is shown. The x-axis represents the possible range of respondent ability for the assessment item, and the y-axis represents the probability of respondent's success in the assessment item. The respondent's success can include scoring sufficiently high in the assessment item or answering a question associated with the assessment item correctly. In the example of FIG. 2, the learner ability can vary between $-\infty$ and $\infty$, and a respondent ability that is equal to 0 represents the respondent ability required to have a success probability of 0.5. As illustrated by the ICC 200, the probability is a function of the respondent ability, and the probability of success (or of correct response) increases as the respondent ability increases. Specifically, the ICC 200 is a monotonically increasing cumulative distribution function in terms of the respondent ability.

Besides monotonicity, unidimensionality is another characteristic of IRT models. Specifically, each ICC 200 or probability distribution function for a given assessment item is a function of a single dominant latent trait to be measured, which is respondent ability. A further characteristic or assumption associated with IRT is local independence of IRT models. That is, the responses to different assessment items are assumed to be mutually independent for a given respondent ability level. Another characteristic or assumption is invariance, which implies the estimation of the assessment item parameters from any position on the ICC 200. As a consequence, the parameters can be estimated from any group of respondents who have responded to, or were evaluated in, the assessment item. Under IRT, the ability of a learner or a respondent under measure does not change due to sample characteristics.

Let $R=\{r_1, \ldots, r_n\}$ be a set of n respondents (or learners), where n is an integer that represents the total number of respondents. As discussed above, the respondents $r_1, \ldots, r_n$ can include students, sports players or athletes, musicians or other artists, employees, trainees, mentees, apprentices or individuals engaging in activities where the performance of the individuals is evaluated, among others. Let $T=\{t_1, \ldots, t_m\}$ be a set of m assessment items used to assess or evaluate the set of respondents R, where m is an integer representing the total number of assessment items. The set of responses or performance scores of all the respondents for each assessment item $t_j$ can be denoted as a vector $a_j$. The vector $a_j$ can be described as $a_j=[a_{1,j}, \ldots, a_{n,j}]^T$, where each entry $a_{i,j}$ represents the response or performance score of respondent $r_i$ in the assessment item (or task) $t_j$.

The IRT approach is designed to receive, or process, dichotomous data having a cardinality equal to two. In other words, each of the entries $a_{i,j}$ can assume one of two predefined values. Each entry $a_{i,j}$ can represent the actual response of respondent $r_i$ with respect to assessment (or task) $t_j$ or an indication of a performance score thereof. For example, in a YES or No question, the entry $a_{i,j}$ can be equal to 1 to indicate a YES answer or equal to 0 to indicate a NO answer. In some implementations, the entry $a_{i,j}$ can be indicative of a success or failure of the respondent $r_i$ in the assessment item (or task) $t_j$.

The input data to the IRT analysis tool can be viewed as a matrix M where each row represents or includes performance data of a corresponding respondent and each column represents or includes performance data for a corresponding assessment item (or task). As such, each entry $M_{i,j}$ of the matrix M can be is equal to the response or performance score $a_{i,j}$ of respondent $r_i$ with respect to assessment item (or task) $t_j$, i.e., $$M = \begin{bmatrix} a_{1,1} & \cdots & a_{1,m} \\ \vdots & \ddots & \vdots \\ a_{n,1} & \cdots & a_{n,m} \end{bmatrix}$$

In some implementations, the columns can correspond to respondents and the rows can correspond to the assessment items. The input data can further include, for each respondent $r_i$, a respective total score St. The respective total score Si can be a Boolean number indicative of whether the aggregate performance of respondent $r_i$ in the set of assessment items $t_1, \ldots, t_m$ is a success or failure. For example, Si can be equal to 1 to indicate that the aggregate performance of respondent $r_1$ is a success, or can be equal to 0 to indicate that aggregate performance of respondent $r_i$ is a failure. In some implementations, the total score Si can be an actual score value, e.g., an integer, a real number or a letter grade, reflecting the aggregate performance of the respondent $r_i$.

The set of assessment items $T=\{t_1, \ldots, t_m\}$ can represent a single assessment instrument. In some implementations, the set of assessment items T can include assessment items from various assessment instruments, e.g., tests, exams, homeworks or evaluation questionnaires that are combined together in the analysis process. The assessment instruments can be associated with different subjects, different sets of competencies or skills, in which case the analysis described below can be a cross-field analysis, a cross-subject analysis, a cross-curricular analysis and/or a cross-functional analysis.

Table 1 below illustrates an example set of assessment data or input matrix (also referred to herein as observation/observed data or input data) for the IRT tool. The assessment data relates to six assessment items (or tasks) $t_1, t_2, t_3, t_4, t_5$ and $t_6$, and 10 distinct respondents (or learners) $r_1, r_2, r_3, r_4, r_5, r_6, r_7, r_8, r_9$ and $r_{10}$. The assessment data is dichotomous or binary data, where the response or performance score (or performance indicator) for each respondent at each assessment item can be equal to either 1 or 0, where 1 represents "success" or "correct" and 0 represents "fail" or "wrong". The term "NA" indicates that the response or performance score/indicator for the corresponding respondent-assessment item pair is not available.

TABLE 1

Response matrix of dichotomous assessment items.

|  | $t_1$ | $t_2$ | $t_3$ | $t_4$ | $t_5$ | $t_6$ |
|---|---|---|---|---|---|---|
| $r_1$ | 0 | 1 | 1 | 0 | 0 | 1 |
| $r_2$ | 1 | 0 | 1 | 1 | NA | 0 |
| $r_3$ | 0 | 1 | 1 | NA | NA | NA |
| $r_4$ | 0 | 1 | 0 | 0 | 1 | 1 |
| $r_5$ | 1 | 0 | 1 | 0 | 1 | 0 |
| $r_6$ | 0 | 1 | 0 | 0 | 1 | 1 |
| $r_7$ | 0 | 1 | 1 | 1 | NA | 0 |
| $r_8$ | 0 | 1 | 0 | 1 | 0 | 0 |
| $r_9$ | 1 | 0 | 1 | 0 | 1 | 0 |
| $r_{10}$ | 0 | 1 | 1 | 0 | 0 | 1 |

The IRT approach can be implemented into an IRT analysis tool, which can be a software module, a hardware module, a firmware module or a combination thereof. The IRT tool can receive the assessment data, such as the data in Table 1, as input and provide the abilities for various respondents and the difficulties for various assessment items as output. The respondent ability of each respondent $r_i$ is denoted herein as $\theta_i$, and the difficulty of each assessment item $t_j$ is denoted herein as $\beta_j$. As part of the IRT analysis, the IRT tool can construct a respondent-assessment item scale or continuum. As respondents' abilities vary, their position on the latent construct's continuum (scale) changes and is determined by the sample of learners or respondents and assessment item parameters. An assessment item is desired to be sensitive enough to rate the learners or respondents within the suggested unobservable continuum. On this scale both the respondent ability $\theta_i$ and the task difficulty $\beta_j$ can range from $-\infty$ to $+\infty$.

FIG. 3 shows a diagram illustrating the correlation between respondents' abilities and difficulties of assessment items. An advantage of IRT is that both assessment items (or tasks) and respondents or learners can be placed on the same scale, usually a standard score scale with mean equal to zero and a standard deviation equal to one, so that learners can be compared to items and vice-versa. As respondents' abilities vary, their position on the latent construct's continuum (scale) changes. On one hand, the more difficult the assessment items are the more their ICC curves are shifted to the right of the scale, indicating that a higher ability is needed for a respondent to succeed in the assessment item. On the other hand, the easier the assessment items are, the more their ICC curves are shifted to the left of the ability scale. Assessment item difficulty $\beta_j$ is determined at the point of median probability or the ability at which 50% of learners or respondents succeed in the assessment item.

Another latent task trait that can be measured by some IRT models is assessment item discrimination denoted as $\alpha_j$. It is defined as the rate at which the probability of correctly performing the assessment item $t_j$ changes given the respondent ability levels. This parameter is used to differentiate between individuals possessing similar levels of the latent construct of interest. The scale for assessment item discrimination can range from $-\infty$ to $+\infty$. The assessment item discrimination $\alpha_j$ is a measure of how well an assessment item can differentiate, in terms of performance, between learners with different abilities.

In a dichotomous setting, given a respondent or learner $r_i$ with ability $\theta_i$ and an assessment item $t_j$ with difficulty $\beta_j$ and discrimination $\alpha_j$, then the probability that respondent or learner $r_i$ performs the task $t_j$ correctly is defined as:

$$P_{i,j} = P(a_{ij} = 1 \mid \theta_i, \beta_j, \alpha_j) = \frac{e^{\alpha_j(\theta_i - \beta_j)}}{1 + e^{\alpha_j(\theta_i - \beta_j)}}. \quad (1)$$

The IRT models can also incorporate a pseudo-guessing item parameter $g_j$ to account for the nonzero likelihood of succeeding in an assessment item $t_j$ by guessing or by chance. Taking the pseudo-guessing item parameter $g_j$ into account, the probability that respondent or learner $r_i$ succeeds in assessment item $t_j$ (or achieves becomes:

$$P_{i,j} = P(a_{ij} = 1 \mid \theta_i, \beta_j, \alpha_j, g_j) = g_j + (1 - g_j)\frac{e^{\alpha_j(\theta_i - \beta_j)}}{1 + e^{\alpha_j(\theta_i - \beta_j)}}. \quad (2)$$

Figure 4A:
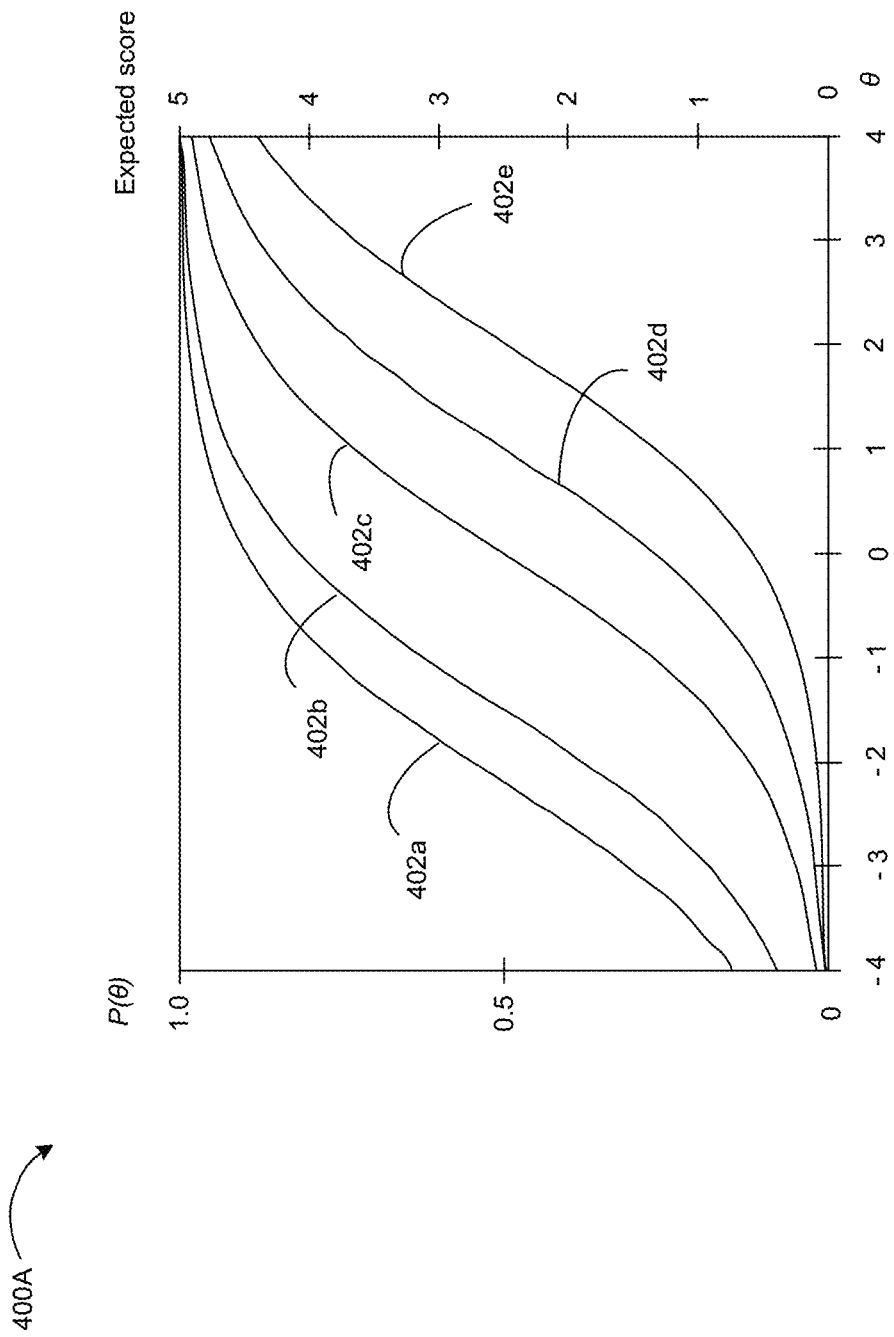
FIGS. 4A and 4B show a graph illustrating various ICCs for various assessment items and another grave illustrating representing the expected aggregate (or total) score, according to example embodiments.
Figure 4B:
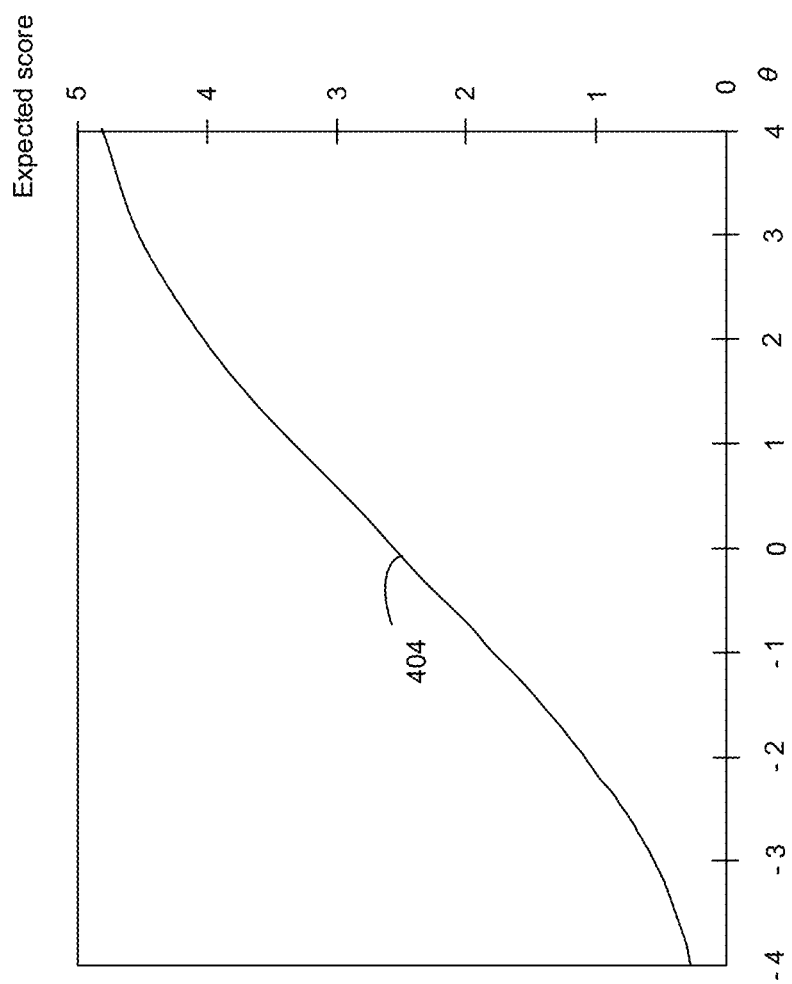

Referring to FIG. 4A, a graph 400A illustrating various ICCs 402a-402e for various assessment items is shown, according to example embodiments. FIG. 4B shows a graph 400B illustrating a curve 404 of the expected aggregate (or total) score, according to example embodiments. The expected aggregate score can represent the expected total performance score for all the assessment items. If the performance score for each assessment item is either 1 or 0, the aggregate (or total) performance score for the five assessment items can be between 0 and 5. For example, in FIG. 4A, the curves 402a-402e represent ICCs for five different assessment items. Each assessment item has a corresponding ICC, which reflects the probabilistic relationship between the ability trait and the respondent score or success in the assessment item.

The curve 404 depicts the expected aggregate (or total) score $\hat{S}(\theta)$ of all five assessment items or tasks at different ability levels. The IRT tool can determine the curve 404 by determining for each ability level $\theta$ the expected total score (of a respondent having an ability equal to $\theta$) using the conditional probability distribution functions (or the corresponding ICCs 402a-402e) of the various assessment items. Treating the performance score for each assessment item $t_j$ as a random variable $s_j(\theta)$, the expected aggregate score can be viewed as the expectation of another random variable defined as $\Sigma_{j=1}^m s_j(\theta)$. The IRT tool can compute the expected aggregate score as the sum of expectations $\Sigma_{j=1}^m E[s_j(\theta)]$, where $E[s_j(\theta)]$ represents the expected score for assessment item $t_j$. Given that random variables $s_j(\theta)$ are Bernoulli random variables, IRT tool can determine the expected aggregate score as a function of $\theta$ by summing up the ICCs 402a-402e. In the case where different weights may be assigned to different assessment items, the IRT tool can determine the expected aggregate score as a weighted sum of the ICCs 402a-402e.

The IRT tool can apply the IRT analysis to the input data to estimate the parameters $\beta_j$ and $\alpha_j$ for various assessment items $t_j$ and estimate the abilities $\theta_i$ for various respondents or learners $r_i$. There are at least three estimation methods that can be used to determine the parameters $\beta_j$, $\alpha_j$ and $\theta_i$ for various assessment items and various respondents. These are the joint maximum likelihood (JML), the marginal maximum likelihood (MML), and the Bayesian estimation. In the following, the JML method is briefly described. The JML method allows for simultaneous estimation of the parameters $\beta_j$, $\alpha_j$ and $\theta_i$ for $i=1, \ldots, n$ and $j=1, \ldots, m$.

The probability of the observed results matrix M, given the abilities $\theta=[\theta_1, \ldots, \theta_n]$ of the learners or respondents $r_i$ where $i=1, \ldots, n$, can be expressed by the following likelihood function:

$$L = P(M|\theta) = \Pi_{i=1}^n \Pi_{j=1}^m (P_j(\theta_i))^{a_{i,j}} (1-P_j(\theta_i))^{(1-a_{i,j})}. \quad (3)$$

It is to be noted that $P_{i,j} = P_j(\theta_i)$. Taking the natural log of equation (3) yields:

$$\ln L = \Sigma_{i=1}^n \Sigma_{j=1}^m a_{i,j} \ln P_j(\theta_i) + (1-a_{i,j}) \ln(1-P_j(\theta_i)). \quad (4)$$

The likelihood equation for a given parameter vector of interest $\theta$, or respectively $\beta=[\beta_1, \ldots, \beta_m]$ or $\alpha=[\alpha_1, \ldots, \alpha_m]$, is obtained by setting the first derivative of equation (4) with respect to $\theta$, or respectively $\beta$ or $\alpha$, equal to zero.

The JML algorithm proceeds as follows:

Step 1: In the first step, the IRT tool sets ability estimates to initial fixed values, usually based on the learners' (or respondents') raw scores, and calculates estimates for the task parameters $\alpha$ and $\beta$.

Step 2: In the second step, the IRT tool now treats the newly estimated task parameters as fixed, and calculates estimates for ability parameters $\theta$.

Step 3: In the third step, the IRT tool sets the difficulty and ability scales by fixing the mean of the estimated ability parameters to zero.

Step 4: In the fourth step, the IRT tool calculates new estimates for the task parameters $\alpha$ and $\beta$ while treating the newly estimated and re-centered ability estimates as fixed.

By estimating the parameter vectors $\alpha$, $\beta$ and $\theta$, the IRT tool can determine the ICCs for the various assessment items $t_j$ or the corresponding probability distribution functions. As depicted in FIG. 4A, each ICC is a continuous probability function representing the probability of respondent success in a corresponding assessment item $t_j$ as a function of respondent ability $\theta$ given the assessment item parameters $\beta_j$ and $\alpha_j$ as depicted by equation (1) (or given the assessment item parameters $\beta_j$, $\alpha_j$ and $g_j$ as depicted by equation (2)). The IRT tool can use JML algorithm, or other algorithm, to solve for the parameter vectors $\alpha$, $\beta$, $\theta$ and $g=[g_1, \ldots, g_m]$, instead of just $\alpha$, $\beta$ and $\theta$.

The IRT analysis, as described above, provides estimates of the parameter vectors $\alpha$, $\beta$ and $\theta$, and therefore allows for a better and more objective understanding of the respondents' abilities and the assessment items' characteristics. The IRT based estimation of the parameter vectors $\alpha$, $\beta$ and $\theta$ can be viewed as determining the conditional probability distribution function, as depicted in equation (1) or equation (2), or the corresponding ICC that best fits the observed data or input data to the IRT tool (e.g., data depicted in Table. 1).

B.1. Extending IRT Beyond Dichotomous Data

While the IRT approach assumes dichotomous observed (or input) data, such data can be discrete data with a respective cardinality greater than two or can continuous data with a respective cardinality equal to infinity. In other words, the score values (or score indicators) $a_{i,j}$, e.g., for each pair of indices i and j, can be categorized into three different categories or cases, depending on all the possible values or the cardinality of $a_{i,j}$. These categories or cases are the dichotomous case, the graded (or finite discrete) case, and the continuous case. In the dichotomous case, the cardinality of the set of possible values for the score value (or score indicator) $a_{i,j}$ is equal to 2. For example, each response $\alpha_{i,j}$, can be either equal to 1 or 0, where 1 represents "success" or "correct answer" and 0 represents "fail" or "wrong answer". Table 1 above illustrates an example input matrix with binary responses for six different assessment items or tasks $t_1$, $t_2$, $t_3$, $t_4$, $t_5$ and $t_6$, and 10 distinct respondents (or learners) $r_1$, $r_2$, $r_3$, $r_4$, $r_5$, $r_6$, $r_7$, $r_8$, $r_9$ and $r_{10}$.

In the graded (or finite discrete) case, the cardinality of the set of possible values for each $\alpha_j$, is finite, and at least one $\alpha_j$, has more than two possible values. For example, one or more assessment items can be graded or scored on a scale of 1 to 10, using letter grades A, A$^-$, B$^+$, B, . . . , F, or using another finite set (greater than 2) of possible scores. The finite discrete scoring can be used, for example, to evaluate essay questions, sports drills or skills, music or other artistic performance or performance by trainees or employees with respect to one or more competencies, among others. In the continuous case, the cardinality of the set of possible values for at least one at, is infinite. For example, respondent performance with respect one or more assessment items or tasks can be evaluated using real numbers, such as real numbers between 0 and 10, real numbers between 0 and 20, or real numbers between 0 and 100. For example, in the context of sports, the speed of an athlete can be measured using the time taken by the athlete to run 100 meters or by dividing 100 by the time taken by the athlete to run the 100 meters. In both cases, the measured value can be a real number.

The IRT analysis usually assumes binary or dichotomous input data (or assessment data), which limits the applicability of the IRT approach. In order to support IRT analysis of discrete data with finite cardinality and continuous input data, the computing device 100 or a computer system including one or more computing devices can transform discrete input data or continuous input data into corresponding binary or dichotomous data, and feed the corresponding binary or dichotomous data to the IRT tool as input. Specifically, the computing device or the computer system can directly transform discrete input data into dichotomous data.

As to continuous data, the computing device or the computer system can transform the continuous input data into intermediary discrete data, and then transform the intermediary discrete data into corresponding dichotomous data.

To transform finite discrete (or graded) data into dichotomous data, the computing device or the computer system can treat a given assessment item $t_j$ having a finite number of possible performance score levels (or grades) as multiple sub-items with each sub-item corresponding to a respective performance score level or grade. For example, let assessment $t_j$ have l possible grades or l possible assessment/performance levels. The computing device or the computer system can replace the assessment item $t_j$ (in the input/assessment data) with l corresponding sub-items $[t_j^1, t_j^2, \ldots, t_j^k, \ldots, t_j^l]$ or $[t_j^0, t_j^1, \ldots, t_j^{k-1}, \ldots, t_j^{l-1}]$. Now assuming that respondent $r_i$ has a performance score $a_{i'} = k$ for assessment item $t_j$, the computing device or the computer system can replace the performance score $a_{i,j} = k$ with a vector of binary scores $[a_{i,j}^1, a_{i,j}^2, \ldots, a_{i,j}^k, \ldots, a_{i,j}^l]$, corresponding to sub-items $[t_j^1, t_j^2, \ldots, t_j^k, \ldots, t_j^l]$, where the binary values $a_{i,j}^1, a_{i,j}^2, \ldots, a_{i,j}^k$ for the assessment items $t_j^1, t_j^2, \ldots, t_j^k$ are set to 1 while the binary values $a_{i,j}^{k+1}, \ldots, a_{i,j}^l$ for the assessment items $t_j^{k+1}, \ldots, t_j^l$ are set to 0. In other words, the computing device or the computer system can replace the performance value $a_{i,j}$ with a vector $[a_{i,j}^1, a_{i,j}^2, \ldots, a_{i,j}^k, \ldots, a_{i,j}^l,]$, where for all integers q where $q \leq k$, $a_{i,j}^q = 1$, and for all integers q where $k < q \leq l$, $a_{i,j}^q = 0$.

According to the above assignment approach, if the learner or respondent $r_i$ has a performance score corresponding to level or grade k, then the learner or respondent $r_i$ is assumed to have achieved, or succeeded in, all levels smaller than or equal to the level or grade k.

As an example illustration, Table 2 below shows an example matrix of input/assessment data for assessment items $t_1$, $t_2$, $t_3$, $t_4$, $t_5$ and $t_6$, and respondents (or learners) $r_1$, $r_2$, $r_3$, $r_4$, $r_5$, $r_6$, $r_7$, $r_8$, $r_9$ and $r_{10}$, similar to Table 1, except that the performance scores for assessment item $t_6$ have a cardinality equal to 4. That is, the assessment item $t_6$ is a discrete or graded (non-dichotomous) assessment item.

TABLE 2

Response matrix including dichotomous and discrete assessment items.

|  | $t_1$ | $t_2$ | $t_3$ | $t_4$ | $t_5$ | $t_6$ |
|---|---|---|---|---|---|---|
| $r_1$ | 0 | 1 | 1 | 0 | 0 | 1 |
| $r_2$ | 1 | 0 | 1 | 1 | NA | 0 |
| $r_3$ | 0 | 1 | 1 | NA | NA | 2 |
| $r_4$ | 0 | 1 | 0 | 0 | 1 | 1 |
| $r_5$ | 1 | 0 | 1 | 0 | 1 | 0 |
| $r_6$ | 0 | 1 | 0 | 0 | 1 | 3 |
| $r_7$ | 0 | 1 | 1 | 1 | NA | 0 |
| $r_8$ | 0 | 1 | 0 | 1 | 0 | 1 |
| $r_9$ | 1 | 0 | 1 | 0 | 1 | 3 |
| $r_{10}$ | 0 | 1 | 1 | 0 | 0 | 2 |

Table 3 below shows an illustration of how the input data in table 2 is transformed into dichotomous data.

TABLE 3

Transformed response matrix.

|  | $t_1$ | $t_2$ | $t_3$ | $t_4$ | $t_5$ | $t_6^1$ | $t_6^2$ | $t_6^3$ | $t_6^4$ |
|---|---|---|---|---|---|---|---|---|---|
| $r_1$ | 0 | 1 | 1 | 0 | 0 | 1 | 1 | 0 | 0 |
| $r_2$ | 1 | 0 | 1 | 1 | NA | 1 | 0 | 0 | 0 |
| $r_3$ | 0 | 1 | 1 | NA | NA | 1 | 1 | 1 | 0 |
| $r_4$ | 0 | 1 | 0 | 0 | 1 | 1 | 1 | 0 | 0 |
| $r_5$ | 1 | 0 | 1 | 0 | 1 | 1 | 0 | 0 | 0 |
| $r_6$ | 0 | 1 | 0 | 0 | 1 | 1 | 1 | 1 | 1 |
| $r_7$ | 0 | 1 | 1 | 1 | NA | 1 | 0 | 0 | 0 |
| $r_8$ | 0 | 1 | 0 | 1 | 0 | 1 | 1 | 0 | 0 |
| $r_9$ | 1 | 0 | 1 | 0 | 1 | 1 | 1 | 1 | 1 |
| $r_{10}$ | 0 | 1 | 1 | 0 | 0 | 1 | 1 | 1 | 0 |

To transform continuous data into discrete (or graded) data, the computer system can discretize or quantize each $a_{i,j}$. For example, let $\mu_j$ and $\sigma_j$ denote the mean and standard deviation, respectively, for the performance scores for assessment item $t_j$. For all respondents $r_i$, the computer system can discretize the values $a_{i,j}$ for the task $t_j$ as follows:

$$\text{if } a_{i,j} < \left(\mu_j - \frac{3 \times \sigma_j}{2}\right), \text{ then } a_{i,j} = 0,$$

$$\text{if } \left(\mu_j - \frac{3 \times \sigma_j}{2}\right) \leq a_{i,j} < \left(\mu_j - \frac{\sigma_j}{2}\right), \text{ then } a_{i,j} = 1,$$

$$\text{if } \left(\mu_j - \frac{\sigma_j}{2}\right) \leq a_{i,j} < \left(\mu_j + \frac{\sigma_j}{2}\right), \text{ then } a_{i,j} = 2,$$

$$\text{if } \left(\mu_j + \frac{\sigma_j}{2}\right) \leq a_{i,j} < \left(\mu_j + \frac{3 \times \sigma_j}{2}\right), \text{ then } a_{i,j} = 3, \text{ and}$$

$$\text{if } \left(\mu_j + \frac{3 \times \sigma_j}{2}\right) \leq a_{i,j}, \text{ then } a_{i,j} = 4.$$

The above described approach for transforming continuous data into discrete (or graded) data represents an illustrative example and is not to be interpreted as limiting. For instance, the computer system can use other values instead of $\mu_j$ and $\sigma_j$, or can employ other discretizing techniques for transforming continuous data into discrete (or graded) data. Once the computer system transforms the continuous data into intermediate discrete (or graded) data, the computer system can then transform the intermediate discrete (or graded) data into corresponding dichotomous data, as discussed above. The computer system or the IRT tool can then apply IRT analysis to the corresponding dichotomous data.

C. Generating a Knowledge Base of Assessment Items

As discussed in the previous section, the IRT analysis allows for determining various latent traits of each assessment item. Specifically, the output parameters $\beta_j$, $\alpha_j$ and $g_j$ of the IRT analysis, for each assessment item $t_j$, reveal the item difficulty, the item discrimination and the pseudo-guessing characteristic of the assessment item $t_j$. While these parameters provide important attributes of each assessment item, further insights or traits of the assessment items can be determined using results of the IRT analysis. Determining such insights or traits allows for objective and accurate characterization different assessment items.

Systems and methods described herein allow for constructing a knowledge base of assessment items. The knowledge base refers to the set of information, e.g., attributes, traits, parameters or insights, about the assessment items derived from the analysis of the assessment data and/or results thereof. The knowledge base of assessment items can serve as a bank of information about the assessment items that can be used for various purposes, such as generating learning paths and/or designing or optimizing assessment instruments or competency frameworks, among others.

Figure 5:
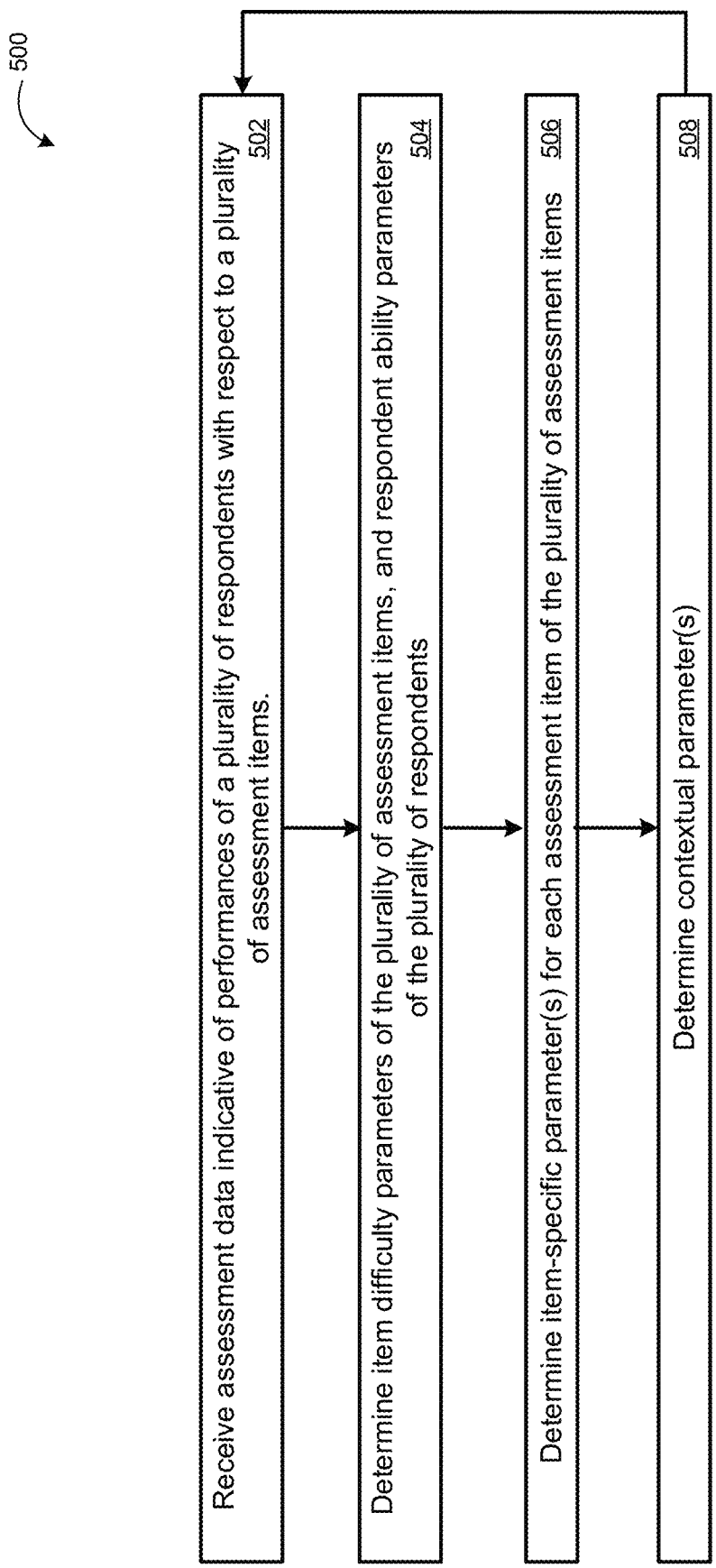
FIG. 5 shows a flowchart of a method or generating a knowledge base of assessment items is shown, according to example embodiments.

Referring to FIG. 5, a flowchart of a method 500 for generating a knowledge base of assessment items is shown, according to example embodiments. In brief overview, the method 500 can include receiving assessment data indicative of performances of a plurality of respondents with respect to a plurality of assessment items (STEP 502), and determining, using the assessment data, item difficulty parameters of the plurality of assessment items and respondent ability parameters of the plurality of respondents (STEP 504). The method 500 can include determining item-specific parameters for each assessment item of the plurality of assessment items (STEP 506), and determining contextual parameters (STEP 508).

The method 500 can be executed by a computer system including one or more computing devices, such as computing device 100. The method 500 can be implemented as computer code instructions, one or more hardware modules, one or more firmware modules or a combination thereof. The computer system can include a memory storing the computer code instructions, and one or more processors for executing the computer code instructions to perform method 500 or steps thereof. The method 500 can be implemented as computer code instructions executable by one or more processors. The method 500 can be implemented on a client device 102, in a server 106, in the cloud 108 or a combination thereof.

The method 500 can include the computer system, or one or more respective processors, receiving assessment data indicative of performances of a plurality of respondents with respect to a plurality of assessment items (STEP 502). The assessment data can be for n respondents, $r_1, \ldots, r_n$, and m assessment items $t_1, \ldots, t_m$. The assessment data can include a performance score for each respondent $r_i$ at each assessment item $t_j$. That is, the assessment data can include a performance score $s_{i,j}$ for each respondent-assessment item pair $(r_i, t_j)$. Performance score(s) may not be available for few pairs $(r_i, t_j)$. The assessment data can further include, for each respondent $r_i$, a respective aggregate score $S_i$ indicative of a total score of the respondent in all (or across all) the assessment items. The computer system can receive or obtain the assessment data via an I/O device 130, from a memory, such as memory 122, or from a remote database.

The method 500 can include the computer system, or the one or more respective processors, determining, using the assessment data, (i) an item difficulty parameter for each assessment item of the plurality of assessment items, and (ii) a respondent ability parameter for each respondent of the plurality of respondents (STEP 504). The computer system can apply IRT analysis, e.g., as discussed in section B above, to the assessment data. Specifically, the computer system can use, or execute, the IRT tool to solve for the parameter vectors $\beta$ and $\theta$, the parameter vectors $\alpha$, $\beta$ and $\theta$, or the parameter vectors $\alpha$, $\beta$, $\theta$ and g, using the assessment data as input data. In some implementations, the computer system can use a different approach or tool to solve for the parameter vectors $\beta$ and $\theta$, the parameter vectors $\alpha$, $\beta$ and $\theta$, or the parameter vectors $\alpha$, $\beta$, $\theta$ and g.

The performance scores $s_{i,j}$, i=1, ..., n, for any assessment item $t_j$ may be dichotomous (or binary), discrete with a finite cardinality greater than two or continuous with infinite cardinality. Table 1 above shows an example of dichotomous assessment data where all the performance scores $s_{i,j}$ are binary. Table 2 above shows an example of discrete assessment data, with at least one assessment item, e.g., assessment item $t_6$, having discrete (or graded) non-dichotomous performance scores with a finite cardinality greater than 2. In the case where the assessment items include at least one discrete non-dichotomous item having a cardinality of possible performance evaluation values (or performance scores $s_{i,j}$) greater than two, the computer system can transform the discrete non-dichotomous assessment item into a number of corresponding dichotomous assessment items equal to the cardinality of possible performance evaluation values. For instance, the performance scores associated with assessment item $t_6$ in Table 2 above have a cardinality equal to four (e.g., the number of possible performance score values is equal to 4 with the possible score values being 0, 1, 2 or 3). The discrete non-dichotomous assessment item $t_6$ is transformed into four corresponding dichotomous assessment items $t_6^0$, $t_6^1$, $t_6^2$ and $t_6^3$ as illustrated in Table 3 above.

The computer system can then determine the item difficulty parameters and the respondent ability parameters using the corresponding dichotomous assessment items. The computer system may further determine, for each assessment item $t_j$, the respective item discrimination parameter $\alpha_j$ and the respective item pseudo-guessing parameters $g_j$. Once the computer system transforms each discrete non-dichotomous assessment item into a plurality of corresponding dichotomous items (or sub-items), the computer system can use the dichotomous assessment data (after the transformation) as input to the IRT tool. Referring back to Table 2 and Table 3 above, the computer system can transform the assessment data of Table 2 into the corresponding dichotomous assessment data in Table 3, and use the dichotomous assessment data in Table 3 as input data to the IRT tool to solve for the parameter vectors $\beta$ and $\theta$, the parameter vectors $\alpha$, $\beta$ and $\theta$, or the parameter vectors $\alpha$, $\beta$, $\theta$ and g. It is to be noted that for a discrete non-dichotomous assessment item, the IRT tool provides multiple difficulty levels associated with the corresponding dichotomous sub-items. The IRT tool may also provide multiple item discrimination parameters $\alpha$ and/or multiple pseudo-guessing item parameter g associated with the corresponding dichotomous sub-items.

In the case where the assessment items include at least one continuous assessment item having an infinite cardinality of possible performance evaluation values (or performance scores $s_{i,j}$), the computer system can transform each continuous assessment item into a corresponding discrete non-dichotomous assessment item having a finite cardinality of possible performance evaluation values (or performance scores $s_{i,j}$). As discussed above in sub-section B.1, the computer system can discretize or quantize the continuous performance evaluation values (or continuous performance scores $s_{i,j}$) into an intermediate (or corresponding) discrete assessment item. The computer system can perform the discretization or quantization according to finite set of discrete performance score levels or grades (e.g., the discrete levels or grades 0, 1, 2, 3 and 4 illustrated in the example in sub-section B.1). The finite set of discrete performance score levels or grades can include integer numbers and/or real numbers, among other possible discrete levels.

The computer system can transform each intermediate discrete non-dichotomous assessment item to a corresponding plurality of dichotomous assessment items as discussed above, and in sub-section B.1, in relation with Table 2 and Table 3. The number of assessment items of the corresponding plurality of dichotomous assessment items is equal to the finite cardinality of possible performance evaluation values for the intermediate discrete non-dichotomous assessment item. The computer system can then determine the item difficulty parameters, the item discrimination parameters and the respondent ability parameters using the corresponding dichotomous assessment items. The computer system can use the final dichotomous assessment items, after the transformation from continuous to discrete assessment item(s) and the transformation from discrete to dichotomous assessment items, as input to the IRT tool to solve for the parameter vectors β and θ, the parameter vectors α, β and θ, or the parameter vectors α, β, θ and g. It is to be noted that for a continuous assessment item, the IRT tool provides multiple difficulty levels associated with the corresponding dichotomous sub-items. The IRT tool may also provide multiple item discrimination parameters α and/or multiple pseudo-guessing item parameter g associated with the corresponding dichotomous sub-items.

The method 500 can include determining item-specific parameters for each assessment item of the plurality of assessment items (STEP 506). The computer system can determine, for each assessment item of the plurality of assessment items, one or more item-specific parameters indicative of one or more characteristics of the assessment item using the item difficulty parameters and the item discrimination parameters for the plurality of assessment items and the respondent ability parameters for the plurality of respondents. The one or more item-specific parameters of the assessment item can include at least one of an item importance parameter or an item entropy.

For each dichotomous assessment item $t_j$, the computer system can compute the respective item entropy as:

$$H_j(\theta) = -P_j(\theta)\log(P_j(\theta)) - (1-P_j(\theta))\log(1-P_j(\theta)). \quad (5.a)$$

The item entropy $H_j(\theta)$ (also referred to as Shannon information or self-information) represents an expectation of the information content of the assessment item $t_j$ as a function of the respondent ability θ. An assessment item that a respondent with an ability level θ knows does not reveal much information about that respondent other than that the respondent's ability level is significantly higher than the difficulty level of the assessment item. Likewise, the same is true for an assessment item that is too difficult for a respondent with an ability level θ answer or perform correctly. It does not reveal much information about that respondent other than that the respondent's ability level is significantly lower than the difficulty level of the assessment item. That is, the assessment item does not reveal much information if $P_j(\theta) \approx 0$ or $P_j(\theta) \approx 1$. The item entropy $H_j(\theta)$ for the assessment item $t_j$ can indicate how useful and how reliable the assessment item $t_j$ is assessing respondents at different ability levels and in distinguishing between the respondents or their abilities. Specifically, more expected information can be obtained from the assessment item $t_j$ when used to assess a respondent with a given ability level θ if $H_j(\theta)$ is relatively high (e.g., $H_j(\theta) > \text{Threshold}_{Entropy}$).

As discussed in section B.1, an assessment item $t_j$ that is continuous or discrete and non-dichotomous can be transformed into l corresponding dichotomous sub-items $t_j^1, t_j^2, \ldots, t_j^k, \ldots, t_j^l$. The entropy of assessment item $t_j$ is defined as the joint entropy $H_{t_j^1, \ldots, t_j^l}(\theta)$ of the dichotomous sub-items $t_j^1, t_j^2, \ldots, t_j^k, \ldots, t_j^l$:

$$H_{t_j^1, \ldots, t_j^l}(\theta) = -\Sigma_{x_j^1} \ldots \Sigma_{x_j^l} P_\theta(t_j^1=x_j^1, \ldots, t_j^l=x_j^l) \log(P_\theta(t_j^1=x_j^1, \ldots, t_j^l=x_j^l)), \quad (5.b)$$

where $P_\theta(t_j^1=x_j^1, \ldots, t_j^l=x_j^l)$ represents the joint probability of the dichotomous sub-items $t_j^0, t_j^1, \ldots, t_j^{k-1}, \ldots, t_j^{l-1}$ at the respondent ability θ. These sub-items are not statistically independent. The computer system can compute or determine the joint entropy $H_{t_j^1, \ldots, t_j^l}(\theta)$ as:

$$H_{t_j^1, \ldots, t_j^l}(\theta) = \Sigma_{k=1}^l H_\theta(t_j^l | t_j^{l-1}, \ldots, t_j^{l-k+1}). \quad (5.c)$$

In equation (5.c), the term $H_\theta(t_j^l | t_j^{l-1}, \ldots, t_j^{l-k+1})$ represents the entropy of the conditional random variable $t_j^l | t_j^{l-1}, \ldots, t_j^{l-k+1}$ at the respondent ability θ, which can be computed using conditional probabilities $P_\theta(t_j^l | t_j^{l-1}, \ldots, t_j^{l-k+1})$ instead of $P_j(\theta)$ in equation (5.a). Given that the event that respondent $r_i$ has a performance score $a_{i,j}=k$ for assessment item $t_j$ is replaced with a vector of binary scores $[[a_{i,j}^1, a_{i,j}^2, \ldots, a_{i,j}^k, \ldots, a_{i,j}^l]]$ corresponding to sub-items $[t_j^1, t_j^2, \ldots, t_j^k, \ldots, t_j^l]$ where the binary values $a_{i,j}^1, a_{i,j}^2, \ldots, a_{i,j}^k, \ldots, a_{i,j}^l$ for the assessment items $t_j^1, t_j^2, \ldots, t_j^k$ are set to 1 while the binary values $a_{i,j}^{k+1}, \ldots, a_{i,j}^l$ for the assessment items $t_j^{k+1}, \ldots, t_j^l$ are set to 0, the conditional probabilities $P_\theta(t_j^l | t_j^{l-1}, \ldots, t_j^{l-k+1})$ for the conditional random variable $t_j^l | t_j^{l-1}, \ldots, t_j^{l-k+1}$ can be computed from the probabilities $P_{t_j^k}(\theta)$ of each sub-item $t_j^k$ of the sub-items $t_j^1, t_j^2, \ldots, t_j^k, \ldots, t_j^l$ generated by the IRT tool. For instance, $$P_\theta(t_j^l=1 | t_j^{l-1}=1) = P_\theta(t_j^l=1),$$

$$P_\theta(t_j^l=0 | t_j^{l-1}=1) = P_\theta(t_j^l=0),$$

$$P_\theta(t_j^l=1 | t_j^{l-1}=0) = 0, \text{ and}$$

$$P_\theta(t_j^l=0 | t_j^{l-1}=0) = 1.$$

Similarly, $$P_\theta(t_j^l=1 | t_j^{l-1}=1, t_j^{l-2}=1) = P_\theta(t_j^l=1),$$

$$P_\theta(t_j^l=0 | t_j^{l-1}=1, t_j^{l-1}=1) = P_\theta(t_j^l=0),$$

$$P_\theta(t_j^l=1 | t_j^{l-1}=0 \text{ or } t_j^{l-1}=0) = 0, \text{ and}$$

$$P_\theta(t_j^l=0 | t_j^{l-1}=0 \text{ or } t_j^{l-1}=0) = 1.$$

The computer system can determine all the conditional probabilities $P_\theta(t_j^l | t_j^{i-1}, \ldots, t_j^{l-k+1})$ as:

$$P_\theta(t_j^l=1 | \text{all } t_j^{l-1}, \ldots, t_j^{l-k+1}=1) = P_\theta(t_j^l=1),$$

$$P_\theta(t_j^l=0 | \text{all } t_j^{l-1}, \ldots, t_1^{l-k+1}=1) = P_\theta(t_j^l=0),$$

$$P_\theta(t_j^l=1 | \text{at least one of } t_j^{l-1}, \ldots, t_j^{l-k+1}=0) = 0, \text{ and}$$

$$P_\theta(t_j^l=0 | \text{at least one of } t_j^{l-1}, \ldots, t_j^{l-k+1}=0) = 1.$$

The computer system can identify, for each assessment item $t_j$, the most informative ability range of the assessment item $t_j$, e.g., the ability range within which the assessment item $t_j$ would reveal most information about respondents or learners whose ability levels belong to that range when the assessment item $t_j$ is used to assess those respondents or learners. In other words, using the assessment item $t_1$ to assess (e.g., as part of an assessment instrument) respondents or learners whose ability levels fall within the most informative ability range of $t_j$ would yield more accurate and more reliable assessment, e.g., with less expected errors. Thus, more reliable assessment can be achieved when respondents' ability levels fall within the most informative ability ranges of various assessment items. The most informative ability range, denoted $MIAR_j$, for assessment item $t_j$ can be defined as the interval of ability values $[\beta_j-\delta_1, \beta_j+\delta_2]$, where for every ability value θ in this interval $H_j(\theta) \geq \text{Threshold}_{Entropy}$ and for every ability value θ not in this interval $H_j(\theta) < \text{Threshold}_{Entropy}$. The threshold value $\text{Threshold}_{Entropy}$ can be equal to 0.7, 0.75, 0.8 or 0.85 among other possible values. In some implementations, the threshold value $\text{Threshold}_{Entropy}$ can vary depending on, for example, the use of the corresponding assessment instrument (e.g., education versus corporate application), the amount of accuracy sought or targeted, the total number of available assessment items or a combination thereof, among others. In some implementations, the threshold value Threshold$_{Entropy}$ can be set via user input.

The computer system can determine for each MIAR$_j$, a corresponding subset of respondents whose ability levels fall within MIAR$_j$ and determine the cardinality of (e.g., number or respondents in) the subset. The cardinality of each subset can be indicative of the effectiveness of corresponding assessment tem $t_j$ within the assessment instrument T, and can be used as an effectiveness parameter of assessment item within the one or more item-specific parameters of the assessment item. The computer system may discretize the cardinality of each subset of respondents associated with a corresponding MIAR$_j$ (or the effectiveness parameter) to determine a classification of the effectiveness of the assessment item $t_j$ within the assessment instrument T. For example, the computer system can classify the cardinality of each subset of respondents associated with a corresponding MIAR$_j$ (or the effectiveness parameter) as follows:

if cardinality of $\{r_i | 1 \le i \le n,\ \theta_i \in [\beta_j - \delta_1,\ \beta_j + \delta_2]\}$ is smaller than the floor average over all tasks of the number of learners whose ability value fall within the most informative ability range: quality of MIAR$_j$ is low.

if cardinality of $\{r_i | 1 \le i \le n,\ \theta_i \in [\beta_j - \delta_1,\ \beta_j + s_2]\}$ is greater than the ceiling average over all tasks of the number of learners whose ability value fall within the most informative ability range: quality of MIAR$_j$ is good.

Else: information range is average.

The classification can be an item-specific parameter of each assessment item determined by computer system. Different bounds or thresholds can be used in classifying the cardinality of each subset of respondents associated with a corresponding MIAR$_j$ (or the effectiveness parameter).

The computer system can determine for each assessment item $t_j$ a respective item importance parameter Imp$_j$. The item importance can be defined as a function of at least one of the conditional probabilities P(success|$t_j$=1), P(success|$t_j$=0), P(failure|$t_j$=1) or P(failure|$t_j$=0). The conditional probability P(success|$t_j$=1) represents the probability of success in the overall set of assessment items T given that the performance score associated with the assessment item $t_j$ is equal to 1, and the conditional probability P(success|$t_j$=0) represents the probability of success in the overall set of assessment items T given that the performance score associated with the assessment item $t_j$ is equal to 0. The conditional probability P(failure|$t_j$=1) represents the probability of failure in the overall set of assessment items T given that the performance score associated with the assessment item $t_j$ is equal to 1, and the conditional probability P(failure|$t_j$=0) represents the probability of failure in the overall set of assessment items T given that the performance score associated with the assessment item $t_j$ is equal to 0. The item importance Imp$_j$ can be viewed as a measure of the dependency of the overall outcome in the set of assessment item T on the outcome of assessment item $t_j$. The higher the dependency, the more important is the assessment item.

In some implementations, the computer system can compute the item importance parameter Imp$_j$ as:

$$Imp_j = \frac{e^{P(succees|t_j=1)}}{e^{P(succees|t_j=0)}}. \tag{6}$$

The item importance parameter Imp$_j$ can be defined in terms of some other function of at least one of the conditional probabilities P(success|$t_j$=1), P(success|$t_j$=0), P(failure|$t_j$=1) or P(failure|$t_j$=0). The assessment item importance Imp$_j$ is indicative of how influential is the assessment item $t_j$ in determining the overall result for the whole set of assessment items T. The overall result can be viewed as the respondent's aggregate assessment (e.g., success or fail) with respect to the whole set of assessment items T. For instance, the set of assessment items T can represent an assessment instrument, such as a test, an exam, a homework or a competency framework, and the overall result of each respondent can represent the aggregate assessment (e.g., success or fail; on track or lagging; passing grade or failing grade) of the respondent with respect to the assessment instrument. Distinct assessment items may influence, or contribute to, the overall result (or final outcome) differently. For example, some assessment items may have more impact on the overall result (or final outcome) than others.

Note that success for a respondent $r_i$ in the overall set of assessment items T may be defined as scoring an aggregate performance score $S_i = \Sigma_{j=1}^m s_{i,j}$ greater than or equal to a predefined threshold score. In some implementations, the aggregate performance score can be defined as a weighted sum of performance scores for distinct assessment items. Success in the overall set of assessment items T may be defined in some other ways. For example, success in the overall set of assessment items T may require success in one or more specific assessment items.

The computer system may generate or construct a Bayesian network as part of the knowledge base and/or to determine the conditional probabilities P(success|$t_j$=1) and P(success|$t_j$=0). The Bayesian network can depict the importance of each assessment item and the interdependencies between various assessment items. A Bayesian network is a graphical probabilistic model that uses Bayesian inference for probability computations. Bayesian networks aim to model interdependency, and therefore causation, using a directed graph. The computer system can use nodes of the Bayesian network to represent the assessment items, and use the edges to represent the interdependencies between the assessment items. The overall result (or overall assessment outcome) of the plurality of assessment items or a corresponding assessment instrument (e.g., pass or fail) can be represented by an outcome node in the Bayesian network.

The computer system can apply a two-stage approach in generating the Bayesian network. At a first stage, the computer system can determine the structure of the Bayesian network. Determining the structure of the Bayesian network includes determining the dependencies between the various assessment items and the dependencies between each assessment item and the outcome node. The computer system can use naive Bayes and an updated version of the matrix M. Specifically, the updated version of the matrix M can include an additional outcome/result column indicative of the overall result or outcome (e.g., pass or fail) for each respondent. At the second stage, the computer system can determine the conditional probability tables for each node of the Bayesian network. Using the generated Bayesian network (or in generating the Bayesian network), the computer system can determine for each assessment item $t_i$ one or more corresponding conditional probabilities P(success|$t_j$=1) P(success|$t_j$=0), P(failure|$t_j$=1) and/or P(failure|$t_j$=0), and use the conditional probabilities to compute the item importance Imp$_j$. The one or more conditional probabilities P(success|$t_j$=1) P(success|$t_j$=0), P(failure|$t_j$=1) and/or P(failure|$t_j$=0) for each assessment item $t_j$ can be viewed as representing or indicative of dependencies between the outcome node and the assessment item $t_j$.

Figure 6:
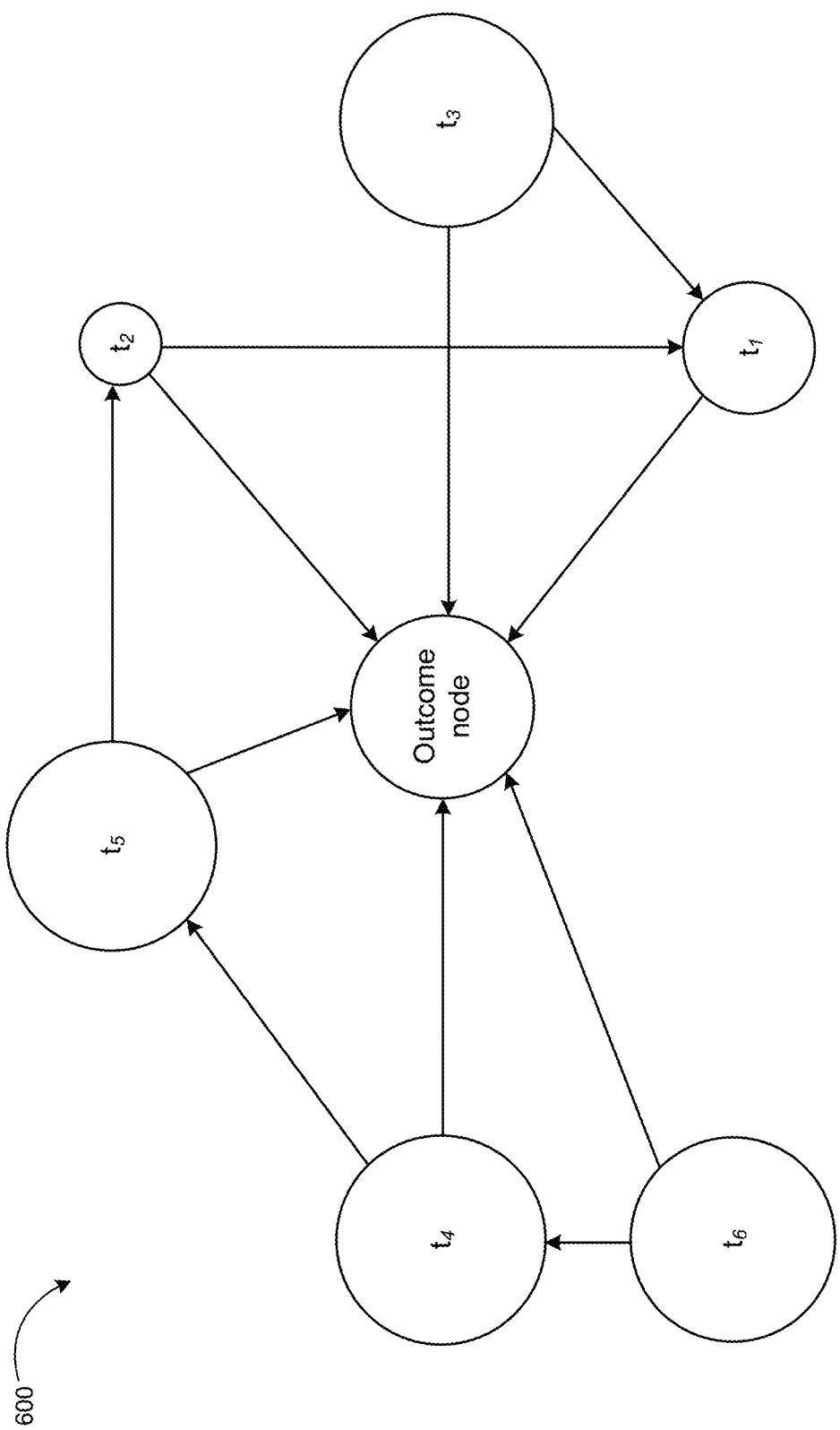
FIG. 6 shows a Bayesian network generated depicting dependencies between various assessment items, according to one or more embodiments.

FIG. 6 shows an example Bayesian network 600 generated using assessment data of Table 1. The Bayesian network 600 includes six nodes representing the assessment items $t_1$, $t_2$, $t_3$, $t_4$, $t_5$ and $t_6$, respectively. The Bayesian network 600 also includes an additional outcome node representing the outcome (e.g., success or fail) for the whole set of assessment items $\{t_1, t_2, t_3, t_4, t_5, t_6\}$. The edges of the Bayesian network can represent interdependencies between pairs of assessment items. Any pair of nodes in the Bayesian network that are connected via an edge are considered to be dependent on one another. For example, each pair of the pairs of tasks $(t_1, t_2)$, $(t_1, t_3)$, $(t_2, t_5)$, $(t_4, t_5)$ and $(t_4, t_6)$ in the Bayesian network 600 is connected through a respective edge representing interdependency between the pair of assessment items. In some implementations, the item importance $Imp_1$ can be represented by the size or color of the node corresponding to the assessment item $t_j$.

Determining item-specific parameters for each assessment item of the plurality of assessment items can include the computer system determining, for each respondent-assessment item pair $(r_i, t_j)$, an expected performance score of the respondent $r_i$ at the assessment item $t_j$. For dichotomous assessment item $t_j$, the computer system can compute the expected score of respondent $r_i$ in the assessment item $t_j$ as:

$$E(s_{i,j}) = P_{i,j}. \tag{7.a}$$

The expected score $E(s_{i,j})$ is equal to the probability of success $P_{i,j}$ since the score $s_{i,j}$ takes either the value 1 or 0. For a graded or discrete assessment item $t_k$, the computer system can compute the expected score of respondent $r_i$ in the task $t_k$ as:

$$E(s_{i,k}) = \Sigma_{q=1}^{l} q \cdot P(a_{i,k} = q | \theta_k, \beta_j, \alpha_j), \tag{7.b}$$

where the response to the task $t_k$ can take any of the values $q = 1, \ldots, l$.

Determining the item-specific parameters can include determining, for each assessment item $t_j$, $t_j$), a respective difficulty index $Dindex_j$ that is different from the difficulty parameter $\beta_j$. While the difficulty parameter $\beta_j$ can take any value between $-\infty$ and $+\infty$, the difficulty index $Dindex_j$, for any $j = 1, \ldots, m$, can be bounded within a predefined finite range. For each assessment item $t_j$, the respondents' scores $s_{i,j}$ for that assessment item can have a respective predefined range. For example, the scores for a given assessment item can be between 0 and 1, between 0 and 10 or between 0 and 100. Let max $s_j$ be the maximum possible score for the assessment item $t_j$, or the maximum recorded score among the scores $s_{i,j}$ for all the respondents $r_i$. The difficulty index of the assessment item $t_j$ can be defined, and can be computed by the computer system, as:

$$Dindex_j = 100 \times \left(1 - \frac{\sum_{i=1}^{n} \frac{E(s_{i,j})}{\max s_j}}{n}\right). \tag{8}$$

The difficulty index $Dindex_j$ for each assessment item $t_j$ represents a normalized measure of the level of difficulty of the assessment item. For example, when all or most of the respondents are expected to do well in the assessment item $t_j$, e.g., the expected scores for various respondents for the assessment item $t_j$ are relatively close to max $s_j$, the difficulty $Dindex_j$ will be small. In such case, the assessment item $t_j$ can be viewed or considered as an easy item or a very easy item. In contrast, when all or most of the respondents are expected to perform poorly with respect to the assessment item $t_j$, e.g., the expected scores for various respondents for the assessment item $t_j$ are substantially smaller than max $s_j$, the difficulty index $Dindex_j$ will be high. In such case, the assessment item $t_j$ can be viewed or considered as a difficult item or a very difficult item. The multiplication by 100 in equation (8) leads to a range of $Dindex_j$ equal to [0, 100]. In some implementations, some other scaler, e.g., other than 100, can be used in equation (8).

In some implementations, the item-specific parameters can include a classification of the difficulty each assessment item $t_j$ based on the difficulty index $Dindex_j$. The computer system can determine, for each assessment item $t_j$, a respective classification of the difficulty of the assessment item based on the value of the difficulty index $Dindex_j$. For instance, the computer system can discretize the difficulty index $Dindex_j$ for each assessment item $t_j$, and classify the assessment item $t_j$ based on the discretization. Specifically, the computer system can use a set of predefined intervals within the range of $Dindex_j$ and determine to which interval does $Dindex_j$ belong. Each interval of the set of predefined intervals can correspond to a respective discrete item difficulty level among a plurality of discrete item difficulty levels.

The computer system can determine the discrete item difficulty level corresponding to the difficulty index $Dindex_j$ by comparing the difficulty index $Dindex_j$ to one or more predefined threshold values defining the upper bound and/or lower bound of the predefined interval corresponding to discrete item difficulty level. For example, the computer system can perceive or classify the assessment item $t_j$ as a very easy item if $Dinex_j \leq 20$, as an easy item if $20 < Dinex_j \leq 40$, and as an item of average difficulty if $40 < Dinex_j \leq 60$. The computer system can perceive or classify the assessment item $t_j$ as a difficult item if $60 < Dinex_j \leq 80$, and as a very difficult item if $80 < Dinex_j \leq 100$. It is to be noted that other ranges and/or categories may be used in classifying or categorizing the assessment items.

The item discrimination $\alpha_j$ for each assessment item $t_j$ can be used to classify that assessment item and assess its quality. For example, the computer system can discretize the item discrimination $\alpha_j$ and classify the assessment item $t_j$ based on the respective item discrimination as follows:

- if $\alpha_j \leq 0$: the assessment item $t_j$ is classified as "non-discriminative."
- if $0 \leq \alpha_j \leq 0.34$: the assessment item $t_j$ is classified as "very low discrimination."
- if $0.34 < \alpha_j \leq 0.64$: the assessment item $t_j$ is classified as "low discrimination."
- if $0.64 < \alpha_j \leq 1.34$: the assessment item $t_j$ is classified as "moderate discrimination."
- if $1.34 < \alpha_j \leq 1.69$: the assessment item $t_j$ is classified as "high discrimination."
- if $1.69 < \alpha_j \leq 50$: the assessment item $t_j$ is classified as "very high discrimination."
- if $50 < \alpha_j$: the assessment item $t_j$ is classified as "perfect discrimination."

The item discrimination $\alpha_j$ and/or the assessment item classification based on the respective item discrimination can be item-specific parameters determined by the computer system of each assessment item.

In some implementations, the item-specific parameters can further include at least one of the difficulty parameter $\beta_j$, the discrimination parameter $\alpha_j$ and/or the pseudo-guessing item parameter $g_j$ for each assessment item $t_j$. The item-specific parameters may include, for each assessment item, a representation of the respective ICC (e.g., a plot) or the corresponding probability distribution function, e.g., as described in equation (1) or (2).

The method 500 can include determining one or more contextual parameters (STEP 508). The computer system can determine the one or more contextual parameters using the item difficulty parameters, the item discrimination parameters and the respondent ability parameters. The one or more contextual parameters can be indicative of at least one of an aggregate characteristic of the plurality of assessment items or an aggregate characteristic of the plurality of respondents. In some implementations, determining the one or more contextual parameters can be optional. For instance, the computer system can determine item specific parameters but not contextual parameters. In other words, the method 500 may include steps 502-508 or steps 502-506 but not step 508.

The one or more item contextual parameters can include an entropy (or joint entropy) of the plurality of assessment items. The joint entropy for the plurality of assessment items can be defined as:

$$H_{t_1,\ldots,t_m}(\theta) = -\Sigma_{x_1},\ldots\Sigma_{x_m} P_\theta(t_1=x_1,\ldots,t_m=x_m)\log(P_\theta(t_1=x_1,\ldots,t_m=x_m)), \quad (9)$$

where $P_\theta(t_1=x_1,\ldots,t_m=x_m)$ is the joint probability of the assessment items $t_1,\ldots,t_m$. For statistically independent assessment items, the computer system can determine or compute the joint entropy $H_{t_1,\ldots,t_m}()$ as the sum entropies $H_j(\theta)$ of different assessment items:

$$H(\theta) = H_{t_1,\ldots,t_m}(\theta) = \Sigma_{j=1}^m H_j(\theta). \quad (10)$$

Here, distinct assessment items are assumed to be statistically independent, and the computer system can determine or compute the joint entropy using equation (10).

The computer system can determine the most informative ability range, denoted MIAR, of the plurality of assessment items or the corresponding assessment instrument as a contextual parameter. The computer system can classify the quality (or effectiveness) of the assessment instrument based on MIAR. The computer system can determine the most informative ability range MIAR of the plurality of assessment items or the corresponding assessment instrument in a similar way as the determination of the most informative information range for a given assessment item discussed above. The computer system can use similar or different threshold values to classify the information range of the assessment instrument, compared to the threshold values used to determine the information range quality of each assessment item $t_j$ (or the effectiveness of $t_j$ within the assessment instrument).

The computer system can determine a reliability of an assessment item $t_j$ as a contextual parameter. We opt for using the amount of information (or entropy) of assessment items as a measure of reliability that is a function of ability $\theta$. The higher the information (or entropy) at a given ability level $\theta$, the more accurate or more reliable is assessment item at assessing a learner whose ability level is equal to $\theta$:

$$R_j(\theta) = H_j(\theta). \quad (11)$$

The computer system can determine a reliability of the plurality of assessment items (or reliability of the assessment instrument defined as the combination of the plurality of assessment items) as a contextual parameter. Reliability is a measure of the consistency of the application of an assessment instrument to a particular population at a particular time. We opt for using the cumulative amount of information of tasks $H(\theta)$ as a measure of reliability as a function of ability $\theta$. The higher it is, the higher is the accuracy by which the assessment tool measures the learners using these tasks.

The computer system can determine a classification of the reliability $R_j(\theta)$ as a contextual parameter. The computer system can compare the computed reliability $R_j(\theta)$ to one or more predefined threshold values, and determine a classification of $R_j(\theta)$ (e.g., whether the assessment item $t_j$ is reliable) based on the comparison, e.g., If $R_j(\theta) \geq \text{Threshold}_{entropy}$: Reliable item.
If $R_j(\theta) < \text{Threshold}_{entropy}$: A non-reliable item.

The computer system can identify, at each ability level $\theta$, a corresponding subset of assessment items that can be used to accurately or reliably assess respondents having that ability level as follows:

$$MST(\theta) = \{t_j | 1 \leq j \leq m, H_j(\theta) \geq \text{Threshold}_{entropy}\}$$

For every ability level $\theta$, $MST(\theta)$ represents a subset of assessment items having respective entropies greater than or equal to a predefined threshold value $\text{Threshold}_{entropy}$. The cardinality of $MST(\theta)$ denoted herein as $|MST(\theta)|$ represents the number of assessment items having respective entropies greater than or equal to the predefined threshold value at the ability level $\theta$. These assessment items are expected to provide a more accurate assessment of respondents having an ability level $\theta$.

A measure of the reliability of the assessment instrument at an ability level $\theta$ can be defined as ratio of the cardinality of $MST(\theta)$ by the total number of assessment items m. That is:

$$R(\theta) = \frac{|MST(\theta)|}{m} \quad (12)$$

For a respondent $r_i$ with ability level $\theta_i$, $R(\theta_i)$ represents a measure of the reliability of the assessment instrument in assessing the respondent $r_i$. When $R(\theta)$ is relatively small (e.g., close to zero), then $\theta_i$ may not be an accurate estimate of the respondent's ability level.

The computer system can compute, or estimate, an average difficulty and/or an average difficulty index for the plurality of assessment items or the corresponding assessment instrument as contextual parameter(s). For instance, the computer system can compute or estimate an aggregate difficulty parameter $\hat{\beta}$ as an average of the difficulties $\beta_j$ for the various assessment items $t_j$. Specifically, the computer system can compute the aggregate difficulty parameter $\hat{\beta}$ as:

$$\hat{\beta} = \frac{\sum_{j=1}^m \beta_j}{m}. \quad (13)$$

The one or more contextual parameters may include $$\min_j \beta_j \text{ and/or } \max_j \beta_j.$$

The computer system can compute an aggregate difficulty index $\widehat{Dindex}$ as an average of the difficulty indices $Dindex_j$ for various assessment items $t_j$. Specifically, the computer system can compute the aggregate difficulty index $\widehat{Dindex}$ as:

$$\widehat{Dindex} = \frac{\sum_{j=1}^m Dindex_j}{m}. \quad (14)$$

The computer system can determine a classification of the aggregate difficulty index $\overline{Dindex}$ as a contextual parameter. The computer system can discretize or quantize the aggregate difficulty index $\overline{Dindex}$ according to predefined levels, and can classify or interpret the aggregate difficulty of the plurality of assessment items (or the aggregate difficulty of the corresponding assessment instrument) based on the discretization. For example, the computer system can classify or interpret the aggregate difficulty as follows:

if $\overline{Dindex} \leq 20$: Very easy exam,
if $20 < \overline{Dindex} \leq 40$: easy exam,
if $40 < \overline{Dindex} \leq 60$: exam of average difficulty,
if $60 < \overline{Dindex} \leq 80$: Difficult exam,
if $80 < \overline{Dindex}$ : Very Difficult exam.

The one or more contextual parameters can include other parameters indicative of aggregate characteristics of the plurality of respondents, such as a group achievement index (or aggregate achievement index) representing an average of achievement indices of the plurality of respondents or a classification of an expected aggregate performance of the plurality of respondents determined based the group achievement index. Both of these contextual parameters are described in the next section. The one or more contextual parameters may include $$\hat{\theta} = \frac{\sum_{i=1}^{n} \theta_i}{n}, \min_i \theta_i \text{ and/or } \max_i \theta_i.$$

The item-specific parameters and the contextual parameters discussed above depict or represent different assessment item or assessment instrument characteristics. Some of the assessment item or assessment instrument parameters discussed above are defined based on, or are dependent on, the expected respondent score $E[s_{i,j}]$ per assessment item. The computer system can use the parameters discussed above or any combination thereof to assess the quality of each assessment item or the quality of the assessment instrument as a whole. The computer system can maintain a knowledge base repository of assessment items or tasks based on the quality assessment of each assessment item. The computer system can determine and provide a recommendation for each assessment item based on, for example, the item discrimination, the item information range and/or the item importance parameter (or any other combination of parameters). For each assessment item, the possible recommendations can include, for example, dropping, revising or keeping the assessment item. For instance, the computer system can recommend:

Assessment item to be revised, if two characteristics among three characteristics (e.g., item discrimination, item information range quality and item importance) of an assessment item are smaller than respective thresholds. For example, the computer system can recommend revision of the assessment item if the assessment item is not good to differentiate the respondents and does not have an influence on the aggregate score of the assessment instrument.

Assessment item to be dropped, if the assessment item has a negative item discrimination. For an Assessment item having a negative item discrimination, the probability of a correct answer decreases when the respondent's ability increases.

Assessment item to be kept, otherwise.

The recommendation for each assessment item can be viewed as an item-specific parameter. In general, the computer system can make recommendation decisions based on predefined rules with respect to one or more item specific parameters and/or one or more contextual parameters.

The contextual parameters, in a way, allow for comparing assessment items across different assessment instruments, for example, using a similarity distance function (e.g., Euclidean distance) defined in terms of item-specific parameters and contextual parameters. Such comparison would be more accurate than using only item-specific parameters. For instance, using the contextual parameters can help remediate any relative bias and/or any relative scaling between item-specific parameters associated with different assessment instruments.

A knowledge base of assessment items can include item-specific parameters indicative of item-specific characteristics for each assessment item, such as the item-specific parameters discussed above. The knowledge base of assessment items can include parameters indicative of aggregate characteristics of the plurality of assessment items (or a corresponding assessment instrument) and/or aggregate characteristics of the plurality of respondents, such as the contextual parameters discussed above. The knowledge base of assessment items can include any combination of the item-specific parameters and/or the contextual parameters discussed above. The computer system can store or maintain the knowledge base (or the corresponding parameters) in a memory or a database. The computer system can map each item-specific parameter to an identifier (ID) of the corresponding assessment item. The computer system can map the item-specific parameters and the contextual parameters generated using an assessment instrument to an ID of that assessment instrument.

In generating the knowledge base of assessment items, the computer system can store for each assessment item $t_j$ the respective context including, for example, the parameters $\bar{\beta}$, $\overline{Dindex}$, $\hat{\theta}$, $\overline{Aindex}$, $H(\theta)$, $R(\theta)$, $$\min_j \beta_j, \max_j \beta_j,$$

MIAR, expected total performance score function $\hat{S}(\theta)$, classifications thereof, or a combination thereof. These parameters represent characteristics or attributes of the whole assessment instrument to which the assessment item $t_j$ belongs and aggregate characteristics of the plurality of respondents participating in the assessment. These contextual parameters when associated or mapped with each assessment item in the assessment instrument allow for comparison or assessment of assessment items across different assessment instruments. Also, for each assessment item $t_j$, the computer system can store a respective set of item-specific parameters. The item-specific parameters can include $\alpha_j$, $g_j$, $\beta_j$, Dindex$_j$, Imp$_j$, H$_j(\theta)$, MIAR$_j$, item characteristic function (ICF) or corresponding curve (ICC), the dependencies of the assessment item $t_j$ and/or respective strengths, classifications thereof or a combination thereof. Assessment items belonging to the same assessment instrument can have similar context but different item-specific parameter values.

The computer system can provide access to (e.g., display on display device, provide via an output device or transmit via a network) the knowledge base of assessment items or any combination of respective parameters. The computer system can store the items' knowledge base in a searchable database and provide UIs to access the database and display or retrieve parameters thereon.

Figure 7:
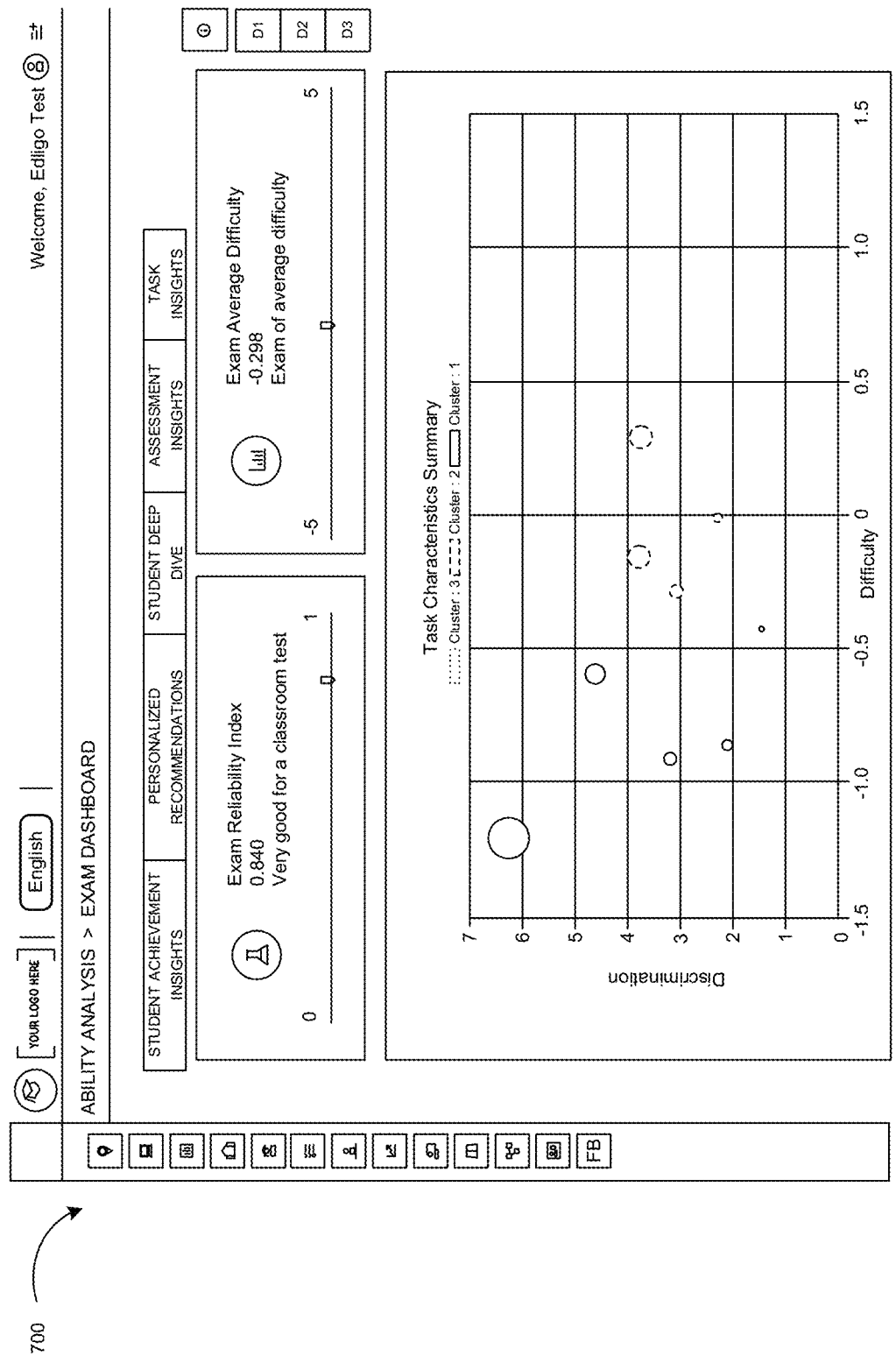
FIG. 7 shows a screenshot of a user interface (UI) illustrating various characteristics of an assessment instrument and respective assessment items.

Referring to FIG. 7, a screenshot of a user interface (UI) 700 illustrating various characteristics of an assessment instrument and respective assessment items is shown, according to example embodiments. The UI 700 depicts a reliability index (e.g., average of $R(\theta_i)$ over all $\theta_i$'s) and the aggregate difficulty index of the assessment instrument. The UI 700 also depicts a graph illustrating a distribution (or clustering) of the assessment items in terms of the respective item difficulties $\beta_j$ and the respective item discriminations $\alpha_j$.

D. Generating a Knowledge Base of Respondents/Evaluatees

Similar to assessment items, the respondent abilities $\theta_i$, for each respondent $r_i$, provide important information about the respondents. However, further insights or traits of the respondents can be determined using results of the IRT analysis (or output of the IRT tool). Determining such insights or traits allows for objective and accurate characterization of different respondents.

Systems and methods described herein allow for constructing a knowledge base of respondents. The knowledge base refers to the set of information, e.g., attributes, traits, parameters or insights, about the respondents derived from the analysis of the assessment data and/or results thereof. The knowledge base of respondents can serve as a bank of information about the respondents that can be used for various purposes, such as generating learning paths, making recommendations to respondents or grouping respondents, among other applications.

Figure 8:
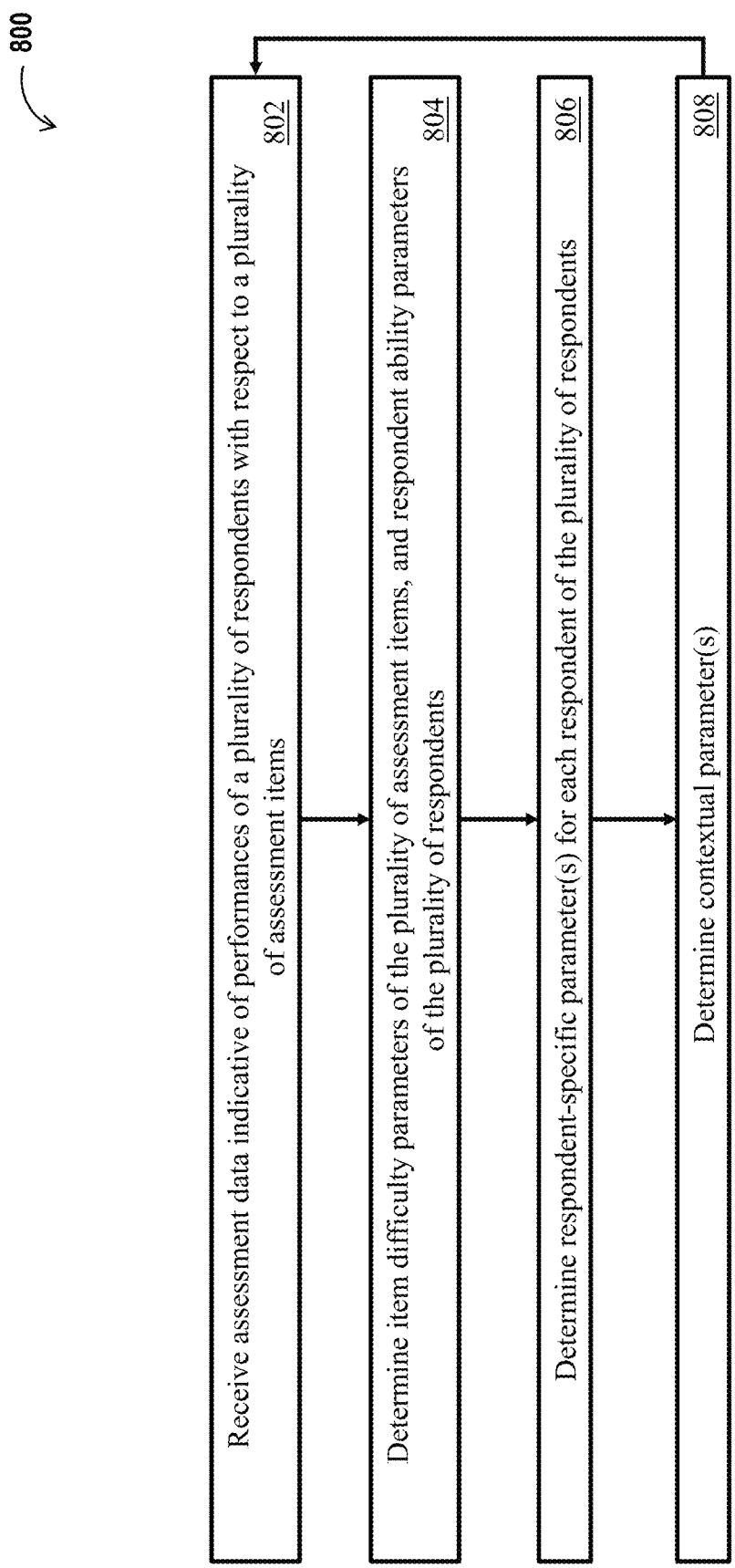
FIG. 8 shows a flowchart of a method for generating a knowledge base of respondents, according to example embodiments.

Referring to FIG. 8, a flowchart of a method 800 for generating a knowledge base of respondent is shown, according to example embodiments. In brief overview, the method 800 can include receiving assessment data indicative of performances of a plurality of respondents with respect to a plurality of assessment items (STEP 802), and determining, using the assessment data, item difficulty parameters of the plurality of assessment items and respondent ability parameters of the plurality of respondents (STEP 804). The method 800 can include determining respondent-specific parameters for each assessment item of the plurality of assessment items (STEP 806), and determining contextual parameters (STEP 808).

The method 800 can be executed by the computer system including one or more computing devices, such as computing device 100. The method 800 can be implemented as computer code instructions, one or more hardware modules, one or more firmware modules or a combination thereof. The computer system can include a memory storing the computer code instructions, and one or more processors for executing the computer code instructions to perform method 800 or steps thereof. The method 800 can be implemented as computer code instructions executable by one or more processors. The method 800 can be implemented on a client device 102, in a server 106, in the cloud 108 or a combination thereof.

The method 800 can include the computer system, or one or more respective processors, receiving assessment data indicative of performances of a plurality of respondents with respect to a plurality of assessment items (STEP 802), similar to STEP 502 of FIG. 5. The assessment data is similar to (or the same as) the assessment data described in relation to FIG. 5 in the previous section. The computer system can receive or obtain the assessment data via an I/O device 130, from a memory, such as memory 122, or from a remote database.

The method 800 can include the computer system, or the one or more respective processors, determining, using the assessment data, item difficulty parameters of the plurality of assessment items and respondent ability parameters of the plurality of respondents (STEP 804). The computer system can determine, using the assessment data, (i) an item difficulty parameter and an item discrimination parameter for each assessment item of the plurality of assessment items, and (ii) a respondent ability parameter for each respondent of the plurality of respondents. The computer system can apply IRT analysis, e.g., as discussed in section B above, to the assessment data. Specifically, the computer system can use, or execute, the IRT tool to solve for the parameter vectors $\alpha$, $\beta$ and $\theta$ (or the parameter vectors $\alpha$, $\beta$, $\theta$ and g) using the assessment data as input data. In some implementations, the computer system can use a different approach or tool to solve for the parameter vectors $\alpha$, $\beta$ and $\theta$ (or the parameter vectors $\alpha$, $\beta$, $\theta$ and g).

The performance scores $s_{i,j}$, $i=1, \ldots, n$, for any assessment item $t_j$ may be dichotomous (or binary), discrete with a finite cardinality greater than two or continuous with infinite cardinality. Table 1 above shows an example of dichotomous assessment data where all the performance scores $s_{i,j}$ are binary. Table 2 above shows an example of discrete assessment data, with at least one assessment item, e.g., assessment item $t_6$, having discrete (or graded) non-dichotomous performance scores with a finite cardinality greater than 2. In the case where the assessment items include at least one discrete non-dichotomous item having a cardinality of possible performance evaluation values (or performance scores $s_{i,j}$) greater than two, the computer system can transform the discrete non-dichotomous assessment item into a number of corresponding dichotomous assessment items equal to the cardinality of possible performance evaluation values. For instance, the performance scores associated with assessment item $t_6$ in Table 2 above have a cardinality equal to four (e.g., the number of possible performance score values is equal to 4 with the possible score values being 0, 1, 2 or 3). The discrete non-dichotomous assessment item $t_6$ is transformed into four corresponding dichotomous assessment items $t_6^1$, $t_6^2$, $t_6^3$ and $t_6^4$ as illustrated in Table 3 above.

The computer system can then determine the item difficulty parameters, the item discrimination parameters and the respondent ability parameters using the corresponding dichotomous assessment items. Once the computer system transforms each discrete non-dichotomous assessment item into a plurality of corresponding dichotomous items (or sub-items), the computer system can use the dichotomous assessment data (after the transformation) as input to the IRT tool. Referring back to Table 2 and Table 3 above, the computer system can transform the assessment data of Table 2 into the corresponding dichotomous assessment data in Table 3, and use the dichotomous assessment data in Table 3 as input data to the IRT tool to solve for the parameter vectors $\alpha$, $\beta$ and $\theta$ (or the parameter vectors $\alpha$, $\beta$, $\theta$ and g). It is to be noted that for a discrete non-dichotomous assessment item, the IRT tool provides multiple difficulty levels associated with the corresponding dichotomous sub-items. The IRT tool may also provide multiple item discrimination parameters $\alpha$ and/or multiple pseudo-guessing item parameter g associated with the corresponding dichotomous sub-items.

In the case where the assessment items include at least one continuous assessment item having an infinite cardinality of possible performance evaluation values (or performance scores $s_{i,j}$), the computer system can transform each continuous assessment item into a corresponding discrete non-dichotomous assessment item having a finite cardinality of possible performance evaluation values (or performance scores $s_{i,j}$). As discussed above in sub-section B.1, the computer system can discretize or quantize the continuous performance evaluation values (or continuous performance scores $s_{i,j}$) into an intermediate (or corresponding) discrete assessment item. The computer system can perform the discretization or quantization according to finite set of discrete performance score levels or grades (e.g., the discrete levels or grades 0, 1, 2, 3 and 4 illustrated in the example in sub-section B.1). The finite set of discrete performance score levels or grades can include integer numbers and/or real numbers, among other possible discrete levels.

The computer system can transform each intermediate discrete non-dichotomous assessment item to a corresponding plurality of dichotomous assessment items as discussed above, and in sub-section B.1, in relation with Table 2 and Table 3. The number of assessment items of the corresponding plurality of dichotomous assessment items is equal to the finite cardinality of possible performance evaluation values for the intermediate discrete non-dichotomous assessment item. The computer system can then determine the item difficulty parameters, the item discrimination parameters and the respondent ability parameters using the corresponding dichotomous assessment items. The computer system can use the final dichotomous assessment items, after the transformation from continuous to discrete assessment item (s) and the transformation from discrete to dichotomous assessment items, as input to the IRT tool to solve for the parameter vectors $\alpha$, $\beta$ and $\theta$ (or the parameter vectors $\alpha$, $\beta$, $\theta$ and g). It is to be noted that for a continuous assessment item, the IRT tool provides multiple difficulty levels associated with the corresponding dichotomous sub-items. The IRT tool may also provide multiple item discrimination parameters $\alpha$ and/or multiple pseudo-guessing item parameter g associated with the corresponding dichotomous sub-items.

The method 800 can include determining one or more respondent-specific parameters for each respondent of the plurality of respondents (STEP 806). The computer system can determine, for each respondent of the plurality of respondents, one or more respondent-specific parameters using respondent ability parameters of the plurality of respondents and item difficulty parameters and item discrimination parameter of the plurality of assessment items. The one or more respondent-specific parameters can include an expected performance parameter of the respondent.

In some implementations, the expected performance parameter for each respondent of the plurality of respondents can include at least one of an expected total performance score of the respondent across the plurality of assessment items, an achievement index of the respondent representing a normalized expected total score of the respondent across the plurality of assessment items and/or a classification of the expected performance of the respondent determined based on a comparison of the achievement index to one or more threshold values.

The computer system can determine, for each respondent $r_i$ of the plurality of respondents, the corresponding expected total performance score as:

$$\hat{S}_i = \Sigma_{j=1}^m E(s_{i,j}). \tag{15}$$

The expected total performance score for each respondent represents an expected total performance score for the plurality of assessment items or the corresponding assessment instrument. The expected total performance score $\hat{S}_i$ can be viewed as an expectation of the actual or observed total score $S_i = \Sigma_{j=1}^m s_{i,j}$. In general, the computer system can determine the expected total performance score function $\hat{S}(\theta) = \Sigma_{j=1}^m E(s_j(\theta))$ representing the expected total performance score at each $\theta$, where $E(s_j(\theta))$ represents the expected score for item $t_j$ at ability level $\theta$.

The computer system can determine or compute, for each respondent $r_i$ of the plurality of respondents, a corresponding achievement index denoted as $Aindex_i$. The achievement index $Aindex_i$ of the respondent $r_i$ can be viewed as a normalized measure of the respondent's expected scores across the various assessment items $t_1, \ldots, t_m$. The computer system can compute or determine the achievement index $Aindex_i$ for the respondent $r_i$ as:

$$Aindex_i = 100 \times \frac{\sum_{j=1}^m \frac{E(s_{i,j})}{\max s_j}}{m}. \tag{16}$$

In equation (16), the expected score $E(s_{i,j})$ of respondent $r_i$ at each assessment item $t_j$ is normalized by the maximum score recorded or observed for assessment item $t_1$. The normalized expected scores of respondent $r_i$ at different assessment items are averaged and scaled by a multiplicative factor (e.g., 100). As such, the achievement index $Aindex_i$ is lower bounded by 0 and upper bounded by multiplicative factor (e.g., 100). In some implementations, some other multiplicative factor (e.g., other than 100) can used.

The computer system can determine a classification of the expected performance of respondent $r_i$ based on a discretization or quantization of the achievement index $Aindex_i$. The computer system can discretize the achievement index $Aindex_i$ for each respondent $r_i$, and classify the respondent's expected performance across the plurality of assessment items or the corresponding assessment instrument. For example, the computer system can classify the respondent $r_i$ as "at risk" if $Ainex_i \leq 20$, as a respondent who "needs improvement" if $20 < Ainex_i \leq 40$, and as a "solid" respondent if $40 < Ainex_i \leq 60$. The computer system can classify the respondent $r_i$ as an "excellent" respondent if $60 < Ainex_i \leq 80$, and as an "outstanding" respondent if $80 < Ainex_i \leq 100$. It is to be noted that other ranges and/or classification categories may be used in classifying or categorizing the respondents.

The respondent-specific parameters can include, for each respondent $r_i$, a performance discrepancy parameter and/or an ability gap parameter of the respondent $r_i$. The computer system can determine the performance discrepancy $\Delta S_i$ of each respondent $r_i$ as a difference between the actual or observed total score $S$ and the expected total performance score $\hat{S}_i$. That is, $\Delta S_i = S_i - \hat{S}_i$. In some implementations, the computer system can determine the performance discrepancy $\Delta S_i$ of each respondent $r_i$ as the difference between the actual or observed total score $S_i$ and a target total performance score $S_T$. That is, $\Delta S_i = S_i - S_T$. The target total performance score $S_T$ can be specific to the respondent $r_i$ or a target total performance score to all or a subset of the respondents. The target total performance score $S_T$ can be defined by a manager, a coach, a trainer, or a teacher of the respondents (or of respondent $r_i$). The target total performance score $S_T$ can be defined by a curriculum or predefined requirements.

The computer system can determine the ability gap $\Delta \theta_i$ of each respondent $r_i$ as a difference between an ability $\theta_{a,i}$ corresponding to the actual or observed total score $S_i$ and the ability $\theta_i$ of respondent $r_i$, which corresponds to the expected total performance score. That is, $\Delta \theta_i = \theta_{a,i} - \theta_i$. The computer system can determine $\theta_{a,i}$ using the plot (or function) of the expected aggregate (or total) score $\hat{S}(\theta)$ (e.g., plot or function 404). The computer system can determine $\theta_{a,i}$ by identifying the point of the plot (or function) of the expected aggregate (or total) score $\hat{S}(\theta)$ having a value equal to $S_i$, and project the identified point on the $\theta$-axis to determine $\theta_{a,i}$. The plot (or function) of the expected aggregate (or total) score $\hat{S}(\theta)$ can be determined in a similar way as discussed with regard to plot 404 of FIGS. 4A and 4B. In some implementations, the computer system can determine the ability gap $\Delta\theta_i$ of each respondent $r_i$ as a difference between the ability $\theta_{a,i}$ corresponding to the actual or observed total score $S_i$ and an ability $\theta_T$ corresponding to the target score $S_T$. That is, $\Delta\theta_i = \theta_{a,i} - \theta_T$. The computer system can determine $\theta_{a,i}$ by identifying the point of the plot (or function) of the expected aggregate (or total) score $\hat{S}(\theta)$ having a value equal to $S_T$, and project the identified point on the $\theta$-axis to determine $\theta_T$. In general, the computer system can determine $\theta_{a,i}$ and/or $\theta_T$ using the inverse relationship from the plot (or function) of the expected aggregate (or total) score $\hat{S}(\theta)$ to $\theta$.

The method 800 can include determining one or more contextual parameters (STEP 808). The computer system can determine one or more contextual parameters indicative of at least one of an aggregate characteristic of the plurality of assessment items or an aggregate characteristic of the plurality of respondents, using the item difficulty parameters, the item discrimination parameters and the respondent ability parameters. The one or more contextual parameters can be indicative of at least one of an aggregate characteristic of the plurality of assessment items or an aggregate characteristic of the plurality of respondents. In some implementations, determining the one or more contextual parameters can be optional. For instance, the computer system can determine item specific parameters but not contextual parameters. In other words, the method 800 may include steps 802-808 or steps 802-806 but not step 508.

The one or more contextual parameters can include an average respondent ability representing an average of the abilities of the plurality of respondents, and/or a group (or average) achievement index representing an achievement an average of achievement indices Aindex$_i$ of the plurality of respondents. The computer system can compute or estimate the average group ability, and average class (or group) achievement index. The average respondent ability can be defined as the mean of respondent abilities for the plurality of respondents. That is:

$$\hat{\theta} = \frac{\sum_{i=1}^{n} \theta_i}{n}. \tag{17}$$

The computer system can determine the group (or average) achievement index as the mean of achievement indices of the plurality of respondents. That is:

$$\widehat{Aindex} = \frac{\sum_{i=1}^{n} Aindex_i}{n}. \tag{18}$$

The group (or average) achievement index can be viewed as a normalized measure of the expected aggregate performance of the plurality of respondents.

The one or more contextual parameters can include a classification of the expected aggregate performance of the plurality of respondents determined based the group (or average) achievement index. The computer system can discretize the group (or average) achievement index $\widehat{Aindex}$, and can classify the expected aggregate performance of the plurality of respondents as:

- if $\widehat{Aindex} \leq 20$: expected aggregate performance is classified as "at risk."
- if $20 < \widehat{Aindex} \leq 40$: expected aggregate performance is classified as "need improvement."
- if $40 < \widehat{Aindex} \leq 60$: expected aggregate performance is classified as "solid."
- if $60 < \widehat{Aindex} \leq 80$: expected aggregate performance is classified as "excellent."
- if $80 < \widehat{Aindex}$: expected aggregate performance is classified as "outstanding."

The one or more contextual parameters can include $\hat{\theta}$, $$\min_i \theta_i, \max_i \theta_i,$$

a classification of an aggregate performance/achievement of the plurality of respondent based on $\widehat{Aindex}$, $\hat{\beta}$, $\widehat{Dindex}$, $H(\theta)$, $R(\theta)$, $$\min_j \beta_j, \max_j \beta_j,$$

the expected total performance score function $\hat{S}(\theta)$, a classification of the plurality of assessment items (or a corresponding assessment instrument) based on $\widehat{Dindex}$, $H(\theta)$, $R(\theta)$, or a combination thereof among others.

In generating the respondents' knowledge base, the computer system can store for each respondent $r_i$ the respective context including, for example, $\hat{\theta}$, $$\min_i \theta_i, \max_i \theta_i,$$

$\widehat{Aindex}$, a classification of an aggregate performance/achievement of the plurality of respondent based on $\widehat{Aindex}$, $\hat{\beta}$, $\widehat{Dindex}$, $H(\theta)$, $R(\theta)$, $$\min_j \beta_j, \max_j \beta_j,$$

the expected total performance score function $\hat{S}(\theta)$, a classification of the plurality of assessment items (or a corresponding assessment instrument) based on $\widehat{Dindex}$, $H(\theta)$, $R(\theta)$, or a combination thereof among others. These parameters represent aggregate characteristics or attributes of the plurality of respondent and/or aggregate characteristics of the plurality of assessment items or the corresponding assessment instrument. These contextual parameters when associated or mapped with each respondent allow for comparison or assessment of respondents across different classes, schools, school districts, teams or departments as well as across different assessment instruments. Also, for each learner $r_i$, the computer system can store a respective set of respondent-specific parameters indicative of attributes or characteristics specific to that respondent. The respondent-specific parameters can include $\theta_i$, Aindex$_i$, expected total score $\Sigma_j E(s_{i,j})$ for each respondent $r_i$, actual scores or total actual score for respondent $r_i$, expected total score for respondent $r_i$ given a specific condition (e.g., $\Sigma_j E(s_{i,j}|s_{i,k}=1)$), a performance discrepancy performance discrepancy $\Delta S_i$, ability gap $\Delta\theta_i$, classifications thereof or a combination thereof.

The computer system can provide access to (e.g., display on display device, provide via an output device or transmit via a network) the respondents' knowledge base or any combination of respective parameters. The computer system can store the respondents' knowledge base in a searchable database and provide UIs to access the database and display or retrieve parameters thereon. In some implementations, the computer system can generate or reconstruct visual representations of one or more parameters maintained in the respondents' knowledge base. For instance, the computer system can reconstruct and provide for display a visual representation depicting respondents' success probabilities in terms of both respondents' abilities and the assessment items' difficulties. For example, the computer system can generate a heat/Wright map representing respondent's success probability as a function of item difficulty and respondent ability.

Given the set of assessment items' difficulties $\{\beta_1, \ldots, \beta_m\}$ and the set of respondents' abilities $\{\theta_1, \ldots, \theta_n\}$, the computer system can create a two-dimensional (2-D) grid. The computer system can sort the list of respondents $\{r_1, \ldots, r_n\}$ according to ascending order of the corresponding abilities, and can sort the list of assessment items $\{t_1, \ldots, t_m\}$ according to ascending order of the corresponding difficulties. The computer system can set the x-axis of the grid to reflect the sorted list of assessment items $\{t_1, \ldots, t_m\}$ or corresponding difficulties $\{\beta_3, \ldots \beta_m\}$, and set the y-axis of the grid to reflect the sorted list of respondents $\{r_1, \ldots, r_n\}$ or the corresponding abilities $\{\theta_1, \ldots, \theta_n\}$. The computer system can assign to each cell representing a respondent $r_i$ and an assessment item $t_j$ a corresponding color illustrating the probability of success $P_{i,j} = P(a_{i,j}=1|\theta_i, \beta_j, \alpha_j)$ of the respondent $r_i$ in the assessment item $t_j$.

Figure 9:
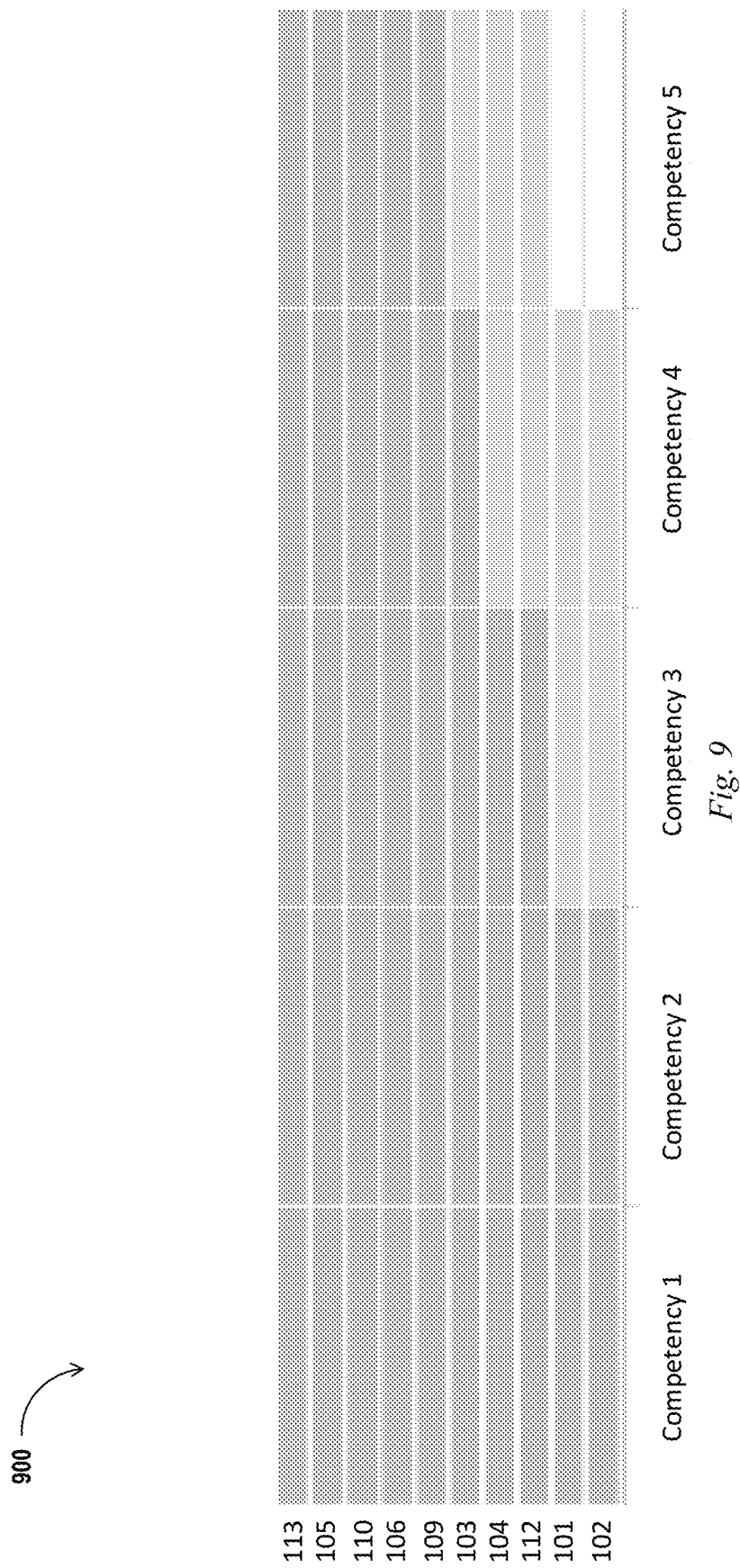
FIG. 9 shows an example heat map illustrating respondent's success probability for various competencies (or assessment items) that are ordered according to increasing difficulty and various respondents that are ordered according to increasing ability level, according to example embodiments.

FIG. 9 shows an example heat map 900 illustrating respondent's success probability for various competencies (or assessment items) that are ordered according to increasing difficulty. The y-axis indicates respondent identifiers (IDs) where the respondents are ordered according to increasing ability level. As we move left to right the item difficulty increases and the probability of success decreases. Also, as we move bottom to top the ability level increases and so does the probability of success. Accordingly, the bottom right corner represents the region with lowest probability of success.

While Table 1 includes multiple cells with no learner response (indicated as "NA") for some respondent-item pairs, the computer system can predict the success probability for each $(r_i, t_j)$ pair, including pairs with no corresponding learner response available. For example, the computer system can first run the IRT model on the original data, and then use the output of the IRT tool or model to predict the score for each $(r_i, t_j)$ pair with no respective score. The computer system can run the IRT model on the data with predicted scores added.

E. Generating a Universal Knowledge Base of Assessment Items

The assessment items' knowledge base discussed in Section C above makes it difficult to compare assessment items across different assessment instruments. One approach may be to use a similarity distance function (e.g., Euclidean distance) that is defined in terms of item-specific parameters and contextual parameters associated with different assessment instruments. For example, the similarity distance between an assessment item $t_p^1$ that belongs to a first assessment instrument $T_1$ and an assessment item $t_q^2$ that belongs to a second assessment instrument $T_2$ can be defined as:

$$D(t_p^1, t_q^2) = |\beta_p^1 - \beta_q^2| + |\hat{\beta}^1 - \hat{\beta}^2| + |\hat{\theta}^1 - \hat{\theta}^2| \quad (19)$$

where $\beta_p^1$ and $\beta_q^2$ represent the difficulties of assessment items $t_p^1$ and $t_q^2$ in assessment instruments $T_1$ and $T_2$, respectively, $\hat{\beta}^1$ and $\hat{\beta}^2$ represent the average item difficulties for assessment instruments $T_1$ and $T_2$, respectively, and $\hat{\theta}^1$ and $\hat{\theta}^2$ represent average respondent abilities for assessment instruments $T_1$ and $T_2$.

One weakness of the similarity distance function in equation (19) is that similarity between assessment items in different assessment instruments require the assessment instruments to have similar contextual parameters, e.g., $\hat{\beta}$ and $\hat{\theta}$. However, such requirement is very restrictive. Assessment items in different assessment instruments may be similar even if the contextual parameters of the assessment instruments are significantly different. The formulation in equation (19) or other similar formulations may not identify similar assessment items across assessment instruments with significantly different contextual parameters.

In the current Section, embodiments for generating a universal knowledge bases of assessment items, or universal attributes of assessment items, are described. As used herein, the term universal implies that the universal attributes allow for comparing assessment items across different assessment instruments. Distinct assessment instruments can include different sets of assessment items and/or different sets of respondents. Yet, the embodiments described herein still allow for comparison of assessment items across these distinct assessment instruments.

Figure 10:
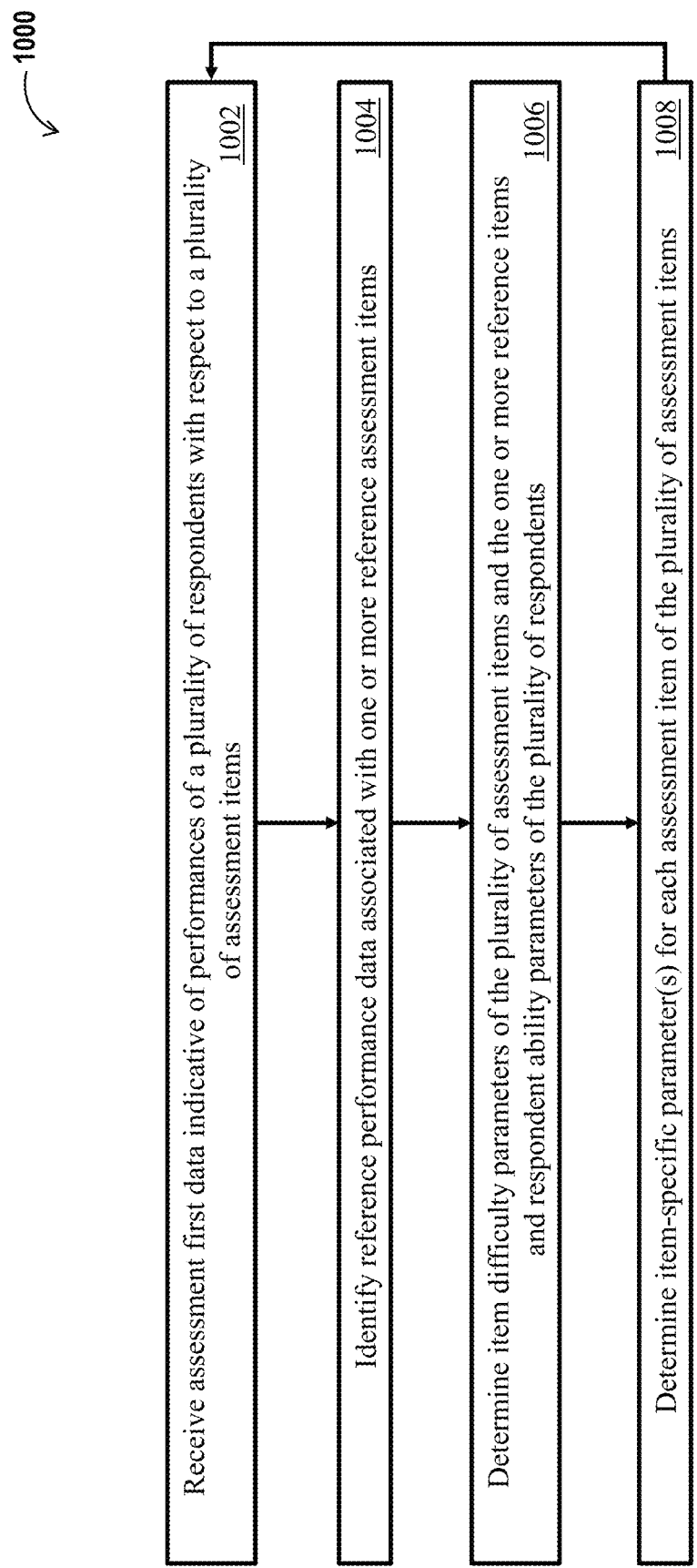
FIG. 10 shows a flowchart illustrating a method of providing universal knowledge bases of assessment items, according to example embodiments.

Referring to FIG. 10, a flowchart illustrating a method 1000 of providing universal knowledge bases of assessment items is shown, according to example embodiments. In brief overview, the method 1000 can include receiving first assessment data indicative of performances of a plurality of respondents with respect to a plurality of assessment items (STEP 1002), and identifying reference performance data associated with one or more reference assessment items (STEP 1004). The method 1000 can include determining item difficulty parameters of the plurality of assessment items and the one or more reference items, and respondent ability parameters of the plurality of respondents (STEP 1006). The method 1000 can include determining item-specific parameters for each assessment item of the plurality of assessment items (STEP 1008).

The method 1000 can be executed by a computer system including one or more computing devices, such as computing device 100. The method 1000 can be implemented as computer code instructions, one or more hardware modules, one or more firmware modules or a combination thereof. The computer system can include a memory storing the computer code instructions, and one or more processors for executing the computer code instructions to perform method 1000 or steps thereof. The method 1000 can be implemented as computer code instructions stored in a computer-readable medium and executable by one or more processors. The method 1000 can be implemented in a client device 102, in a server 106, in the cloud 108 or a combination thereof.

The method 1000 can include the computer system, or one or more respective processors, receiving assessment data indicative of performances of a plurality of respondents with respect to a plurality of assessment items (STEP 1002). The assessment data can be for n respondents, $r_1, \ldots, r_n$, and m assessment items $t_1, \ldots, t_m$. The assessment data can include a performance score for each respondent $r_i$ at each assessment item $t_j$. That is, the assessment data can include a performance score $s_{i,j}$ for each respondent-assessment item pair $(r_i, t_j)$. Performance score(s) may not be available for few pairs $(r_i, t_j)$. The assessment data can further include, for each respondent $r_i$, a respective aggregate score $S_i$ indicative of a total score of the respondent in all (or across all) the assessment items. The computer system can receive or obtain the assessment data via an I/O device 130, from a memory, such as memory 122, or from a remote database.

In some implementations, the assessment data can be represented via a response or assessment matrix. An example response matrix (or assessment matrix) can be defined as:

TABLE 4

Response/assessment matrix.

|  | $t_1$ | $t_1$ | ... | $t_m$ |
|---|---|---|---|---|
| $r_1$ | $s_{11}$ | $s_{12}$ | ... | $s_{1m}$ |
| $r_2$ | $s_{21}$ | $s_{22}$ | ... | $s_{2m}$ |
| . | . | . | . | . |
| $r_n$ | $s_{n1}$ | $s_{n2}$ | ... | $s_{nm}$ |

The method 1000 can include the computer system identifying or determining reference assessment data associated with one or more reference assessment items (STEP 1004). The computer system can identify the reference assessment data to be added to the assessment data indicative of the performances of the plurality of respondents. In other words, the reference data and/or the one or more reference assessment items can be used for the purpose of providing reference points when analyzing the assessment data indicative of the performances of the plurality of respondents. The reference data and the one or more reference assessment items may not contribute to the final total scores of the plurality of respondents with respect to the assessment instrument $T=\{t_1, \ldots, t_m\}$. Identifying or determining the reference assessment data can include the computer system determining or assigning, for each respondent of the plurality of respondents, one or more respective assessment scores with respect to the one or more reference assessment items.

In some implementations, the one or more reference items can include hypothetical assessment items (e.g., respective scores are assigned by the computer system). For example, the one or more reference items can include a hypothetical assessment item $t_w$ having a lowest possible difficulty. The hypothetical assessment item $t_w$ can be defined to be very easy, such that every respondent or learner $r_i$ of the plurality of respondents $r_1, \ldots, r_n$ can be assigned the maximum possible score value of the hypothetical assessment $t_w$, denoted herein as $\max_{tw}$. The one or more reference items can include a hypothetical assessment item $t_s$ having a highest possible difficulty. The hypothetical assessment $t_s$ can be defined to be very difficult, such that every respondent or learner $r_i$ of the plurality of respondents $r_1, \ldots, r_n$ can be assigned the minimum possible score value of the hypothetical assessment $t_s$, denoted herein as mints.

Table 5 below shows the response matrix of Table 4 with reference assessment data (e.g., hypothetical assessment data) associated with the reference assessment items $t_w$ and $t_s$ added. The computer system can append the assessment data of the plurality of respondents with the with reference assessment data (e.g., hypothetical assessment data) associated with the reference assessment items $t_w$ and $t_s$. In the assessment data of Table 5, the computer system can assign the score value $\max_{tw}$ (e.g., maximum possible score value of the hypothetical assessment $t_w$) to all respondents $r_1, \ldots, r_n$ in the assessment item $t_w$, and can assign the score value mints (e.g., minimum possible score value of the hypothetical assessment $t_s$) to all respondents $r_1, \ldots, r_n$ in the assessment item $t_s$.

TABLE 5

Response matrix with reference assessment items $t_w$ and $t_s$.

|  | $t_1$ | $t_2$ | ... | $t_m$ | $t_w$ | $t_s$ |
|---|---|---|---|---|---|---|
| $r_1$ | $s_{1,1}$ | $s_{1,2}$ | ... | $s_{1,m}$ | $\max_{rw}$ | $\min_{ts}$ |
| $r_2$ | $s_{2,1}$ | $s_{2,2}$ | ... | $s_{2,m}$ | $\max_{rw}$ | $\min_{ts}$ |
| . | . | . | . | . | $\max_{rw}$ | $\min_{ts}$ |
| $r_n$ | $s_{n,1}$ | $s_{n,2}$ | ... | $s_{n,m}$ | $\max_{rw}$ | $\min_{ts}$ |

The response matrix in Table 5 illustrates an example implementation of a response matrix including reference assessment data associated with reference assessment items. In general, the number of reference assessment items can be any number equal to or greater than 1. Also, the performance scores of the respondents with respect to the one or more reference assessment items can be defined in various other ways. For example, the reference assessment items do not need to include an easiest assessment item or a most difficult assessment item.

In some implementations, the one or more reference assessment items can include one or more actual assessment items for which each respondent gets one or more respective assessment scores. However, the one or more respective assessment scores of each respondent for the one or more reference assessment items do not contribute to the total or overall score of the respondent with respect to the assessment instrument. In the context of exams for example, one or more test questions can be included in multiple different exams. The different exams can include different sets of questions and can be taken by different exam takers. The exam takers in all of the exams do not know which questions are test questions. Also, in each of the exams, the exam takers are graded on the test questions, but their scores in the test questions do not contribute to their overall score in the exam they took. As such, the test questions can be used as references assessment items. The test questions, however, can be known to the computer system. For instance, indications of the test questions can be received as input by the computer system.

In some implementations, the computer system can further identify one or more reference respondent with corresponding reference performance data, and can add the corresponding reference performance data to the assessment data of the plurality of respondents $r_1, \ldots, r_n$ and the reference assessment data for the one or more reference assessment items. Identifying or determining the one or more reference respondents can include the computer system determining or assigning, for each reference respondent, respective assessment scores in all the assessment items (e.g., assessment items $t_1, \ldots, t_m$ and the one or more reference assessment items).

The one or more reference respondents can be, or can include, one or more hypothetical respondents. For example, the one or more reference respondents can include a hypothetical learner or respondent $r_w$ having a lowest possible ability and/or a hypothetical respondent $r_s$ having a highest possible ability. The hypothetical respondent $r_w$ can represent someone with the lowest possible ability among all respondents, and can be assigned the minimum possible score value in each assessment item except in the reference assessment item $t_w$ where the reference respondent $r_w$ is assigned the maximum possible score $\max_{t_w}$. The hypothetical respondent $r_s$ can represent someone with the highest possible ability among all respondents, and can be assigned the maximum possible score value in each assessment item including the reference assessment item $t_s$.

Table 6 below shows the response matrix of Table 5 with reference performance data (e.g., hypothetical performance data) for the reference respondents $r_w$ and $r_s$ being added. Table 6 represents the original assessment data of Table 4 appended with performance data associated with assessment items $t_w$ and $t_s$ and performance data for reference respondents $r_w$ and $r_s$. In the assessment data of Table 6, the score values $\min_1, \min_2, \ldots, \min_m$ represent the minimum possible performance scores in the assessment items $t_1, \ldots, t_m$, respectively, and the score values $\max_1, \max_2, \ldots, \max_m$ represent the maximum possible performance scores in the assessment items $t_1, \ldots, t_m$, respectively.

TABLE 6

Response matrix with reference assessment items $t_w$ and $t_s$ and reference respondents $r_w$ and $r_s$.

| | $t_1$ | $t_2$ | ... | $t_m$ | $t_w$ | $t_s$ |
|---|---|---|---|---|---|---|
| $r_1$ | $s_{1,1}$ | $s_{1,2}$ | ... | $s_{1,m}$ | $\max_{t_w}$ | $\min_{t_s}$ |
| $r_2$ | $s_{2,1}$ | $s_{2,2}$ | ... | $s_{2,m}$ | $\max_{t_w}$ | $\min_{t_s}$ |
| . | . | . | . | . | $\max_{t_w}$ | $\min_{t_s}$ |
| $r_n$ | $s_{n,1}$ | $s_{n,2}$ | ... | $s_{n,m}$ | $\max_{t_w}$ | $\min_{t_s}$ |
| $r_w$ | $\min_1$ | $\min_2$ | ... | $\min_m$ | $\max_{t_w}$ | $\min_{t_s}$ |
| $r_s$ | $\max_1$ | $\max_2$ | ... | $\max_m$ | $\max_{t_w}$ | $\max_{t_s}$ |

In some implementations, the computer system can identify any number of reference respondents. In some implementations, the computer system can define the one or more reference respondents and the respective performance scores in a different way. For example, the computer system can assign target performance scores to the one or more reference respondents. The target performance scores can be defined by a teacher, coach, trainer, mentor or manager of the plurality of respondents. The one or more reference respondents can include a reference respondent having respective performance scores equal to target scores set for all the respondents $r_1, \ldots, r_n$ or for a subset of the respondents. For instance, the one or more reference respondents can represent various targets for various respondents.

The method 1000 can include the computer system, or the one or more respective processors, determining item difficulty parameters of the plurality of assessment items and the one or more reference assessment items and respondent ability parameters for the plurality of respondents (STEP 1006). The computer system can determine, using the first assessment data and the reference assessment data, (i) an item difficulty parameter for each assessment item of the plurality of assessment items and the one or more reference assessment items, and (ii) a respondent ability parameter for each respondent of the plurality of respondents. The computer system can apply IRT analysis, e.g., as discussed in section B above, to the assessment data and the reference assessment data for the one or more reference assessment items. Specifically, the computer system can use, or execute, the IRT tool to solve for the parameter vectors $\beta$ and $\theta$, the parameter vectors $\alpha$, $\beta$ and $\theta$, or the parameter vectors $\alpha$, $\beta$, $\theta$ and g, using the assessment data and the reference assessment data as input data. For example, the computer system can use, or execute, the IRT tool to solve for the parameter vectors $\beta$ and $\theta$, the parameter vectors $\alpha$, $\beta$ and $\theta$, or the parameter vectors $\alpha$, $\beta$, $\theta$ and g, using a response matrix as described with regard to Table 5 or Table 6 above. In some implementations, the computer system can use a different approach or tool to solve for the parameter vectors $\beta$ and $\theta$, the parameter vectors $\alpha$, $\beta$ and $\theta$, or the parameter vectors $\alpha$, $\beta$, $\theta$ and g.

The performance scores $s_{i,j}$, $i=1, \ldots, n$, for any assessment item $t_j$ or any reference assessment item may be dichotomous (or binary), discrete with a finite cardinality greater than two or continuous with infinite cardinality. In the case where the assessment items include at least one discrete non-dichotomous item having a cardinality of possible performance evaluation values (or performance scores $s_{i,j}$) greater than two, the computer system can transform the discrete non-dichotomous assessment item into a number of corresponding dichotomous assessment items equal to the cardinality of possible performance evaluation values. For instance, the performance scores associated with assessment item $t_6$ in Table 2 above have a cardinality equal to four (e.g., the number of possible performance score values is equal to 4 with the possible score values being 0, 1, 2 or 3). The discrete non-dichotomous assessment item $t_6$ is transformed into four corresponding dichotomous assessment items $t_6^0$, $t_6^1$, $t_6^2$ and $t_6^3$ as illustrated in Table 3 above.

The computer system can then determine the item difficulty parameters and the respondent ability parameters using the corresponding dichotomous assessment items. The computer system may further determine, for each assessment item $t_j$, the respective item discrimination parameter $\alpha_j$ and/or the respective item pseudo-guessing parameters $g_j$. Once the computer system transforms each discrete non-dichotomous assessment item into a plurality of corresponding dichotomous items (or sub-items), the computer system can use the dichotomous assessment data (after the transformation) as input to the IRT tool. Referring back to Table 2 and Table 3 above, the computer system can transform the assessment data of Table 2 into the corresponding dichotomous assessment data in Table 3, and use the dichotomous assessment data in Table 3 as input data to the IRT tool to solve for the parameter vectors $\beta$ and $\theta$, the parameter vectors $\alpha$, $\beta$ and $\theta$, or the parameter vectors $\alpha$, $\beta$, $\theta$ and g (e.g., for initial assessment items $t_1, \ldots, t_m$, reference assessment item(s), initial respondents $r_1, \ldots, r_n$ and/or reference respondents). It is to be noted that for a discrete non-dichotomous assessment item, the IRT tool provides multiple difficulty levels associated with the corresponding dichotomous sub-items. The IRT tool may also provide multiple item discrimination parameters $\alpha$ and/or multiple pseudo-guessing item parameter g associated with the corresponding dichotomous sub-items.

In the case where the assessment items (initial and/or reference items) include at least one continuous assessment item having an infinite cardinality of possible performance evaluation values (or performance scores $s_{i,j}$), the computer system can transform each continuous assessment item into a corresponding discrete non-dichotomous assessment item having a finite cardinality of possible performance evaluation values (or performance scores $s_{i,j}$). As discussed above in sub-section B.1, the computer system can discretize or quantize the continuous performance evaluation values (or continuous performance scores $s_{i,j}$) into an intermediate (or corresponding) discrete assessment item. The computer system can perform the discretization or quantization according to finite set of discrete performance score levels or grades (e.g., the discrete levels or grades 0, 1, 2, 3 and 4 illustrated in the example in sub-section B.1). The finite set of discrete performance score levels or grades can include integer numbers and/or real numbers, among other possible discrete levels.

The computer system can transform each intermediate discrete non-dichotomous assessment item to a corresponding plurality of dichotomous assessment items as discussed above, and in sub-section B.1, in relation with Table 2 and Table 3. The number of assessment items of the corresponding plurality of dichotomous assessment items is equal to the finite cardinality of possible performance evaluation values for the intermediate discrete non-dichotomous assessment item. The computer system can then determine the item difficulty parameters, the item discrimination parameters and the respondent ability parameters using the corresponding dichotomous assessment items. The computer system can use the final dichotomous assessment items, after the transformation from continuous to discrete assessment item(s) and the transformation from discrete to dichotomous assessment items, as input to the IRT tool to solve for the parameter vectors β and θ, the parameter vectors α, β and θ, or the parameter vectors α, β, θ and g (e.g., for initial assessment items $t_1, \ldots, t_m$, reference assessment item(s), initial respondents $r_1, \ldots, r_n$ and reference respondents). It is to be noted that for a continuous assessment item, the IRT tool provides multiple difficulty levels associated with the corresponding dichotomous sub-items. The IRT tool may also provide multiple item discrimination parameters α and/or multiple pseudo-guessing item parameter g associated with the corresponding dichotomous sub-items.

The method 1000 can include the computer determining one or more item-specific parameters for each assessment item of the plurality of assessment items (STEP 1008). The computer system can determine, for each assessment item of the plurality of assessment items $t_1, \ldots, t_m$, one or more item-specific parameters indicative of one or more characteristics of the assessment item. The one or more item-specific parameters of the assessment item can include a normalized item difficulty defined in terms of the item difficulty parameter of the assessment item and one or more item difficulty parameters of the one or more reference assessment items. For instance, for each assessment item $t_j$ of the plurality of assessment items $t_1, \ldots, t_m$, the computer system can determine the corresponding normalized item difficulty $\overline{\beta}_j$ as:

$$\overline{\beta}_j = \frac{\beta_j - \beta_w}{\beta_s - \beta_w}. \quad (20)$$

The parameters $\beta_w$ and $\beta_s$ can represent the difficulty parameters of reference assessment items, such as reference assessment items $t_w$ and $t_s$, respectively.

The normalized item difficulty parameters $\overline{\beta}_j$ allow for reliable identification of similar items across distinct assessment instruments, given that the assessment instruments share similar reference assessment items (e.g., reference assessment items $t_w$ and $t_s$ can be used in, or added to, multiple assessment instruments before applying the IRT analysis. Given two assessment items $t_p^1$ and t that belong to assessment instruments T1 and T2, respectively, where assessment item $t_p^1$ has a normalized item difficulty $\hat{\beta}_p^1$ and assessment item to has a normalized item difficulty $\hat{\beta}_q^2$, the distance between both difficulties $|\overline{\beta}_p^1 - \overline{\beta}_q^2|$ can be used to compare the corresponding items. The distance between the normalized difficulties provides a more reliable measure of similarity (or difference) between different assessment items, compared to the similarity distance in equation (19), for example.

In general, the normalized difficulty parameters allow for comparing and/or searching assessment items across different assessment instruments. As part of the item-specific parameters of a given assessment item, the computer system can identify and list all other items (in other assessment instruments) that are similar to the assessment item, using the similarity distance $|\overline{\beta}_p^1 - \overline{\beta}_q^2|$.

The computer system can determine, for each assessment item $t_j$ of the plurality of assessment items, a respective item importance $Imp_j$ indicative of the effect of the score or outcome of the assessment item on the overall score or outcome of the corresponding assessment instrument (e.g., the assessment instrument to which the assessment item belongs). The computer system can compute the item importance according as described in Section C in relation with equation (6) and FIG. 6.

The item-specific parameters of each assessment item can include an item entropy of the item defined as a function of the ability variable θ. The computer system can determine the entropy function $H_j(θ)$, for each assessment item $t_j$ as described above in relation with equations (5.a)-(5.c). The computer system can determine, for each assessment item $t_j$, a most informative ability range (MIAR) of the assessment item and/or a classification of the effectiveness (or an effectiveness parameter) of the assessment item (within the corresponding instrument) based on the MIAR of the assessment item. The item-specific parameters, for each assessment item $r_j$, can include the non-normalized item difficulty parameter $\hat{\beta}_j$, the item discrimination parameter $\alpha_j$ and/or the pseudo-guessing item parameter $g_j$.

The computer system can further determine other parameters, such as the average of item difficulty parameters of the plurality of assessment items $\hat{\beta}$, the joint entropy function of the plurality of assessment items H(θ) (as described in equations (9)-(10)), a reliability parameter indicative of a reliability of the plurality of assessment items in assessing the plurality of respondents (as described in equations (11) or (12), or a classification of the reliability of the plurality of assessment items (as described in section C above).

The method 1000 can include the computer system repeating the steps 1002 through 1008 for various assessment instruments. For each assessment item $t_j$ of an assessment instrument $T_p$ (of a plurality of assessment instruments $T_1, \ldots, TK$), the computer system can generate the respective item-specific parameters described above. For example, the item-specific parameters can include the normalized item difficulty $\hat{\beta}_j$, the non-normalized item difficulty $\beta_j$, the item discrimination parameter $\alpha_j$ and/or the pseudo-guessing item parameter $g_j$, the item importance $Imp_j$, the item entropy function $H_j(θ)$ or a vector thereof, the most informative ability range $MIAR_j$ of the assessment item, a classification of the effectiveness (or an effectiveness parameter) of the assessment item (within the corresponding instrument) based on $MIAR_j$ or a combination thereof.

In some implementations, the computer system can generate the universal item-specific parameters using reference assessment data for one or more reference assessment items and reference performance data for one or more reference respondents (e.g., using a response or assessment matrix as described in Table 6). The computer system may further compute or determine, for each respondent $r_i$, a normalized respondent ability defined in terms of the respondent ability and abilities of the reference respondents $r_w$ and $r_s$ as:

$$\overline{\theta}_i = \frac{\theta_i - \theta_w}{\theta_s - \theta_w}. \qquad (21)$$

The parameters $\theta_w$ and $\theta_s$ can represent the ability levels (or reference ability levels) of the reference respondents, such as reference respondents $r_w$ and $r_s$, respectively, and $\theta_i$ is the ability level of the respondent $r_i$ provided (or estimated) by the IRT tool.

Figures 11A, 11B:
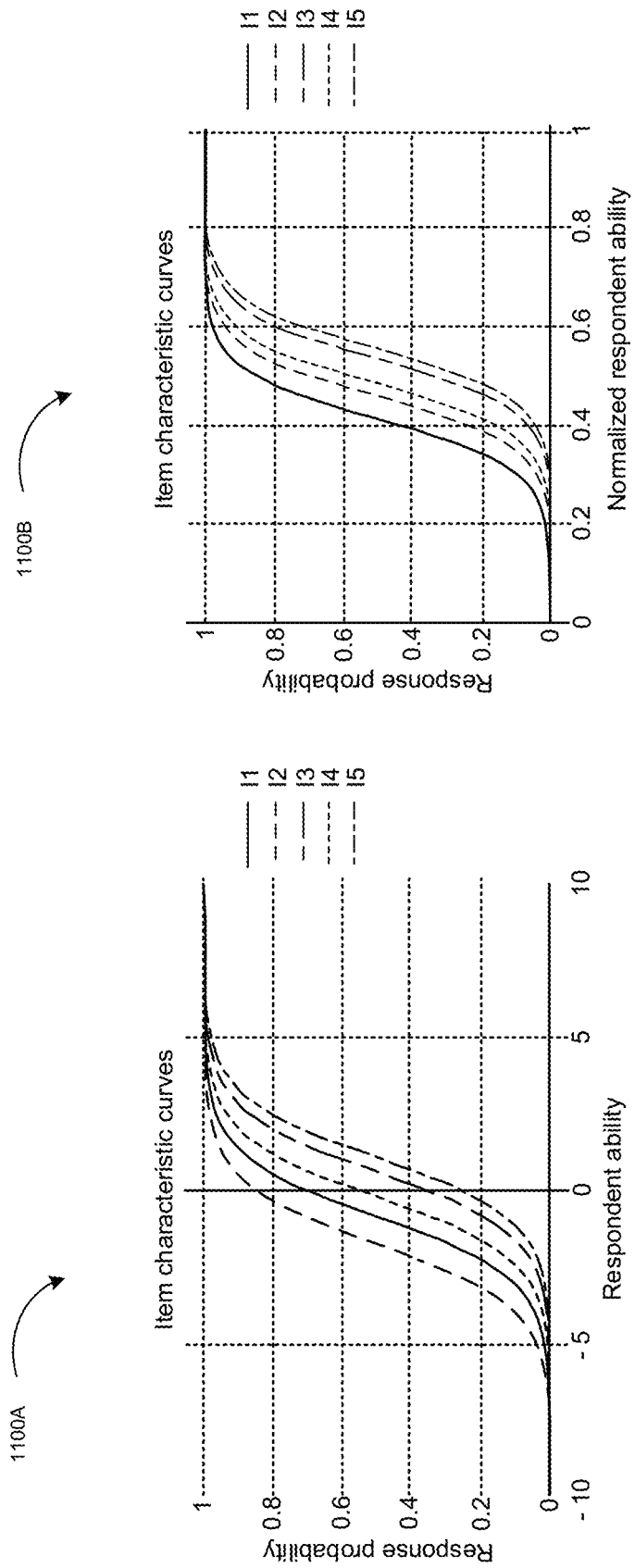
FIGS. 11A-11C show graphs 1100A-1100C for ICCs, transformed ICCs and transformed expected total score function, respectively, according to example embodiments.
Figure 11C:
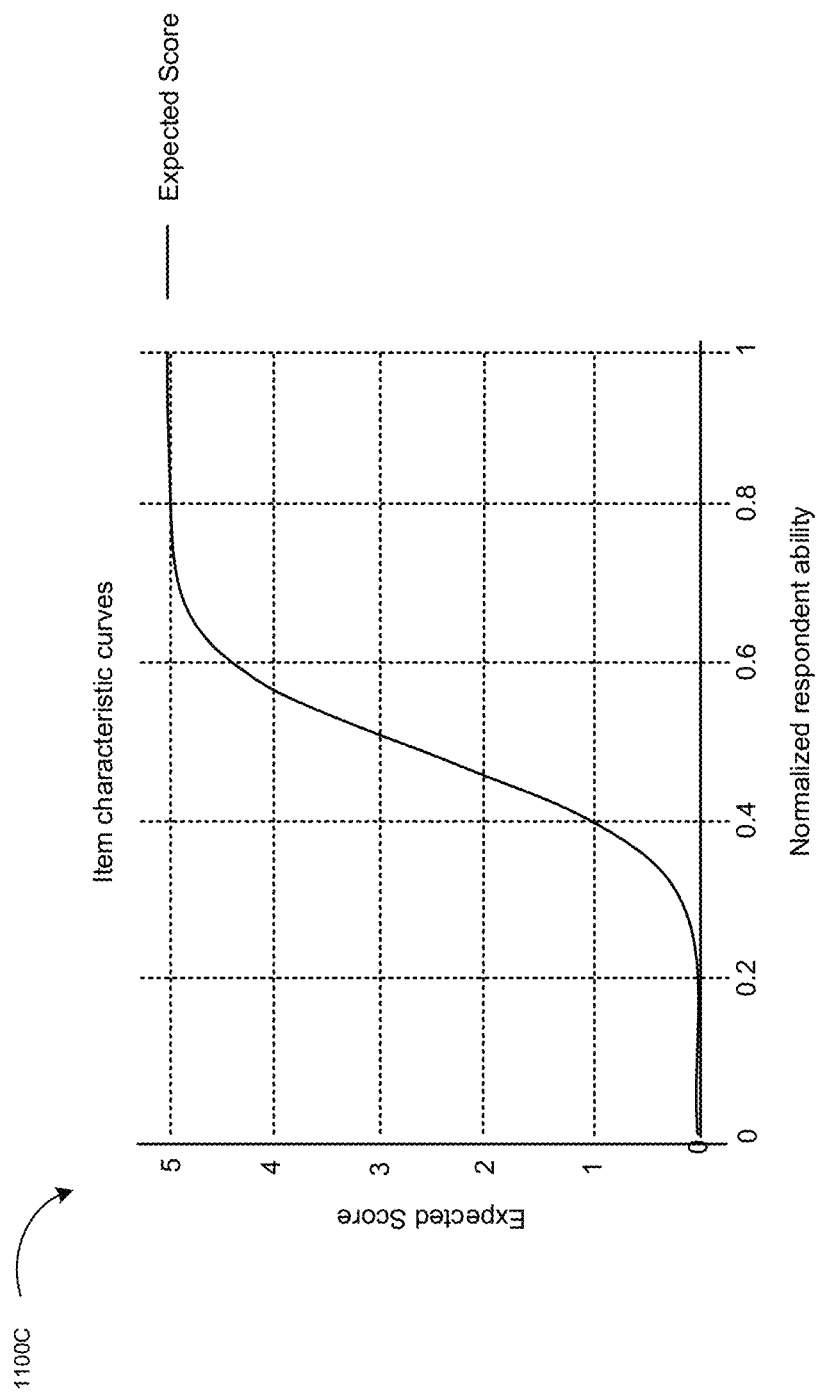

In some implementations, the computer system can generate for each assessment item $t_j$, a transformed item characteristic function (ICF) that is a function of $\overline{\theta}$ instead of $\theta$. One advantage of the transformed ICFs is that they are aligned (with respect to $\theta$) across different assessment instruments, assuming we have the same reference respondents $r_w$ and $r_s$ for all instruments. Referring to FIGS. 11A-11C graphs 1100A-1100C for ICCs, transformed ICC and transformed expected total score function are shown, respectively, according to example embodiments. FIG. 11B shows the transformed versions of the ICCs in FIG. 11A. The x-axis in FIG. 11B is of $\overline{\theta}$ (not $\theta$), and the 0 on the x-axis corresponds to $\theta_w$ (the ability of reference respondents $r_w$), while the 1 on the x-axis corresponds to $\theta_s$ (the ability of reference respondents $r_s$). FIG. 11C shows the plot for the transformed expected total score function $\hat{S}(\overline{\theta})$.

Given multiple transformed ICCs for a given assessment item $t_j$ associated with multiple IRT outputs for different assessment instruments, the computer system can average the ICFs to get a better estimate of the actual ICF (or actual ICC) of the assessment item $t_j$. Such estimate, especially when the averaging is over many assessment instruments, can be viewed as universal probability distribution of the assessment item $t_j$ that is less dependent on the data sample (e.g., assessment data matrix) of each assessment instrument.

The computer system can determine and provide the transformed ICF or transformed ICC (e.g., as a function of $\overline{\theta}$ instead of $\theta$) as an item-specific parameter. The computer system can determine and provide the expected total score function $\hat{S}(\theta)$ or the corresponding transformed version $\hat{S}(\overline{\theta})$ as a parameter for each assessment item.

Using normalized item difficulties, non-normalized item difficulties, normalized respondent abilities and non-normalized respondent abilities allows for identifying and retrieving assessment items having difficulty values p that are similar to (or close to) a respondent's ability $\overline{\theta}_i$. Given a respondent $r_i$ associated with a first assessment instrument $T_1$ and having a respective normalized universal ability $\overline{\theta}_i^1$, and given an assessment item $t_j$ that belongs to a second assessment instrument $T_2$, a similarity distance between the respondent $r_i$ and the assessment item $t_j$ can be defined as:

$$D(\overline{\theta}_i^1, \beta_j^2) = |\overline{\theta}_i^1 - \overline{\theta}_k^2| + |\theta_k^2 - \beta_j^2|. \qquad (22)$$

The parameter $\overline{\theta}_k^2$ represents a normalized ability of a respondent $r_k$ associated with the second assessment instrument $T_2$, the parameter $\theta_k^2$ represents the non-normalized ability of the respondent $r_k$ associated with the second assessment instrument $T_2$, and the parameter $\beta_j^2$ represents the non-normalized difficulty of the assessment item $t_j$ in the second assessment instrument $T_2$.

The first term $|\theta_i^1 - \theta_k^2|$ in equation (22), when it is relatively small, allows for finding/identifying a respondent $r_k$ in the second assessment instrument $T_2$ that has a similar ability as the respondent $r_i$ associated with the first assessment instrument $T_1$. The second term $|\theta_i^1 - \beta_j^2|$ in equation (20), when it is relatively small, allows for finding/identifying an assessment item $t_j$ in the second assessment instrument $T_2$ that has a difficulty equal/close to the ability of respondent $r_k$. The use of both terms in equation (20) accounts for the fact that the item difficulty parameters and respondent ability parameters are normalized differently. While the normalized item difficulties are computed in terms of $\beta_w$ and $\beta_s$, the normalized respondent abilities are computed in terms of $\theta_w$ and $\theta_s$ (see equations (20) and (21) above).

The similarity distance in equation (22) allows for accurately finding assessment items, in different assessment instruments (or assessment tools), that have difficulty levels close to a specific respondent's ability level. Such feature is beneficial and important in designing assessment instruments or learning paths. On way to implement a search based on equation (22) is to first identify a subset of respondents $r_k$ such that $|\theta_i^1 - \theta_k^2|$ is smaller than a predefined threshold value (or a subset of respondents corresponding to the 1 smallest $|\theta_i^1 - \theta_k^2|$), and then for each respondent in the subset identify the assessment items for which the similarity distance $D(\overline{\theta}_i^1, \beta_j^2)$ of equation (22) is smaller than another threshold value.

In some implementations, using normalized item difficulties, non-normalized item difficulties, normalized respondent abilities and non-normalized respondent abilities allows for identifying and retrieving a learner respondent with an ability level that is close to a difficulty level of an assessment item. Given an assessment item $t_j$ associated with a first assessment instrument $T_1$ and having a normalized difficulty $\overline{\beta}_j^1$, and given a respondent $r_k$ that belongs to a second assessment instrument $T_2$ and having a non-normalized ability level $\theta_k^2$, a similarity distance between the assessment item $t_j$ and the respondent k can be defined as:

$$D(\overline{\beta}_j^1, \theta_k^2) = |\overline{\beta}_j^1 - \overline{\beta}_l^2| + |\beta_l^2 - \theta_k^2|. \qquad (23)$$

The first term $|\overline{\beta}_j^1 - \overline{\beta}_l^2|$ in equation (23), when it is relatively small, allows for finding/identifying an assessment item $t_l$ in the second assessment instrument $T_2$ that has a similar difficulty level as the assessment item $t_j$ associated with the first assessment instrument $T_1$. The second term $|\beta_l^2 - \theta_k^2|$ in equation (23), when it is relatively small, allows for finding/identifying a respondent $r_k$ in the second assessment instrument $T_2$ that has a non-normalized ability value $\theta_k$ close to the non-normalized difficulty value $\beta_l^2$ of assessment item $t_l$. The use of both terms in equation (23) accounts for the fact that the item difficulty parameters and respondent ability parameters are normalized differently. While the normalized item difficulties are computed in terms of $\beta_w$ and $\beta_s$, the normalized respondent abilities are computed in terms of $\theta_w$ and $\theta_s$ (see equations (20) and (21) above). On way to implement a search based on equation (23) is to first identify a subset of items $t_l$ such that $|\overline{\beta}_j^1 - \overline{\beta}_l^2|$ is smaller than a predefined threshold value (or a subset of assessment items corresponding to the q smallest $|\overline{\beta}_j^1 - \overline{\beta}_l^2|$), and then for each assessment item in the subset identify the respondents for which the similarity distance D $(\overline{\beta}_j^1, \theta_k^2)$ of equation (23) is smaller than a another threshold value.

The similarity distance in equation (21) allows for accurately identifying/finding/retrieving learners or respondents from different assessment tools/instruments with an ability level that is close (e.g., D $(\overline{\beta}_j^1, \theta_k^2) \leq$ Threshold) to a specific item difficulty level. Such feature is beneficial in identifying learners that could tutor, or could be study buddies of, another learner having difficulty with a certain task or assessment item. Such learners can be chosen such that their probability of success on the given task or assessment item is relatively high to act as tutors or with similar ability levels as the item difficulty if they would be designated as study buddies. In the context of educational games and when an item represents certain skill level at a certain area, then choosing the group of learners (gamers) to be challenged at that level is another possible application.

The computer system can store the universal knowledge base of the assessment items in a memory or a database. The computer system can provide access to (e.g., display on display device, provide via an output device or transmit via a network) the knowledge base of assessment items or any combination of respective parameters. For instance, the computer system can provide various user interfaces (UIs) for displaying parameters of the assessment items or the knowledge base. The computer system can cause display of parameters or visual representations thereof.

F. Generating a Universal Knowledge Base of Respondents/Evaluatees

The respondents' knowledge base discussed in Section D above makes it difficult to compare respondents' abilities, or more generally respondents' attributes, across different assessment instruments. One approach may be to use a similarity distance function (e.g., Euclidean distance) that is defined in terms of respondent-specific parameters and contextual parameters associated with different assessment instruments. For example, the similarity distance between a respondent $r_p^1$ associated with a first assessment instrument $T_1$ and respondent $r_4$ associated with a second assessment instrument $T_2$ can be defined as:

$$D(r_p^1, r_q^2) = |\theta_p^1 - \theta_q^2| + |\hat{\theta}^1 - \hat{\theta}^2| + |\hat{\beta}^1 - \hat{\beta}^2|, \quad (24)$$

where $\theta_p^1$ and $\theta_q^2$ represent the abilities of respondents $r_p^1$ and $r_q^2$ based on the assessment instruments $T_1$ and $T_2$, respectively, $\hat{\beta}^1$ and $\hat{\beta}^2$ represent the average difficulties for assessment instruments $T_1$ and $T_2$, respectively, and $\hat{\theta}^1$ and $\hat{\theta}^2$ represent average abilities of all respondents as determined based on assessment instruments $T_1$ and $T_2$, respectively.

One weakness of the similarity distance function in equation (24) is that when used to identify similar respondents associated with different assessment instruments, it tends to limit the final results to respondents associated with similar contextual parameters, e.g., $\hat{\beta}$ and $\hat{\theta}$. However, such limitation is very restrictive. Respondents or learners in different assessment instruments may be similar even if the contextual parameters of the assessment instruments are significantly different. The formulation in equation (24) or other similar formulations may not identify similar respondents across assessment instruments with significantly different contextual parameters.

In the current Section, embodiments for generating a universal knowledge bases of respondents, or universal attributes of respondents, are described. As used herein, the term universal implies that the universal attributes allow for comparing respondents' traits across different assessment instruments. Distinct assessment instruments can include different sets of assessment items and/or different sets of respondents. Yet, the embodiments described herein still allow for reliable and accurate comparison of respondents across these distinct assessment instruments.

Figure 12:
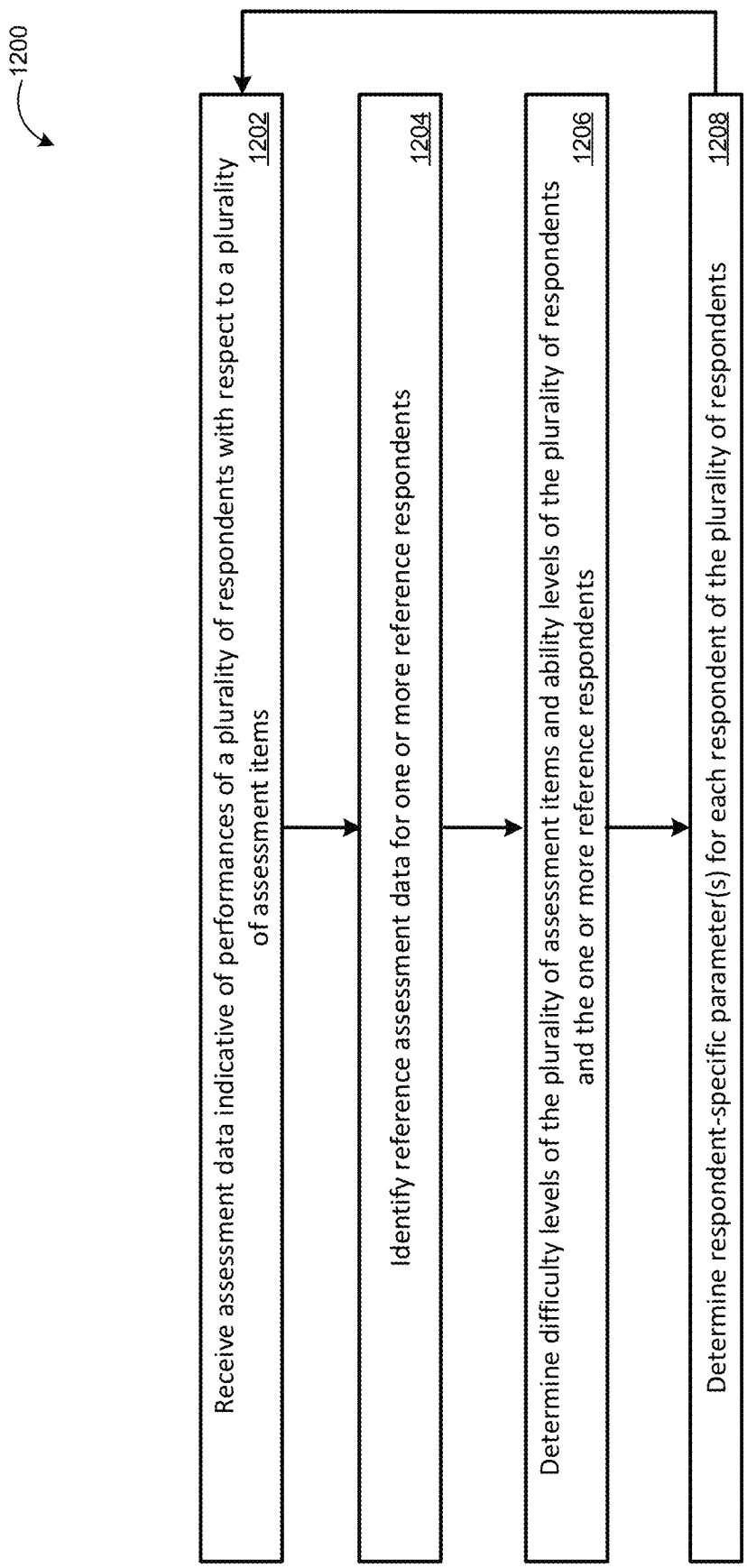
FIG. 12 shows a flowchart illustrating a method of providing universal knowledge bases of respondents, according to example embodiments.

Referring to FIG. 12, a flowchart illustrating a method 1200 of providing universal knowledge bases of respondents is shown, according to example embodiments. In brief overview, the method 1200 can include receiving first assessment data indicative of performances of a plurality of respondents with respect to a plurality of assessment items (STEP 1202), and identifying reference performance data for one or more reference respondents (STEP 1204). The method 1200 can include determining difficulty levels of the plurality of assessment items, and ability levels of the plurality of respondents and the one or more reference respondents (STEP 1206). The method 1200 can include determining respondent-specific parameters for each respondent of the plurality of respondents (STEP 1208).

The method 1200 can be executed by a computer system including one or more computing devices, such as computing device 100. The method 1200 can be implemented as computer code instructions, one or more hardware modules, one or more firmware modules or a combination thereof. The computer system can include a memory storing the computer code instructions, and one or more processors for executing the computer code instructions to perform method 1200 or steps thereof. The method 1200 can be implemented as computer code instructions stored in a computer-readable medium and executable by one or more processors. The method 1200 can be implemented in a client device 102, in a server 106, in the cloud 108 or a combination thereof.

The method 1200 can include the computer system, or one or more respective processors, receiving assessment data indicative of performances of a plurality of respondents with respect to a plurality of assessment items (STEP 1202). The assessment data can be for n respondents, $r_1, \ldots, r_n$, and m assessment items $t_1, \ldots, t_m$. The assessment data can include a performance score for each respondent $r_i$ at each assessment item $t_j$. That is, the assessment data can include a performance score $s_{i,j}$ for each respondent-assessment item pair $(r_i, t_j)$. Performance score(s) may not be available for few pairs $(r_i, t_j)$. The assessment data can further include, for each respondent $r_i$, a respective aggregate score $S_i$ indicative of a total score of the respondent in all (or across all) the assessment items. The computer system can receive or obtain the assessment data via an I/O device 130, from a memory, such as memory 122, or from a remote database. In some implementations, the assessment data can be represented via a response or assessment matrix. An example response matrix (or assessment matrix) is shown in Table 4 above.

The method 1200 can include the computer system identifying or determining reference assessment data for one or more reference respondents (STEP 1204). The computer system can identify the reference assessment data to be added to the assessment data indicative of the performances of the plurality of respondents. In other words, the reference data and/or the one or more reference respondents can be used for the purpose of providing reference points when analyzing the assessment data indicative of the performances of the plurality of respondents. The reference data and the one or more reference respondents may not contribute to the final total scores of the plurality of respondents with respect to the assessment instrument $T = \{t_1, \ldots, t_m\}$. Identifying or determining the reference assessment data can include the computer system determining or assigning, for each reference respondent of the one or more reference respondents, respective assessment scores with respect to the plurality of assessment items.

In some implementations, the one or more reference respondents can include hypothetical respondents (e.g., imaginary individuals who may not exist in real life). For example, the one or more reference respondents can include a hypothetical respondent $r_w$ having a lowest possible ability level among all other respondents. The hypothetical respondent $r_w$ can be defined to have the minimum possible performance score in each of the assessment items $t_1, \ldots, t_m$, which can be viewed as a failing performance in each of the assessment items $t_1, \ldots, t_m$. The one or more reference respondents can include a hypothetical respondent $r_s$ having the maximum possible performance score in each of the assessment items $t_1, \ldots, t_m$.

Table 7 below shows the response matrix of Table 4 with reference assessment data (e.g., hypothetical assessment data) associated with the reference respondents $r_w$ and $r_s$ added. In the assessment data of Table 7, the score values $min_1, min_2, \ldots, min_m$ represent the minimum possible performance scores in the assessment items $t_1, \ldots, t_m$, respectively, and the score values $max_1, max_2, \ldots, max_m$ represent the maximum possible performance scores in the assessment items $t_1, \ldots, t_m$, respectively.

TABLE 7

Response matrix with reference respondents $r_w$ and $r_s$.

|  | $t_1$ | $t_2$ | $\ldots$ | $t_m$ |
|---|---|---|---|---|
| $r_1$ | $s_{1,1}$ | $s_{1,2}$ | $\ldots$ | $s_{1,m}$ |
| $r_2$ | $s_{2,1}$ | $s_{2,2}$ | $\ldots$ | $s_{2,m}$ |
| . | . | . | . | . |
| $r_n$ | $s_{n,1}$ | $s_{n,2}$ | $\ldots$ | $s_{n,m}$ |
| $r_w$ | $min_1$ | $min_2$ | $\ldots$ | $min_m$ |
| $r_s$ | $max_1$ | $max_2$ | $\ldots$ | $max_m$ |

The response matrix in Table 7 illustrates an example implementation of a response matrix including reference assessment data for reference respondents. Table 6 represents the original assessment data of Table 4 appended with performance data for reference respondents $r_w$ and $r_s$. In general, the number of reference respondents can be any number equal to or greater than 1. Also, the performance scores of the reference respondent(s) with respect to the assessment items $t_1, \ldots, t_m$ can be defined in various other ways. For example, the reference respondent(s) can represent one or more target levels (or target profiles) of one or more respondents of the plurality of respondents $r_1, \ldots, r_n$. Such target levels (or target profiles) do not necessarily have maximum performance scores.

In some implementations, the computer system may further identify one or more reference assessment items with corresponding reference performance data, and can add the corresponding reference performance data to the assessment data of the plurality of respondents $r_1, \ldots, r_n$ and the reference assessment data for the one or more reference respondents. Identifying or determining the one or more reference respondents can include the computer system determining or assigning, for each respondent and each reference respondent, respective assessment scores in the one or more reference assessment items.

As discussed above in the previous section, the one or more reference assessment items can be, or can include, one or more hypothetical assessment items or one or more actual assessment items that can be incorporated in the assessment instrument but do not contribute to the overall scores of the respondents $r_1, \ldots, r_n$. For example, the one or more reference assessment items can include a hypothetical assessment item $t_w$ having a lowest possible difficulty level and/or a hypothetical assessment item $t_s$ having a highest possible difficulty level, as discussed above in the previous section. The computer system can assign the score value $max_{rw}$ (e.g., maximum possible score value of the hypothetical assessment $t_w$) to all respondents $r_1, \ldots, r_n$ in the assessment item $t_w$, and can assign the score value mints (e.g., minimum possible score value of the hypothetical assessment $t_s$) to all respondents $r_1, \ldots, r_n$ in the assessment item $t_s$.

The hypothetical respondent $r_w$ can be assigned the minimum possible score value mints (e.g., minimum possible score value of the hypothetical assessment $t_s$) in the reference assessment item $t_s$, and can be assigned the maximum possible score $max_{rw}$ (e.g., maximum possible score value of the hypothetical assessment $t_w$) in the reference assessment item $t_s$. That is, the reference respondent $r_w$ can be defined to perform well only in the reference assessment item $t_w$, and to perform poorly in all other assessment items. The hypothetical respondent $r_s$ can The hypothetical respondent $r_s$ can be assigned the maximum possible score values $max_{rw}$ and $max_{ts}$ in both reference assessment items $t_w$ and $t_s$, respectively. That is, the reference respondent $r_s$ is the only respondent performing well in the reference assessment item $t_s$. Adding the reference assessment data for the reference respondents $r_w$ and $r_s$ and the reference assessment data associated with the reference assessment items $t_w$ and $t_s$ leads to the response matrix (or assessment matrix) described in Table 6 above.

In some implementations, the computer system can identify any number of reference assessment items. In some implementations, the computer system can identify or determine the one or more reference assessment items and the respective performance scores in a different way. For example, the one or more reference assessment items can represent one or more assessment items that were incorporated in the assessment instrument corresponding to (or defined by) the assessment items $t_1, \ldots, t_m$ for testing or analysis purposes (e.g., the items do not contribute to the overall scores of the respondents $r_1, \ldots, r_n$). In such case, the computer system can use the actual obtained scores of the respondents $r_1, \ldots, r_n$ in the reference assessment item(s).

The method 1200 can include the computer system, or the one or more respective processors, determining difficulty levels of the plurality of assessment items and ability levels for the plurality of respondents and the one or more reference respondents (STEP 1206). The computer system can determine, using the first assessment data and the reference assessment data, (i) a difficulty level (or item difficulty value) for each assessment item of the plurality of assessment items, and (ii) an ability level (or ability value) for each respondent of the plurality of respondents and for each reference respondent of one or more reference respondents. The computer system can apply IRT analysis, e.g., as discussed in section B above, to the first assessment data and the reference assessment data for the one or more reference respondents. Specifically, the computer system can use, or execute, the IRT tool to solve for the parameter vectors $\beta$ and $\theta$, the parameter vectors $\alpha$, $\beta$ and $\theta$, or the parameter vectors $\alpha$, $\beta$, $\theta$ and g, using the first assessment data and the reference assessment data for the one or more reference respondents as input data. In some implementations, the input data to the IRT tool can include the first assessment data, the reference assessment data for the one or more reference respondents and the reference assessment data for the one or more reference assessment items. For example, the computer system can use, or execute, the IRT tool to solve for the parameter vectors $\beta$ and $\theta$, the parameter vectors $\alpha$, $\beta$ and $\theta$, or the parameter vectors $\alpha$, $\beta$, $\theta$ and g, using a response matrix as described with regard to Table 7 or Table 6 above. In some implementations, the computer system can use a different approach or tool to solve for the parameter vectors $\beta$ and $\theta$, the parameter vectors $\alpha$, $\beta$ and $\theta$, or the parameter vectors $\alpha$, $\beta$, $\theta$ and g.

The performance scores $s_{i,j}$, $i=1, \ldots, n$, for any assessment item $t_j$ or any reference assessment item may be dichotomous (or binary), discrete with a finite cardinality greater than two or continuous with infinite cardinality. In the case where the assessment items include at least one discrete non-dichotomous item having a cardinality of possible performance evaluation values (or performance scores $s_{i,j}$) greater than two, the computer system can transform the discrete non-dichotomous assessment item into a number of corresponding dichotomous assessment items equal to the cardinality of possible performance evaluation values. For instance, the performance scores associated with assessment item $t_6$ in Table 2 above have a cardinality equal to four (e.g., the number of possible performance score values is equal to 4 with the possible score values being 0, 1, 2 or 3). The discrete non-dichotomous assessment item $t_6$ is transformed into four corresponding dichotomous assessment items $t_6^0$, $t_6^1$, $t_6^2$ and $t_6^3$ as illustrated in Table 3 above.

The computer system can then determine the item difficulty parameters and the respondent ability parameters using the corresponding dichotomous assessment items. The computer system may further determine, for each assessment item $t_j$, the respective item discrimination parameter $\alpha_j$ and/or the respective item pseudo-guessing parameters $g_j$. Once the computer system transforms each discrete non-dichotomous assessment item into a plurality of corresponding dichotomous items (or sub-items), the computer system can use the dichotomous assessment data (after the transformation) as input to the IRT tool. Referring back to Table 2 and Table 3 above, the computer system can transform the assessment data of Table 2 into the corresponding dichotomous assessment data in Table 3, and use the dichotomous assessment data in Table 3 as input data to the IRT tool to solve for the parameter vectors $\beta$ and $\theta$, the parameter vectors $\alpha$, $\beta$ and $\theta$, or the parameter vectors $\alpha$, $\beta$, $\theta$ and $g$ (e.g., for initial assessment items $t_1, \ldots, t_m$, reference assessment item(s), initial respondents $r_1, \ldots, r_n$ and/or reference respondents). It is to be noted that for a discrete non-dichotomous assessment item, the IRT tool provides multiple difficulty levels associated with the corresponding dichotomous sub-items. The IRT tool may also provide multiple item discrimination parameters $\alpha$ and/or multiple pseudo-guessing item parameter $g$ associated with the corresponding dichotomous sub-items.

In the case where the assessment items (initial and/or reference items) include at least one continuous assessment item having an infinite cardinality of possible performance evaluation values (or performance scores $s_{i,j}$), the computer system can transform each continuous assessment item into a corresponding discrete non-dichotomous assessment item having a finite cardinality of possible performance evaluation values (or performance scores $s_{i,j}$). As discussed above in sub-section B.1, the computer system can discretize or quantize the continuous performance evaluation values (or continuous performance scores $s_{i,j}$) into an intermediate (or corresponding) discrete assessment item. The computer system can perform the discretization or quantization according to finite set of discrete performance score levels or grades (e.g., the discrete levels or grades 0, 1, 2, 3 and 4 illustrated in the example in sub-section B.1). The finite set of discrete performance score levels or grades can include integer numbers and/or real numbers, among other possible discrete levels.

The computer system can transform each intermediate discrete non-dichotomous assessment item to a corresponding plurality of dichotomous assessment items as discussed above, and in sub-section B.1, in relation with Table 2 and Table 3. The number of assessment items of the corresponding plurality of dichotomous assessment items is equal to the finite cardinality of possible performance evaluation values for the intermediate discrete non-dichotomous assessment item. The computer system can then determine the item difficulty parameters, the item discrimination parameters and the respondent ability parameters using the corresponding dichotomous assessment items. The computer system can use the final dichotomous assessment items, after the transformation from continuous to discrete assessment item(s) and the transformation from discrete to dichotomous assessment items, as input to the IRT tool to solve for the parameter vectors $\beta$ and $\theta$, the parameter vectors $\alpha$, $\beta$ and $\theta$, or the parameter vectors $\alpha$, $\beta$, $\theta$ and $g$ (e.g., for initial assessment items $t_1, \ldots, t_m$, reference assessment item(s), initial respondents $r_1, \ldots, r_n$ and/or reference respondents). It is to be noted that for a continuous assessment item, the IRT tool provides multiple difficulty levels associated with the corresponding dichotomous sub-items. The IRT tool may also provide multiple item discrimination parameters $\alpha$ and/or multiple pseudo-guessing item parameter $g$ associated with the corresponding dichotomous sub-items.

The method 1200 can include the computer determining one or more respondent-specific parameters for each respondent of the plurality of respondents (STEP 1208). The computer system can determine, for each respondent of the plurality of respondent $r_1, \ldots, r_n$, one or more respondent-specific parameters indicative of one or more characteristics or traits of the respondent. The one or more respondent-specific parameters of the respondent can include a normalized ability level defined in terms of the ability level of the respondent and one or more ability levels (or reference ability levels) of the one or more reference respondents. For instance, for each respondent $r_i$ of the plurality of respondents $r_1, \ldots, r_n$, the computer system can determine the corresponding normalized ability level $\overline{\theta}_i$ as described in equation (21) above.

The normalized ability levels $\overline{\theta}_i$ for each respondent $r_i$ allow for reliable identification of similar respondents (e.g., respondents with similar abilities) across distinct assessment instruments, given that the assessment instruments share similar reference respondents (e.g., reference respondents $r_w$ and $r_s$ can be used in, or added to, multiple assessment instruments before applying the IRT analysis). Given two respondents $r_p^1$ and $r_q^2$ associated with assessment instruments $T_1$ and $T_2$, respectively, where respondent $r_p^1$ has a normalized ability level $\overline{\theta}_p^1$ and respondent $r_q^2$ has a normalized ability level $\overline{\theta}_q^2$, the distance between both ability levels $|\overline{\theta}_p^1 - \overline{\theta}_q^2|$ can be used to compare the corresponding respondents. The distance between the normalized ability levels provides a more reliable measure of similarity (or difference) between different respondents, compared to the similarity distance in equation (24), for example.

In general, the normalized ability levels allow for comparing and/or searching assessment respondents across different assessment instruments. As part of the respondent-specific parameters of a given respondent, the computer system may identify and list all other respondents (in other assessment instruments) that are similar inability to the respondent, using the similarity distance $|\overline{\theta}_p^1 - \overline{\theta}_q^2|$.

The computer system can determine, for each respondent $r_i$ of the plurality of respondents as part of the respondent-specific parameters, an expected performance score $E(s_{i,j})$ of the respondent $r_i$ with respect to each assessment item $t_j$ (as described in equations (7.a) and (7.b) above) of the plurality of assessment items $t_1, \ldots, t_m$, an expected total performance score $\hat{S}_i$ of the respondent $r_i$ (as described in equation (15) above) with respect the plurality of assessment items (or the corresponding assessment instrument), an achievement index $Aindex_i$ of the respondent $r_i$ (as described in equation (16) above) indicative of an average of normalized expected scores of the respondent with respect to the plurality of assessment items, each normalized expected score representing a normalized expected performance of the respondent $r_i$ with respect to a corresponding assessment item, a classification of the expected performance of the respondent determined based on a comparison of the achievement index to one or more threshold values (as described above in section D) or a combination thereof. The respondent-specific parameters of each respondent $r_i$ can include the ability level $\theta_i$ of the respondent, e.g., besides the normalized ability levels $\bar{\theta}_i$.

The computer system can determine, for each respondent $r_i$ of the plurality of respondents as part of the respondent-specific parameters, an entropy $H(\theta_i)$ of an assessment instrument (including or defined by the plurality of assessment items $t_1, \ldots, t_m$) at the ability level $\theta_i$ of the respondent (as described in equation (10) above), an item entropy $H_j((\theta_i)$ of each assessment item $t_j$ of the plurality of assessment items at the ability level $\theta_i$ of the respondent (as described in equations (5.a) through (5.c) above), a reliability score $R(\theta_i)$ of the assessment instrument at the ability level $\theta_i$ of the respondent (as described in equation (12) above), a reliability score $R_j(\theta_i)$ of each assessment item $t_j$ of the plurality of assessment items at the ability level $\theta_i$ of the respondent (as described in equation (11) above) or a combination thereof.

The computer system can determine, for each respondent $r_i$ of the plurality of respondents as part of the respondent-specific parameters, a performance discrepancy $\Delta S_i$ representing a difference $\Delta S_i = \hat{S}_i - S_i$ between the expected performance score $\hat{S}_i$ and the actual performance score $S_i$ of the respondent, as a difference $\Delta S_i = S_t - \hat{S}_i$ between a target performance score $S_t$ and the expected performance score $\hat{S}_i$ of the respondent, or as a difference $\Delta S_i = S_t - S_i$ between the target performance score and the actual performance score of the respondent as discussed above in section D. The computer system can determine, for each respondent $r_i$ of the plurality of respondents as part of the respondent-specific parameters, an ability gap $\Delta \theta_i$ representing (i) a difference $\Delta \theta_i = \theta_{t,i} - \theta_{a,i}$ between a first ability level $\bar{\theta}_t,i$ corresponding to the target performance score and a second ability level $\theta_{a,i}$ corresponding to the actual performance score of the respondent, or (ii) a difference $\Delta \theta_i = \theta_t - \theta_i$ between the first ability level $\theta_t$ corresponding to the target performance score and the ability level $\theta_i$ of the respondent, or a difference $\Delta \theta_i = \theta_{a,i} - \theta_i$ between the second ability level $\theta_{a,i}$ corresponding to the actual performance score and the ability level $\theta_i$ of the respondent. The computer system can determine the ability levels $\theta_t$ and/or $\theta_{a,i}$ using the plot (or function) of the expected aggregate (or total) score $\hat{S}(\theta)$, as discussed in section D above. The target performance score can be specific to respondent $r_i$ (e.g., $S_{t,i}$ instead of $S_t$) or can be common to all respondents.

In some implementations, the computer system can determine, for each respondent $r_i$ of the plurality of respondents as part of the respondent-specific parameters, a set of performance discrepancies $\Delta s_{i,j}$ representing performance discrepancies (or performance gaps) per assessment item. Starting from the response matrix, the computer system can augment it with a hypothetical respondent $r_t$ for each target performance profile TPP where $s_{t,j}$ is the target performance score of item j.

TABLE 7

Response matrix with reference respondents $r_t$ representing a target profile.

| | $t_1$ | $t_2$ | ... | $t_m$ |
|---|---|---|---|---|
| $r_1$ | $s_{1,1}$ | $s_{1,2}$ | ... | $s_{1,m}$ |
| $r_2$ | $s_{2,1}$ | $s_{2,2}$ | ... | $s_{2,m}$ |
| . | . | . | . | . |
| $r_n$ | $s_{n,1}$ | $s_{n,2}$ | ... | $s_{n,m}$ |
| TPP | $s_{t,1}$ | $s_{t,2}$ | ... | $s_{t,m}$ |

The computer system can then obtain the ability levels of the respondents and the difficulty levels of the items by running an IRT model. In particular, the ability level of the reference respondent $\theta_t$ represents the ability level of a respondent who just met all target performance levels for all items, no more no less. The computer system can determine, for each respondent $r_i$ of the plurality of respondents as part of the respondent-specific parameters, an ability gap $\Delta \theta_i$ representing a difference $\Delta \theta_i = \theta_t - \theta_i$ between the first ability level $\theta_t$ of the target performance profile and the ability level $\bar{\theta}_i$ of the respondent. Note that, different target performance scores $s_{t,j}$ can be defined for various assessment items. The performance discrepancies for each respondent $r_i$ can be defined as: (i) $\Delta s_{t,j} = s_{i,j} - E(s_{i,j})$; or (ii) $\Delta s_{i,j} = s_{t,j} - s_{i,j}$. In some implementations, the target performance scores $s_{t,j}$ can be different for each respondent $r_i$ or the same for all respondents. The target performance scores $s_{t,j}$ can be viewed as representing one or multiple target profiles to be achieved by one or more specific respondents or by all respondents. The set of performance discrepancies can be viewed as representing gap profiles for different respondents. The computer system can determine the ability levels corresponding to each target profile by using each target performance profile as a reference respondent when performing the IRT analysis. In such case, the IRT tool can provide the ability level corresponding to each performance profile by adding a reference respondent for each target performance profile.

For example, the computer system can append the assessment data to include the target performance profile as performance data of a reference respondent. For example, considering the response/assessment matrix in Table 4 above as representing the assessment data indicative of the performances of the plurality of respondents, the computer system can add a vector of score values representing the target performance profile to the response/assessment matrix. Table 8 below shows an example implementation of the appended response assessment matrix, with "TPP" referring to the target performance profile.

TABLE 8

Response/assessment matrix appended to include a target performance profile.

| | $t_1$ | $t_1$ | ... | $t_m$ |
|---|---|---|---|---|
| $r_1$ | $s_{1,1}$ | $s_{1,2}$ | ... | $s_{1,m}$ |
| $r_2$ | $s_{2,1}$ | $s_{22}$ | ... | $s_{2,m}$ |
| . | . | . | . | . |
| $r_n$ | $s_{n,1}$ | $s_{n,2}$ | ... | $s_{n,m}$ |
| TPP | $v_1$ | $v_2$ | ... | $v_m$ |

The values $v_1, v_2, \ldots, v_m$ represent the target performance score values for the plurality of assessment items $t_1, \ldots, t_m$. In some implementations, the assessment data can be further appended with performance data associated with one or more reference assessment items and/or performance data associated with one or more other reference respondents (e.g., as depicted above in Tables 5-7). For instance, Table 9 below shows a response matrix appended with performance data for reference respondents $r_w$ and $r_s$, performance data for reference assessment items $t_w$ and $t_s$ and performance data of the target performance profile (TPP).

TABLE 9

Response matrix appended with performance data associated with reference assessment items $t_w$ and $t_s$ and performance data for reference respondents $r_w$, $r_s$ and the target performance profile.

|     | $t_1$ | $t_2$ | ... | $t_m$ | $t_w$ | $t_s$ |
|-----|-------|-------|-----|-------|-------|-------|
| $r_1$ | $s_{1,1}$ | $s_{1,2}$ | ... | $s_{1,m}$ | $\max_{rw}$ | $\min_{ts}$ |
| $r_2$ | $s_{2,1}$ | $s_{2,2}$ | ... | $s_{2,m}$ | $\max_{rw}$ | $\min_{ts}$ |
| .   | .     | .     | .   | .     | $\max_{rw}$ | $\min_{ts}$ |
| .   | .     | .     | .   | .     |       |       |
| $r_n$ | $s_{n,1}$ | $s_{n,2}$ | ... | $s_{n,m}$ | $\max_{rw}$ | $\min_{ts}$ |
| $r_w$ | $\min_1$ | $\min_2$ | ... | $\min_m$ | $\max_{rw}$ | $\min_{ts}$ |
| $r_s$ | $\max_1$ | $\max_2$ | ... | $\max_m$ | $\max_{rw}$ | $\max_{ts}$ |
| TPP | $v_1$ | $v_2$ | ... | $v_m$ | $\max_{rw}$ | $\min_{ts}$ |

The computer system can feed the appended assessment data to the IRT tool. Using the appended assessment data, the IRT tool can determine, for each respondent of the plurality of respondents, a corresponding ability level and an ability level (the target ability level) for the target performance profile (TPP) as well as ability levels for any other reference respondents. In the case where the assessment data is appended with other reference respondents (e.g., $r_w$ and $r_s$), the IRT tool can provide the ability levels for such reference respondents. Also, if the assessment data is appended with reference assessment items (e.g., $t_w$ and $t_s$), the IRT tool can output the difficulty levels for such reference items or the corresponding item characteristic functions.

The computer system can further determine other parameters, such as the average of ability levels $\hat{\theta}$ of the plurality of respondents (as described in equation (17) above), the group (or average) achievement index $\overline{AIndex}$ (as described in equation (18) above), a classification of the group (or average) achievement index $\overline{AIndex}$ as described in section D above, and/or any other parameters described in section D above.

The method 1200 can include the computer system repeating the steps 1202 through 1208 for various assessment instruments. For each respondent $r_i$ associated with an assessment instrument $T_p$ (of a plurality of assessment instruments $T_1, \ldots, T_K$), the computer system can generate the respective respondent-specific parameters described above. For example, the respondent-specific parameters can include the normalized ability level $\overline{\theta}_i$, the non-normalized item difficulty $\theta_i$, and any combination of the other parameters discussed above in this section.

In some implementations, the computer system can generate the universal item-specific parameters using reference assessment data for one or more reference assessment items and reference performance data for one or more reference respondents (e.g., using a response or assessment matrix as described in Table 6). The computer system may further compute or determine, for each assessment item $t_j$ of the plurality of assessment items $t_1, \ldots, t_m$, the corresponding normalized difficulty level $\overline{\beta}_j$ as described in equation (20) above.

As discussed in section E above in relation with equation (22), using normalized ability levels, non-normalized ability levels, normalized item difficulty levels and the non-normalized item difficulty levels allows for identifying and retrieving assessment items having difficulty values β that are similar to (or close to) a respondent's ability $\theta_i$. Also, and as discussed above in relation with equation (23), using normalized item difficulties, non-normalized item difficulties, normalized respondent abilities and non-normalized respondent abilities allows for identifying and retrieving a learner respondent with an ability level that is close to a difficulty level of an assessment item.

In some implementations, using normalized ability levels, the computer system can predict a respondent's ability level $\theta f$ with respect to a second assessment instrument $T_2$ given his normalized ability level $\overline{\theta}_i^1$ with respect to a first assessment instrument $T_1$ as $$\theta_i^2 = \overline{\theta}_i^1 \cdot (\theta_{rs}^2 - \theta_{rw}^2) + \theta_{rw}^2. \tag{25}$$

The parameters $\theta_{rw}^2$ and $\theta_{rs}^2$ represent the non-normalized ability levels of reference respondents $r_w$ and $r_s$, respectively, with respect to the second assessment instrument $T_2$.

The computer system can store the universal knowledge base of the assessment items in a memory or database. The computer system can provide access to (e.g., display on display device, provide via an output device or transmit via a network) the knowledge base of assessment items or any combination of respective parameters. For instance, the computer system can provide various user interfaces (UIs) for displaying parameters of the assessment items or the knowledge base. The computer system can cause display of parameters or visual representations thereof.

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The invention claimed is:

1. A method comprising:
receiving, by a computer system including one or more processors, assessment data indicative of performances of a plurality of respondents with respect to a plurality of assessment items;
determining, by an item response theory (IRT) tool programmed on the one or more processors of the computer system executing an IRT model on the assessment data of the plurality of respondents, (i) a difficulty level for each assessment item of the plurality of assessment items, and (ii) an ability level for each respondent of the plurality of respondents, the IRT model defining, for each pair of an assessment item and a respondent, a corresponding probability of success as a nonlinear function of the difficulty level of the assessment item and the ability level of the respondent;
determining, by the IRT tool executing the IRT model, for each assessment item of the plurality of assessment items, one or more item-specific parameters indicative of one or more characteristics of the assessment item using difficulty levels for the plurality of assessment items and ability levels for the plurality of respondents, the one or more item-specific parameters of the assessment item including at least one of an item importance value or an item entropy, the item importance value indicative of dependency of an overall performance with respect to the plurality of assessment items on performance with respect to the assessment item, and the item entropy representing an expectation of assessment information of the assessment item as a function of respondent ability;
determining, by the IRT tool executing the IRT model, one or more contextual parameters using the item difficulty parameters and the respondent ability parameters, the one or more contextual parameters indicative of at least one of an aggregate characteristic of the plurality of assessment items or an aggregate characteristic of the plurality of respondents;
storing, by the computer system, the item-specific parameters and the one or more contextual parameters in a database;
generating, by the computer system, as part of the database a graphical probabilistic model for a Bayesian network to depict a relative importance of the item-specific parameters of the plurality of assessment items and the one or more contextual parameters using a size and color of nodes of the graphical probabilistic model corresponding to the plurality of assessment items; and
providing, by the computer system, via one or more user interfaces (UIs), access to the database and a visual representation of the size and color of nodes for the item-specific parameters and the one or more contextual parameters.

2. The method of claim 1, wherein providing access to the item-specific parameters of the plurality of assessment items and the one or more contextual parameters includes causing display of at least one of an item-specific parameter or a contextual parameter.

3. The method of claim 1, wherein the plurality of assessment items include a discrete non-dichotomous item having a cardinality of possible performance evaluation values greater than two, and the method further comprising:
transforming the discrete non-dichotomous assessment item into a number of corresponding dichotomous assessment items equal to the cardinality of possible performance evaluation values; and
determining the difficulty levels and the ability levels using the corresponding dichotomous assessment items.

4. The method of claim 1, wherein the plurality of assessment items include a continuous assessment item having infinite cardinality of possible performance evaluation values, and the method further comprising:
transforming the continuous assessment item into a corresponding discrete non-dichotomous assessment item having a finite cardinality of possible performance evaluation values;
transforming the corresponding discrete non-dichotomous assessment item to a number of corresponding dichotomous assessment items equal to the finite cardinality of possible performance evaluation values; and
determining the difficulty levels and the ability levels using the corresponding dichotomous assessment items.

5. The method of claim 1, wherein the one or more item-specific parameters, for each assessment item of the plurality of assessment items, further include a difficulty index, the difficulty index different from the item difficulty level of the assessment item and determined using expectation scores of the plurality of respondents in the assessment item.

6. The method of claim 5, wherein the one or more item-specific parameters, for each assessment item of the plurality of assessment items, further include a classification of each respective item difficulty index.

7. The method of claim 1, wherein the one or more item-specific parameters, for each assessment item of the plurality of assessment items, include the item importance value for the assessment item, the method comprising:
determining, by the computer system, for the assessment item, a respective conditional probability representing a probability of an overall assessment outcome of the plurality of assessment items given an assessment outcome of the assessment item; and
determining, by the computer system, the item importance value for the assessment item using the respective conditional probability.

8. The method of claim 1, wherein the one or more item-specific parameters, for each assessment item of the plurality of assessment items, further include at least one of:
the difficulty level of the assessment item;
an item discrimination parameter of the assessment items;
a pseudo-guessing item parameter of the assessment item;
a most informative ability range (MIAR) of the assessment item; or
a classification of an effectiveness of the assessment item within an assessment instrument including the plurality of assessment items, the classification of the effectiveness of the assessment item being based on the MIAR.

9. The method of claim 1, wherein the one or more item contextual parameters include at least one of:

an aggregate difficulty parameter representing an average of item difficulty parameters of the plurality of assessment items;
an aggregate item difficulty index representing an average of item difficulty indices of the plurality of assessment items;
a classification of the aggregate item difficulty index indicative of a discrete difficulty level of the plurality of assessment items;
a joint entropy of the plurality of assessment items;
a reliability parameter indicative of a reliability of the plurality of assessment items; or
a classification of the reliability of the plurality of assessment items.

10. The method of claim 1, wherein the one or more item contextual parameters include at least one of:
a group achievement index representing an average of achievement indices of the plurality of respondents; or
a classification of an expected aggregate performance of the plurality of respondents determined based the group achievement index.

11. A system comprising:
one or more processors; and
a memory storing computer code instructions, which when executed by the one or more processors, cause the system to:
receive assessment data indicative of performances of a plurality of respondents with respect to a plurality of assessment items;
determine, by an item response theory (IRT) tool programmed on the one or more processors of the system executing an IRT model on the assessment data of the plurality of respondents, (i) a difficulty level for each assessment item of the plurality of assessment items, and (ii) an ability level for each respondent of the plurality of respondents, the IRT model defining, for each pair of an assessment item and a respondent, a corresponding probability of success as a nonlinear function of the difficulty level of the assessment item and the ability level of the respondent;
determine, by the IRT tool executing the IRT model and for each assessment item of the plurality of assessment items, one or more item-specific parameters indicative of one or more characteristics of the assessment item using difficulty levels for the plurality of assessment items and ability levels for the plurality of respondents, the one or more item-specific parameters of the assessment item including at least one of an item importance value or an item entropy, the item importance value indicative of dependency of an overall performance with respect to the plurality of assessment items on performance with respect to the assessment item, and the item entropy representing an expectation of assessment information of the assessment item as a function of respondent ability;
determine, by the IRT tool executing the IRT model, one or more contextual parameters using the difficulty levels and the ability levels, the one or more contextual parameters indicative of at least one of an aggregate characteristic of the plurality of assessment items or an aggregate characteristic of the plurality of respondents;
store the item-specific parameters and the one or more contextual parameters in a database;
generate as part of the database a graphical probabilistic model for a Bayesian network to depict a relative importance of the item-specific parameters of the plurality of assessment items and the one or more contextual parameters using a size and color of nodes of the graphical probabilistic model corresponding to the relative importance of the plurality of assessment items; and
provide, via one or more user interfaces (UIs), access to the database and a visual representation of the size and color of nodes for the item-specific parameters of the plurality of assessment items and the one or more contextual parameters.

12. The system of claim 11, wherein the computer code instructions, when executed by the one or more processors, cause the system to:
cause display of at least one of an item-specific parameter or a contextual parameter.

13. The system of claim 11, wherein the plurality of assessment items include a discrete non-dichotomous item having a cardinality of possible performance evaluation values greater than two, and the computer code instructions, when executed by the one or more processors, cause the system to:
transform the discrete non-dichotomous assessment item into a number of corresponding dichotomous assessment items equal to the cardinality of possible performance evaluation values; and
determine the difficulty levels and the ability levels using the corresponding dichotomous assessment items.

14. The system of claim 11, wherein the plurality of assessment items include a continuous assessment item having infinite cardinality of possible performance evaluation values, and the computer code instructions, when executed by the one or more processors, cause the system to:
transform the continuous assessment item into a corresponding discrete non-dichotomous assessment item having a finite cardinality of possible performance evaluation values;
transform the corresponding discrete non-dichotomous assessment item to a number of corresponding dichotomous assessment items equal to the finite cardinality of possible performance evaluation values; and
determine the difficulty levels and the ability levels using the corresponding dichotomous assessment items.

15. The system of claim 11, wherein the one or more item-specific parameters, for each assessment item of the plurality of assessment items, further include a difficulty index, the difficulty index different from the item difficulty level of the assessment item and determined using expectation scores of the plurality of respondents in the assessment item.

16. The system of claim 15, wherein the one or more item-specific parameters, for each assessment item of the plurality of assessment items, further include a classification of each respective item difficulty index.

17. The system of claim 11, wherein the one or more item-specific parameters, for each assessment item of the plurality of assessment items, include the item importance value for the assessment item, and the computer code instructions, when executed by the one or more processors, cause the system to:
determine, for the assessment item, a respective conditional probability representing a probability of an overall assessment outcome of the plurality of assessment items given an assessment outcome of the assessment item; and determine the item importance value for the assessment item using the respective conditional probability.

18. The system of claim 11, wherein the one or more item-specific parameters, for each assessment item of the plurality of assessment items, further include at least one of:
the difficulty level of the assessment item;
an item discrimination parameter of the assessment items;
a pseudo-guessing item parameter of the assessment item;
a most informative ability range (MIAR) of the assessment item; or
a classification of an effectiveness of the assessment item within an assessment instrument including the plurality of assessment items, the classification of the effectiveness of the assessment item being based on the MIAR.

19. The system of claim 11, wherein the one or more item contextual parameters include at least one of:
an aggregate difficulty parameter representing an average of item difficulty parameters of the plurality of assessment items;
an aggregate item difficulty index representing an average of item difficulty indices of the plurality of assessment items;
a classification of the aggregate item difficulty index indicative of a discrete difficulty level of the plurality of assessment items;
an entropy of the plurality of assessment items;
a reliability parameter indicative of a reliability of learners;
a reliability parameter indicative of a reliability of the plurality of assessment items;
a classification of the reliability of the plurality of assessment items;
a group achievement index representing an average of achievement indices of the plurality of respondents; or
a classification of an expected aggregate performance of the plurality of respondents determined based the group achievement index.

20. A non-transitory computer-readable medium including computer code instructions stored thereon, the computer code instructions when executed by one or more processors cause the one or more processors to:
receive assessment data indicative of performances of a plurality of respondents with respect to a plurality of assessment items;
determine, by an item response theory (IRT) tool programmed on the one or more processors of the system executing an IRT model on the assessment data of the plurality of respondents, (i) a difficulty level for each assessment item of the plurality of assessment items, and (ii) an ability level for each respondent of the plurality of respondents, the IRT defining, for each pair of an assessment item and a respondent, a corresponding probability of success as a nonlinear function of the difficulty level of the assessment item and the ability level of the respondent;
determine, by the IRT tool executing the IRT model and for each assessment item of the plurality of assessment items, one or more item-specific parameters indicative of one or more characteristics of the assessment item using difficulty levels for the plurality of assessment items and ability levels for the plurality of respondents, the one or more item-specific parameters of the assessment item including at least one of an item importance value or an item entropy, the item importance value indicative of how dominant the assessment item in determining an overall performance for the plurality of assessment items, and the item entropy representing an expectation of assessment information of the assessment item as a function of respondent ability;
determine, by the IRT tool executing the IRT model and one or more contextual parameters using the item difficulty parameters, the item discrimination parameters and the respondent ability parameters, the one or more contextual parameters indicative of at least one of an aggregate characteristic of the plurality of assessment items or an aggregate characteristic of the plurality of respondents;
store the item-specific parameters and the one or more contextual parameters in a database;
generate as part of the database a graphical probabilistic model for a Bayesian network to depict a relative importance of the item-specific parameters of the plurality of assessment items and the one or more contextual parameters using a size and color of nodes of the graphical probabilistic model corresponding to the relative importance of the plurality of assessment items; and
provide, via one or more user interfaces (UIs), access to the database and a visual representation of the size and color of nodes for the item-specific parameters and the one or more contextual parameters.

\* \* \* \* \*